United States Patent
Smith et al.

(10) Patent No.: US 10,657,035 B2
(45) Date of Patent: May 19, 2020

(54) ELECTRONIC PRODUCT TESTING SYSEMS

(71) Applicant: Rainforest QA, Inc., San Francisco, CA (US)

(72) Inventors: Russell Howard Smith, San Francisco, CA (US); Otávio Elias Dalarossa, San Jose, CA (US); Jonathan David Barber, Arcozelo (PT)

(73) Assignee: Rainforest QA, Inc., San Francisco, CA (US)

( * ) Notice: Subject to any disclaimer, the term of this patent is extended or adjusted under 35 U.S.C. 154(b) by 124 days.

(21) Appl. No.: 15/953,063

(22) Filed: Apr. 13, 2018

(65) Prior Publication Data

US 2019/0317886 A1    Oct. 17, 2019

(51) Int. Cl.
*G06F 11/00*     (2006.01)
*G06F 11/36*     (2006.01)

(52) U.S. Cl.
CPC ...... *G06F 11/3688* (2013.01); *G06F 11/3692* (2013.01)

(58) Field of Classification Search
CPC ............. G06F 11/3688; G06F 11/3692; G06F 11/3672; G06F 11/3684
See application file for complete search history.

(56) References Cited

U.S. PATENT DOCUMENTS

| | | | |
|---|---|---|---|
| 7,941,525 B1 | 5/2011 | Yavilevich et al. | |
| 8,554,605 B2 | 10/2013 | Oleson et al. | |
| 8,701,109 B1 | 4/2014 | Lazier | |
| 2004/0168149 A1 | 8/2004 | Nirell et al. | |
| 2011/0016454 A1* | 1/2011 | Paintal | G06F 11/3664 717/127 |
| 2011/0107153 A1 | 5/2011 | Shufer et al. | |
| 2011/0191676 A1 | 8/2011 | Guttman et al. | |
| 2011/0276946 A1 | 11/2011 | Pletter | |
| 2013/0014084 A1 | 1/2013 | Sahibzada et al. | |
| 2013/0339931 A1 | 12/2013 | Rode | |
| 2014/0033091 A1 | 1/2014 | Schein et al. | |
| 2014/0156331 A1 | 6/2014 | Cordasco | |

(Continued)

FOREIGN PATENT DOCUMENTS

| | | |
|---|---|---|
| WO | WO 0026836 | 5/2000 |
| WO | WO 2017123203 | 7/2017 |

OTHER PUBLICATIONS

Atterer, R. et al., "Knowing the User's Every Move—User Activity Tracking for Website Usability Evaluation and Implicit Interaction", *WWW2006*, (May 22-26, 2006).

*Primary Examiner* — Joseph D Manoskey
(74) *Attorney, Agent, or Firm* — Vista IP Law Group, LLP

(57) ABSTRACT

An electronic product testing system includes: a retrieving module configured to access an electronic file, the electronic file containing data generated based on a testing of a first product, the testing of the first product performed based at least in part on a first set of digits; and a testing device having a processing unit configured to perform testing of a second product based on the data in the electronic file, and also based on a second set of digits different from the first set of digits, the second product having at least one feature that is different from the first product, wherein the testing device is configured to perform the testing of the second product by submitting the second set of digits for processing by a repository.

34 Claims, 40 Drawing Sheets

(56) References Cited

U.S. PATENT DOCUMENTS

| | | |
|---|---|---|
| 2014/0189576 A1 | 7/2014 | Carmi |
| 2014/0297601 A1 | 10/2014 | Pruner |
| 2016/0191753 A1 | 6/2016 | Jin et al. |
| 2018/0253181 A1 | 9/2018 | Abzarian et al. |

* cited by examiner

| | Product testing tasks | Questions | Answers | Tracker identifier |
|---|---|---|---|---|
| 1 | Click on tab "New test" | Do you see new test page? | Y | Image file 342 |
| 2 | Select the second tab | Do you see a new image at lower right? | Y | Image file 482 |
| 3 | Type in "XYZ" in the parameter field, and click submit | Do you see a table of values in a pop up screen? | N | Image file 429 |

| ID: 23 | X | Y | Time | Select |
|---|---|---|---|---|
| 1 | 23 | 36 | 0.0 | |
| 2 | 37 | 38 | 0.5 | |
| 3 | 39 | 40 | 1.0 | |
| 4 | 41 | 44 | 1.5 | |
| 5 | 46 | 45 | 2.0 | |
| 6 | 44 | 48 | 2.5 | Y |
| 7 | 36 | 55 | 3.0 | |
| 8 | 30 | 53 | 3.5 | |

FIG. 7

2904779 : complete / passed

Client Rainforest QA

Run 119214

Run test 1041492 - Create a run - complete. passed

Test 36577 - Create a run }1002

Brower Chrome

Created 2016/12/09 At 05:49:20 about 11 hours ago

Reviewer SimpleVoteMultiFail Features reroute —— , —————— visualization v1, —— all dailed tests, integrations toggle, net prameter score —— tabular Var V2,exploratory v1, and step redrect validator, review test v1, tester teacking v1, override result v1,—— widget, mixed results v1, report v2, wait for logs, result details v1,preview_allocations,audit log_v1, device_farm v1, integrations v2, subjective_testing_v1, —— usage_warning, import_tabular_ui,read_only_tests_variables_v1, browser_stack_dry_run, requires_screenshot, browser_stack,mechanical_—, crowd_flower Verified by [Mark Reviewed] Create new Job [Copy job]

Action

Answer 1004a    35031370

Answer 1004b    34800628

Answer 1004c    36554021

ELECTRONIC PRODUCT TESTING SYSEMS

RELATED APPLICATION DATA

This disclosure is related to U.S. patent application Ser. No. 15/784,064, filed on Oct. 13, 2017 and U.S. patent application Ser. No. 15/849,475, filed on Dec. 20, 2017, which are all hereby incorporated by reference in their entirety.

FIELD

This application relates generally to product testing, and more specifically, to systems and methods for providing product testing.

BACKGROUND

Many products require product testing. Supplier of products generally require products be tested before they can be made available to customers. Testing of products can be a lengthy and complicated process. There may be many different technical features in the product that need to be tested under different testing parameters. Many product suppliers may not have in-house product testers. These product suppliers will need to outsource product testing to outside product testers. However, finding the right product testers who can adequately perform the product testing project can itself be a time-consuming process, and can be challenging. If the product supplier needs fast turn-around time for the product testing for its product, such out-sourcing technique may not be suitable.

Furthermore, a product provided by a product supplier may include an online payment feature that allows a user to submit payment using credit card. When performing product testing on such online payment feature, legacy approaches use dummy credit card number generators and/or gift cards as substitutes for actual real credit cards during product testing. Use of the dummy credit cards has been favored over real credit cards for the obvious reasons that product suppliers generally do not prefer to make a real word payment transaction (e.g., to buy an item or to pay for a service) while testing the online payment feature of its product. However, dummy credit card generators may not work in production systems. Also, dummy credit card is not processed as real word transaction, and so it may not allow detection of problems that may otherwise occur if actual credit card is used in the online payment feature of the product. Gift cards are often blocked by companies.

In addition, gift cards, including reloadable cards, can be costly and don't work like real credit cards do. This is because payment processor of many companies may detect gift cards, and may opt to block such gift cards from being used. In addition, gift cards are processed differently from credit cards. Thus, use of gift cards may prevent the online payment feature to be fully tested.

In some cases, corporate cards may be proposed for product testing. However, the amount of overhead and manual work necessary to setup corporate cards to be used for product testing may be overwhelming.

SUMMARY

In some embodiment, an electronic product testing system includes: a retrieving module configured to access an electronic file, the electronic file containing data generated based on a testing of a first product, the testing of the first product performed based at least in part on a first set of digits; and a testing device having a processing unit configured to perform testing of a second product based on the data in the electronic file, and also based on a second set of digits different from the first set of digits, the second product having at least one feature that is different from the first product, wherein the testing device is configured to perform the testing of the second product by submitting the second set of digits for processing by a repository.

Optionally, the system further includes a charge information module configured to request the second set of digits from an institution.

Optionally, an expiration date is included in, or is associated with, the second set of digits.

Optionally, the expiration date is within 30 days of a request date of the second set of digits.

Optionally, the expiration date is configurable based at least in part on an expected date and/or time range specified for the testing of the second product to complete.

Optionally, a maximum amount of units is included in, or is associated with, the second set of digits.

Optionally, the maximum amount of units is less than 20 units.

Optionally, the maximum amount of units is configurable based at least in part on an amount of units required for testing the second product.

Optionally, the second set of digits is configured for a single-time use.

Optionally, the second set of digits is usable multiple times.

Optionally, the system further includes a charge information tracking module configured to track an amount of units transacted for a plurality of product tests.

Optionally, the data in the electronic file comprises information regarding tracked actions of a tester, and respective time stamps of the tracked actions.

Optionally, the processing unit is configured to re-execute the tracked actions for performing the testing of the second product based on the data in the electronic file regarding the tracked actions of the tester.

Optionally, the processing unit is configured to simulate actions of a tester based on the data in the electronic file.

Optionally, the electronic file comprises a script, and wherein the processing unit is configured to run the script for testing the second product.

Optionally, the script is based on tracked actions of multiple testers.

Optionally, the data in the electronic file are based on tracked action(s) performed using a cursor and/or a keyboard.

Optionally, the data in the electronic file comprises: cursor positions; a text typed by a tester; a location of the text typed by the tester, a location of an object selection; or any combination of the foregoing.

A processor-implemented method for product testing, includes: accessing an electronic file by a retrieving module, the electronic file containing data generated based on a testing of a first product, the testing of the first product performed based at least in part on a first set of digits; and performing testing of a second product by a testing device based on the data in the electronic file, and also based on a second set of digits different from the first set of digits, the second product having at least one feature that is different from the first product, wherein the act of performing testing of the second product comprises submitting the second set of digits by the testing device for processing by a repository.

Optionally, the method further includes requesting the second set of digits from an institution.

Optionally, an expiration date is included in, or is associated with, the second set of digits.

Optionally, the expiration date is within 30 days of a request date of the second set of digits.

Optionally, the expiration date is configurable based at least in part on an expected date and/or time range specified for the testing of the second product to complete.

Optionally, a maximum amount of units is included in, or is associated with, the second set of digits.

Optionally, the maximum amount of units is less than 20 units.

Optionally, the maximum amount of units is configurable based at least in part on an amount of units required for testing the second product.

Optionally, the second set of digits is for a single-time use.

Optionally, a respective set of digits is usable multiple times.

Optionally, the method further includes tracking an amount of units transacted for a plurality of product tests.

Optionally, the data in the electronic file comprises information regarding tracked actions of a tester, and respective time stamps of the tracked actions.

Optionally, the act of performing testing of the second product comprises re-executing the tracked actions by the processing unit based on the data in the electronic file regarding the tracked actions of the tester.

Optionally, the processing unit is configured to simulate actions of a tester based on the data in the electronic file.

Optionally, the electronic file comprises a script, and wherein the act of performing testing of the second product comprises running the script by the processing unit for testing the second product.

Optionally, the script is based on tracked actions of multiple testers.

Optionally, the data in the electronic file are based on tracked action(s) performed using a cursor and/or a keyboard.

Optionally, the data in the electronic file comprises: cursor positions; a text typed by a tester; a location of the text typed by the tester, a location of an object selection; or any combination of the foregoing.

In other embodiment, an electronic product testing system includes a testing device having a processing unit configured to provide a digital image that includes a feature of a product to be tested based at least in part on an instruction file; wherein the testing device is configured to test the product based at least in part on a set of digits by submitting the set of digits for processing by a repository.

Optionally, the set of digits is included in the instruction file.

Optionally, the instruction file includes testing instructions for testing the product.

Optionally, the electronic product testing system further includes a charge information module configured to request the set of digits from an institution.

Optionally, an expiration date is included in, or is associated with, the set of digits.

Optionally, the expiration date is within 30 days of a request date of the set of digits.

Optionally, the expiration date is configurable based at least in part on an expected date and/or time range specified for a product test to complete.

Optionally, a maximum amount of units is included in, or is associated with, the set of digits.

Optionally, the maximum amount of units is less than 20 units.

Optionally, the maximum amount of units is configurable based at least in part on an amount of units required for testing the product.

Optionally, the set of digits is configured for a single-time use.

Optionally, the set of digits is usable multiple times.

Optionally, the electronic product testing system further include a charge information tracking module configured to track an amount of units transacted by a plurality of product tests.

Optionally, the amount of units transacted is tracked based at least in part on a particular customer of the electronic product testing system.

Optionally, the electronic product testing system further includes a tracking device configured for tracking a cursor movement with respect to the digital image, and/or a selection of an item in the digital image, and to generate product testing data based on a result of the tracking, wherein the tracking device is also configured to output the product testing data for storage in a non-transitory medium, the non-transitory medium having a database structure that is configured to store the product testing data in association with the digital image and the instruction file.

Optionally, the electronic product testing system further includes a graphic generator configured to generate a graphic representing the tracked movement.

Optionally, the graphic includes a line traversing a plurality of cursor positions.

Optionally, the graphic further includes a selection identifier identifying a position of the selection of the item.

Optionally, the non-transitory medium includes a database configured to store a file having a plurality of cursor positions as the product testing data, wherein the cursor positions is retrievable from the database for presentation over the digital image.

Optionally, the database is configured to store the cursor positions in association with an identity of a product tester.

Optionally, the item includes a tab, a button, an icon, or a text, or any combination of the foregoing; and wherein the tracking device is configured to track a selection of the tab, a selection of the button, a selection of the icon, a selection of the text, or any combination of the foregoing.

Optionally, the electronic product testing system further includes a video generator configured to generate a video of the tracked interaction.

Optionally, the testing device is further configured to present a question after a task has been performed in accordance with the product testing instruction.

Optionally, the instruction file includes a first instruction to perform a first task and a second instruction to perform a second task for testing the product.

Optionally, the product testing data indicates a first tracked interaction for the first task, and wherein the tracking device is also configured to generate additional product testing data indicating a second tracked interaction for the second task.

Optionally, the testing device is configured to provide the digital image, the instruction file, and a first set of digits for allowing a first entity to perform product testing on the product, and also configured to provide the digital image, the instruction file, and a second set of digits for allowing a second entity to perform product testing on the product.

Optionally, the product includes a web page, a web site, a computer application, a mobile device application, or a processor application.

Optionally, the testing device is configured to provide the digital image for display on a hand-held device.

In another embodiment, a processor-implemented method for product testing includes providing a digital image that includes a feature of a product to be tested based at least in part on a set of digits and an instruction file; and submitting the set of digits for processing by a repository for product testing the feature.

Optionally, the set of digits is included in the instruction file.

Optionally, the instruction file includes testing instructions for testing the product.

Optionally, the method further includes requesting the set of digits from an institution.

Optionally, an expiration date is included in, or associated with, the set of digits.

Optionally, the expiration date is within 30 days of a request date of the set of digits.

Optionally, the expiration date is configurable based at least in part on an expected date and/or time range specified for a product test to complete.

Optionally, a maximum amount of units is included in, or is associated with, the set of digits.

Optionally, the maximum amount of units is less than 20 units.

Optionally, the maximum amount of units is configurable based at least in part on an amount of units required for testing the product.

Optionally, the set of digits is for a single-time use.

Optionally, the set of digits is useable multiple times.

Optionally, the processor-implemented method for product testing further includes tracking an amount of units transacted by a plurality of product tests.

Optionally, the amount of units transacted is tracked based at least in part on a particular customer of the electronic product testing system.

Optionally, the method further includes tracking a cursor movement with respect to the digital image, and/or a selection of an item in the digital image, and to generate product testing data based on a result of the tracking, wherein the tracking device is also configured to output the product testing data for storage in a non-transitory medium, the non-transitory medium having a database structure that is configured to store the product testing data in association with the digital image and the instruction file.

Optionally, the method further includes generating a graphic representing the tracked movement by a graphic generator.

Optionally, the graphic includes a line traversing a plurality of cursor positions.

Optionally, the graphic further includes a selection identifier identifying a position of the selection of the item.

Optionally, the non-transitory medium includes a database configured to store a file having a plurality of cursor positions as the product testing data, wherein the cursor positions is retrievable from the database for presentation over the digital image.

Optionally, the database is configured to store the cursor positions in association with an identity of a product tester.

Optionally, the item includes a tab, a button, an icon, or a text, or any combination of the foregoing; and wherein the tracking device is configured to track a selection of the tab, a selection of the button, a selection of the icon, a selection of the text, or any combination of the foregoing.

Optionally, the method furthers include generating a video of the tracked interaction.

Optionally, the method further includes presenting a question after a task has been performed in accordance with the product testing instruction.

Optionally, the instruction file includes a first instruction to perform a first task and a second instruction to perform a second task for testing the product.

Optionally, the product testing data indicates a first tracked interaction for the first task, and a second tracked interaction for the second task.

Optionally, the method further includes providing the digital image, the instruction file, and a first set of digits for allowing a first entity to perform product testing on the product, and providing the digital image, the instruction file, and a second set of digits for allowing a second entity to perform product testing on the product.

Optionally, the product includes a web page, a web site, a computer application, a mobile device application, or a processor application.

Optionally, the method further includes providing the digital image for display on a hand-held device.

Optionally, the method further includes providing the digital image for display on a computer screen or a laptop screen.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIG. 5 illustrates an example of a data structure for linking assigned product testing tasks with product testing questions, answers, and tracker identifiers.

FIG. 7 illustrates an example of a data structure for creating a graphic associated with an image of a web page being tested.

FIG. 10A-10E illustrate an example of a report that is provided to an administrator of the system of FIG. 1A.

FIG. 27A-27B illustrate an example of product testing an online payment feature.

DESCRIPTION OF THE EMBODIMENTS

Figure 1A:
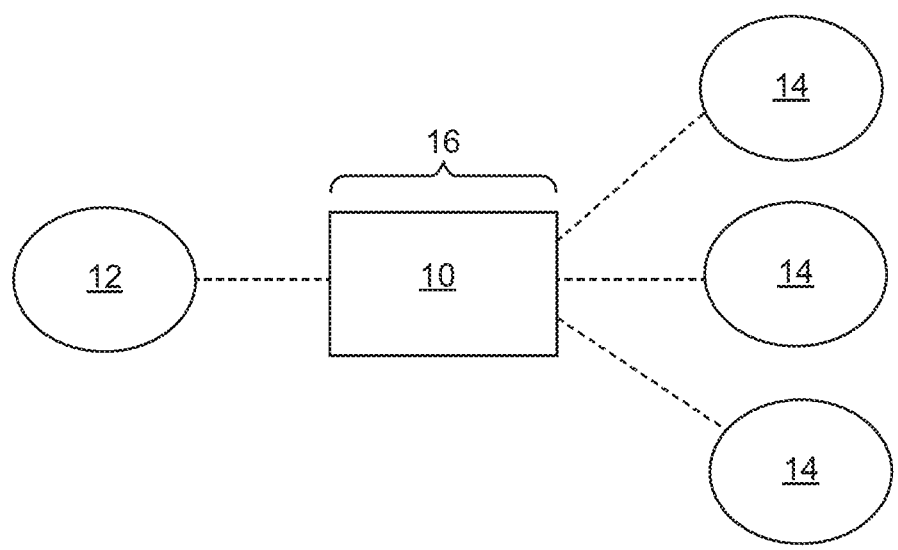
FIG. 1A illustrates a system for providing product testing.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1A illustrates a system 10 for providing product testing. The system 10 is configured to connect a party 12 that has developed a product with one or more product testers 14. By means of non-limiting examples, the product may be a web page, a web site, a computer application (e.g., an enterprise application), a mobile (e.g., handheld) device application, an application for a specialized processor (e.g., an image processor, a signal processor, a sound processor, a speech processor, a processor in a vehicle (such as a car, a plane, etc.), or any of other types of processor). The product testers 14 may be individuals residing in different parts of the world. For example, the testers 14 may reside in different parts of a city, different cities, different states, and/or different countries. In the illustrated embodiments, the system 10 is associated with a party 16 that is different from the party 12. For example, the party 12 (first party) providing the product may be a first company, and the party 16 (second party) interfacing with the party 12 and the product testers 14 may be a second company that is not the same as the first company. Also, in some embodiments, the product testers 14 are not employees of the first party 12, and are not employees of the second party 16. For example, the product testers 14 may be individual contractors. In other embodiments, one or more of the product testers 14 may be employees of the party 16.

Figure 1B:
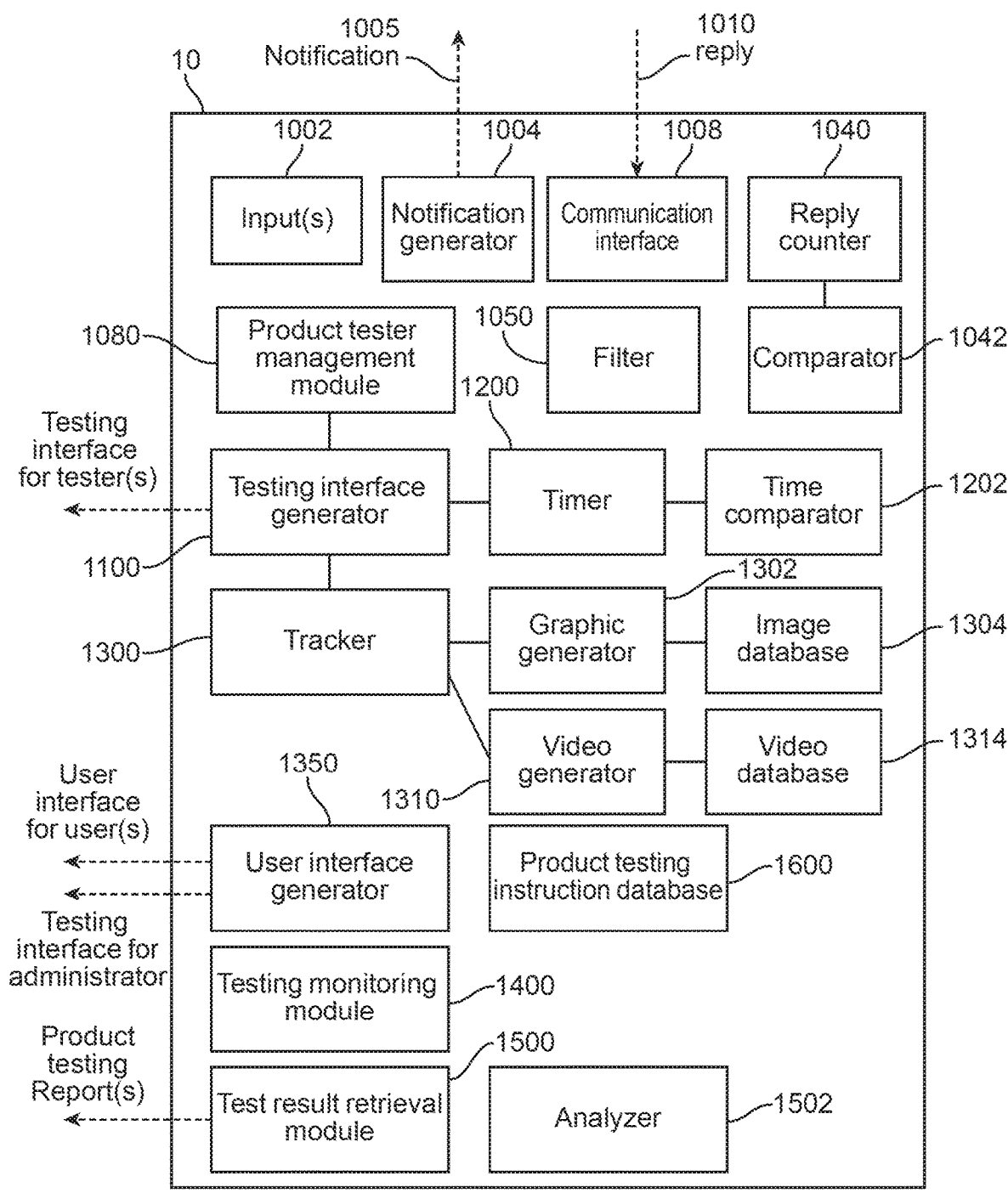
FIG. 1B illustrates an example of the system of FIG. 1A.

FIG. 1B illustrates an example of the system 10 of FIG. 1A. The system 10 includes one or more input(s) 1002, a notification generator 1004, a communication interface 1008, a reply counter 1040, a comparator 1042, a filter 1050, a product tester management module 1080, a testing interface generator 1100, a timer 1200, a time-comparator 1202, a tracker 1300, a graphic generator 1302, an image database 1304, a video generator 1310, a video database 1314, a user interface generator 1350, a testing monitoring module 1400, a test result retrieval module 1500, and an analyzer 1502. Details of these components will be described in further detail below. It should be noted that the system 10 is not limited to the example shown, and that the system 10 may have other configurations in other embodiments. For example, in other embodiments, the system 10 may not include one or more of the components shown in FIG. 1B. In further embodiments, the system 10 may be implemented using multiple devices, having different respect sets of one or more of the components shown in FIG. 1B.

In the illustrated embodiments, the product testers 14 have respective memberships and accounts with the party 16. For example, in order for a person to qualify as a product tester for the party 16, the person may need to go through a registration process with the system 10 to become a product tester 14. The product tester management module 1080 in the system 10 is configured to manage the various product testers 14. The product tester management module 1080 may be configured to provide a registration interface to receive information regarding a person who desires to be a product tester 14, so that the person is registered as a product tester 14 in the system 10. Each registered product tester 14 will have his/her login ID and password, which allow the product tester 14 to log into the system 10. The product tester management module 1080 may also be configured to provide training on product testing to train the person so that the person can be qualified as a product tester 14. In some embodiments, the product tester management module 1080 also manages the accounts of the various product testers 14. For example, after a product tester 14 completes a product testing project, the product tester management module 1080 may calculate a fee owed to the product tester 14 based on one or more features of the product testing project.

In some embodiments, the product tester management module 1080 also manages the accounts of the various product testers 14. For example, after a product tester 14 completes a product testing project, the product tester management module 1080 may calculate a fee owed to the product tester 14 based on one or more features of the product testing project. In one implementation, the fee owed to a product tester 14 may be calculated based on a number of tasks (steps) involved in the product testing. For example, if the product testing project involves 39 tasks, and the agreed rate between the product tester 14 and the second party 16 is $2 per task, then the fee for the product tester 14 for this project would be 39×2=$78. In some embodiments, all of the product testers 14 registered with the system 10 have the same pay rate. In other embodiments, different product testers 14 may have different scores indicating their level of experiences, reliabilities, etc. In such cases, the product testers 14 may have different respective pay rates based on these metrics.

During use of the system 10, when the first party 12 has developed a product, the first party 12 informs the second party 16 that its product needs to be tested. For example, the first party 12 may send a request to the system 10, and may transmit information regarding the product to be tested to the system 10. The request and/or the information regarding the product may be received by the input(s) 1002 of the system 10. For example, if the product is a web page, the first party 12 may provide a link for the web page, product testing parameters, and product testing tasks. In some embodiments, the user interface generator 1350 in the system 10 may provide an user interface for allowing the first party 12 to define product testing parameters and product testing tasks. These information may also be received via the input(s) 1002 of the system 10. For example, the first party 12 may access an user interface provided by the user interface generator 1350 of the system 10 to generate a list of tasks for a product tester 14 to perform, and to create a list of questions corresponding to the respective tasks for the product tester to answer. In one implementation, the user interface generator 1350 is configured to generate an image of the user interface for display on a device being used by the first party 12 when the first party 12 is on-line, and has logged into an account with the second party 16.

Figure 2A:
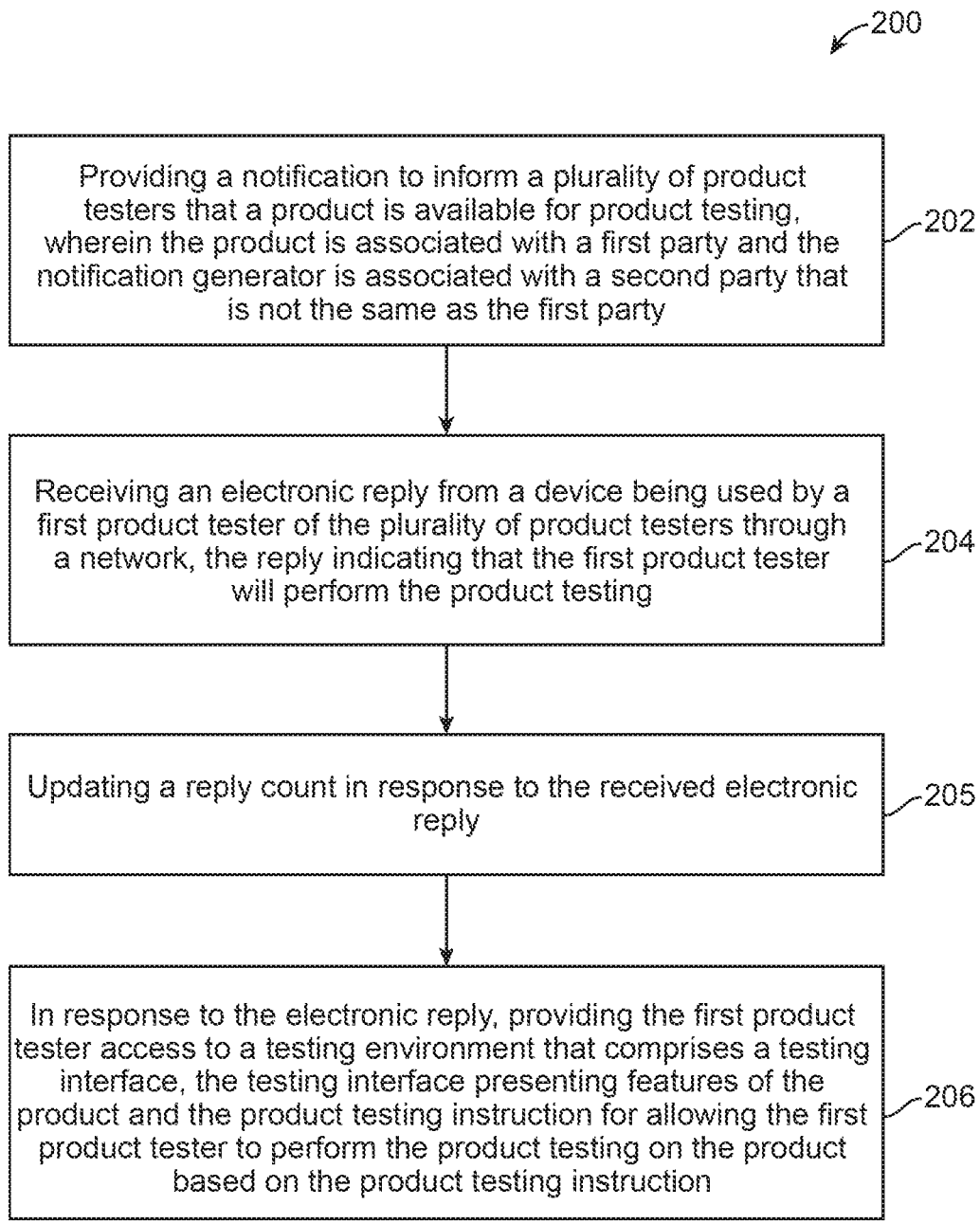
FIG. 2A illustrates a method for providing product testing.

FIG. 2A illustrates a processor-implemented method 200 performed by the system 10 of FIG. 1 for providing product testing. The method 200 may be described with reference to the system 10 of FIGS. 1A and 1B. In response to the request from the first party 12, the system 10 provides a notification 1005 to inform a plurality of product testers 14 that a product is available for product testing (item 202). In the illustrated embodiments, the product is associated with the first party 12 and the notification generator 1004 is associated with a second party 16 that is not the same as the first party 14.

In some embodiments, the notification 1005 provided by the system 10 is for display in a web browser. For example, the product tester 14 may open a web browser on his/her device. The web browser may include an add-on feature, which allows the product tester 14 to receive the notification 1005 from the system 10. In such cases, if the product tester 14 is on-line, the product tester 14 will receive the notification 1005. On the other hand, if the product tester 14 is off-line, then the product tester 14 will not receive the notification 1005. In the illustrated embodiments, the notification 1005 is "broadcasted" by the system 10 in the sense that multiple product testers 14 will receive the notification 1005 or will have access to such notification 1005.

In other embodiments, the notification 1005 may be for display in a field created by a product testing notification application. For example, the product tester 14 may install a product testing notification application onto his/her device, which allows the product tester 14 to receive the notification 1005 from the system 10. The product testing notification application may be provided by the second party 16 for installation or downloading onto a device of a product tester 14. The device being used by the product tester 14 may be a laptop, a desktop computer, or a handheld device (e.g., an iPhone, iPad, iPad mini, tablet, etc.).

In further embodiments, the notification 1005 may be sent to a job listing agent, or a crowd-testers provider, such as crowdflower or a mechanical turk, etc.

Accordingly, as used in this specification, the term "notification" may refer to any information for informing a product tester 14, wherein such information may be sent directly to a user interface on a device being used by the product tester 14, or to a job listing agent for allowing a product tester 14 to view. The notification may actively inform the product tester 14, or may passively inform the product tester 14 (in that the notification may be posted at a location at which the product tester 14 may search or discover such notification).

Figure 3:
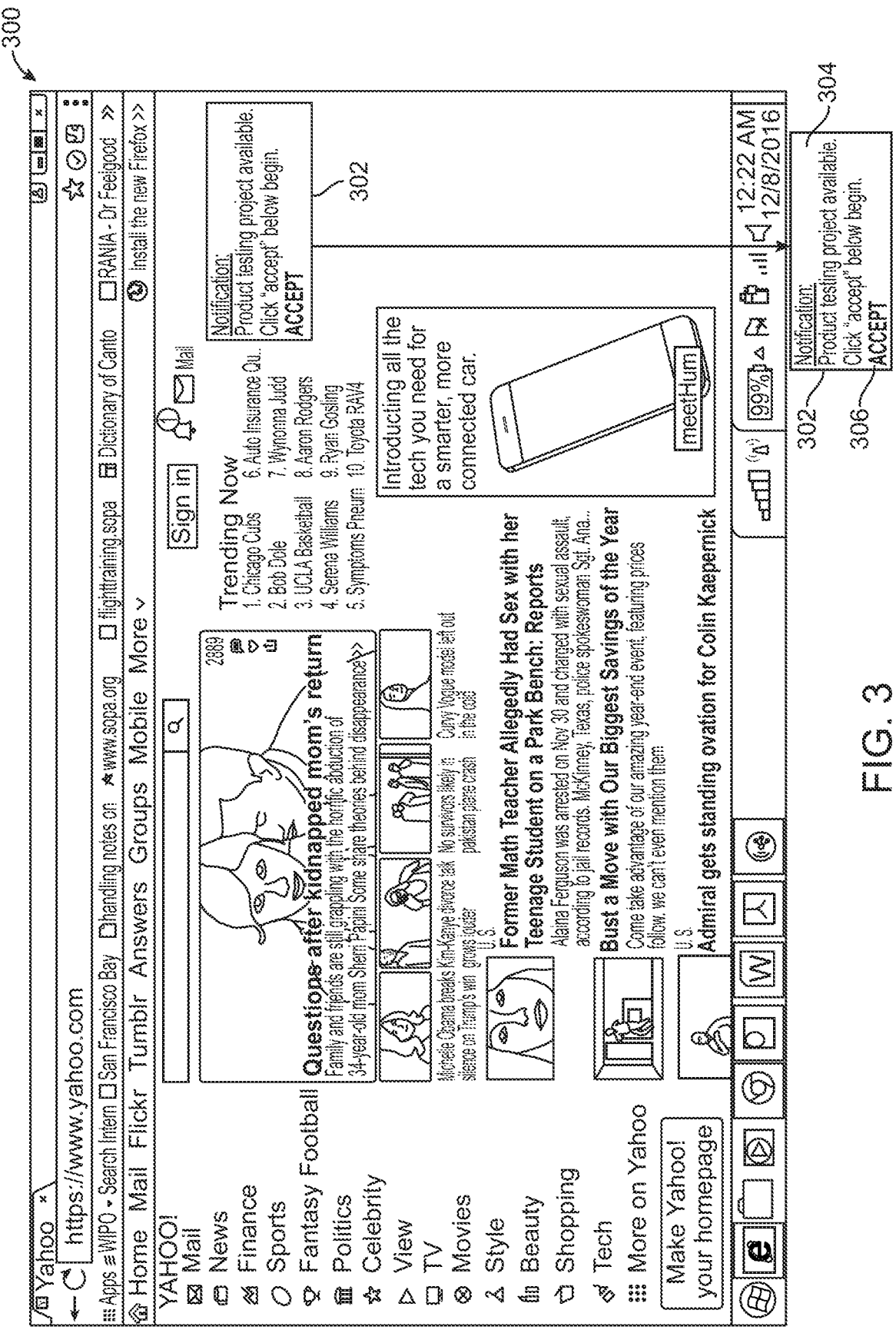
FIG. 3 illustrates an example of a user interface for providing a notification to a product tester.

FIG. 3 illustrates an example of a user interface 300 for providing a notification to a product tester 14. The user interface 300 includes a field 302 for displaying a notification 304 provided by the system 10, indicating that a product testing project is available. The user interface 300 also includes a feature 306 for allowing a product tester 14 to accept the product testing project.

It should be noted that the user interface 300 for providing the notification to the product tester 14 is not limited to the example described previously, and that the user interface 300 may have other configurations in other embodiments.

Returning to the method 200 of FIG. 2, and the system 10 of FIGS. 1A and 1B, next, an electronic reply 1010 is received from a device being used by a product tester 14 of the plurality of product testers through a network (item 204). In the illustrated embodiments, item 204 may be performed by the communication interface 1008 at the system 10. The reply 1010 indicates that the product tester 14 will perform the product testing. The network transmitting the electronic reply may be any network, such as the Internet, a telecommunication network, etc. In some cases, the electronic reply 1010 may be generated using a web browser utilized by the product tester 14. For example, the web browser on a device utilized by the product tester 14 may include an add-on feature, which allows the product tester 14 to receive the notification 1005 (e.g., a ping, a message, a posting, etc.) from the system 10, like the example shown in FIG. 3. The same add-on feature may also allow the product tester 14 to provide his/her reply (for reception by the system 10) to accept or to sign up for a product testing project.

In other cases, the electronic reply 1010 may be generated using a product testing notification application utilized by the product tester 14. For example, the product tester 14 may install a product testing notification application onto his/her device, which allows the product tester 14 to receive the notification 1005 from the system 10. As discussed, the product testing notification application may be provided by the second party 16. The same product testing notification application may also allow the product tester 14 to provide his/her reply (for reception by the system 10) to accept or to sign up for a product testing project.

In further embodiments, as discussed, a product tester 14 may use crowdflower or a mechanical turk to obtain the notification 1005 regarding the product testing project. In such cases, the reply 1010 accepting the product testing project will be generated by a device using the crowdflower or mechanical turk.

As shown in the figure, the method 200 further includes updating a reply count in response to the received electronic reply (item 205). In the illustrated embodiments, item 205 is performed by the reply counter 1040 of the system 10.

In some embodiments, the method 200 may also include receiving additional electronic reply/replies 1010, keeping track with a number of replies 1010, and comparing the number of replies 1010 with a prescribed number. In some embodiments, the communication interface 1008 of the system 10 is configured to receive one or more additional electronic replies 1010 from one or more additional product testers 14 from the plurality of product testers 14 until a prescribed number of electronic replies 1010 has been reached. In response to each reply received by the communication interface 1008, the reply counter 1040 in the system 10 will increment the reply count by one. In such cases, after the communication interface 1008 received the first electronic reply 1010 from the product tester 14, the product testing project is then assigned only to the product tester 14, and not to any other product testers 14. The communication interface 1008 continues to receive additional reply until the total number of replies 1010 is equal to the prescribed number of electronic replies 1010, as determined by the comparator 1042 in the system 10. In the illustrated embodiment, the prescribed number of reply 1010 is one reply. In other embodiments, the prescribed number of replies 1010 may be more than one. For example, in some embodiments, the prescribed number of electronic replies 1010 may be three, four, five, six, or seven. In other embodiments, the prescribed number of electronic replies 1010 may two. In further embodiments, the prescribed number of electronic replies 1010 may be more than seven.

Referring to FIG. 2, next, in response to the electronic reply, the system 10 then provides a testing environment that comprises a testing interface for use by the product tester 14 (item 206). In some embodiments, the testing interface may be generated by the testing interface generator 1100 in the system 10. Also, in one implementation, item 206 may be performed by the system 10 providing the testing interface for display on a device being used by the product tester 14 after the product tester 14 has accepted the product testing project. For example, the generated testing interface may be output to a network (e.g., the Internet) for transmission to the device of the product tester 14. Also, in one implementation, item 206 may be performed by the testing interface generator 1100, which opens up a virtual machine environment for presenting the testing interface for the product tester 14 in response to the product tester 14 accepting to take the product testing project.

The testing interface is configured to present features of the product and the product testing instruction for allowing the first product tester 14 to perform the product testing on the product based on the product testing instruction. In some embodiments, the product testing instruction provides a plurality of tasks for the product tester 14 to perform for testing the product. For example, in some cases, the product being tested comprises a web page, and the product testing instruction is configured to prescribe one or more actions be performed on the web page being tested.

Figure 4:
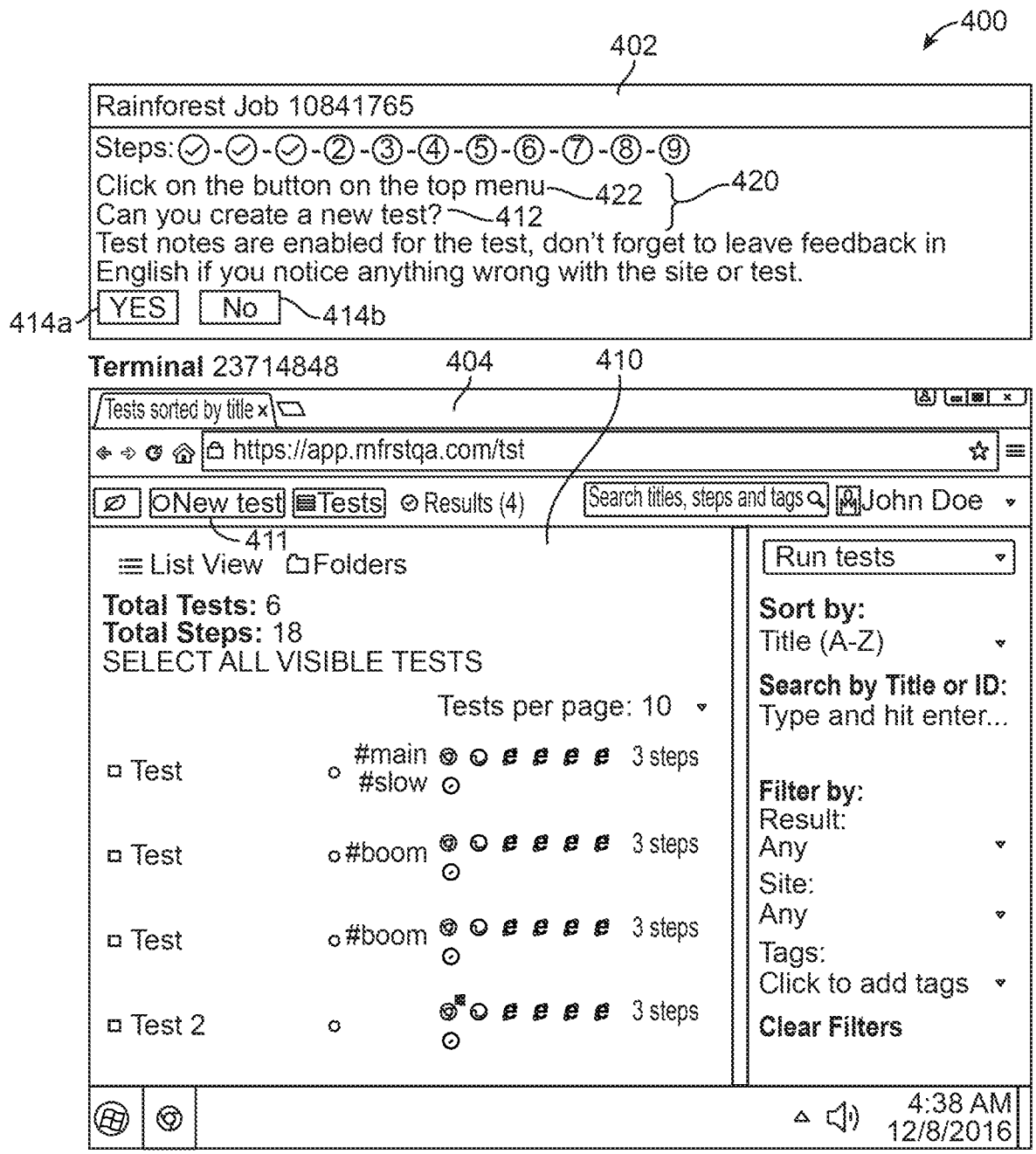
FIG. 4 illustrates an example of a testing environment having a user interface for allowing a product tester to perform product testing.

FIG. 4 illustrates an example of a testing environment 400 having a testing interface 402 for allowing a product tester 14 to perform product testing. The testing interface 402 includes a window 404 for presenting features of the product being tested. In the illustrated example, the product comprises a web page. The window 404 may allow the product tester 14 to access the web page via a link. In response to the product tester 14 entering or clicking the link, the window 404 then presents an image of a web page 410 for allowing the product tester 14 to perform product testing thereon. Also, in the illustrated example, the web page 410 displayed in the window 404 includes one or more selectable features 411. The testing interface 402 includes a field 420 providing one or more tasks 422 for the product tester 14 to perform on the web page 410.

In some embodiments, the tasks 422 are parts of a product testing instruction. A task 422 may require the product tester 14 to perform an action on the image of the web page 410. For example, a task 422 may be to click on a tab on the web page 410, to click on a link on the web page 410, to enter a value in a field in the web page 410, to click on a box in the web page 410, etc.

As shown in FIG. 4, the testing interface 402 may be configured to present a question 412 for the product tester 14 to answer after the action has been performed based on the product testing instruction. For example, the question 412 may ask the product tester 14 whether the product tester 14 sees a pop-up after selecting an object in the web page 410 being tested, whether the product tester 14 sees a new image after selecting a certain option in the web page 410, etc. In the illustrated example, the testing interface 402 also provides only two possible answers 414a, 414b ("Yes" and "No") for allowing the product tester 14 to select. Such technique reduces ambiguity in the answer provided by the product tester 14. In other embodiments, the testing interface 402 may provide more than two possible answers 414 for allowing the product tester 14 to select to answer a question baser the product tester 14 performs a task specified in the product testing instruction.

In some embodiments, if the product tester 14 selects the "No" answer to any of the product testing question, the system 10 then terminates the product testing session, and the product testing is considered completed by the product tester 14. In such cases, no further product testing tasks and no further product testing questions will be presented to the product tester 14. This is because if the product being tested has a certain feature that fails, then the product provider may want to know this right away. Also, the failed feature may impact other features of the product. Accordingly, if a feature in the product has failed the product testing, then one or more other features may fail as well. In other embodiments, instead of terminating the product testing session, the system 10 may allow the product tester 14 to continue testing the product. For example, the system 10 may allow the product tester 14 to continue with the remaining tasks in the product testing prescribed by the product testing instruction. Also, the system 10 may allow the product tester 14 to test other features of the product that are not associated with the failed feature.

In some embodiments, the method 200 further includes storing an answer of the question in a test result file for the product being tested. As described, the answer may be a "Yes" answer or a "No" answer in response to a question provided to the product tester 14 after the product tester 14 has performed a task to test the product. Thus, in some embodiments, the answer, the question, and the associated task for testing the product may be stored in a unique data structure that associate these items together. FIG. 5 illustrates an example of a data structure 500 for linking product testing tasks 502, respective product testing questions 504, and the corresponding answers 506 to the product testing questions 504. The data structure 500 also includes tracker identifiers 508 that identify files tracking interaction of the product tester 14 while testing the product. Each tracker identifier 508 may identify an image, a video file, or any of other interaction information that captures the interaction of the product tester 14 on the product being tested. These information are advantageous because they allow a user (from party 12 or party 16) to retroactively determine how a product tester 14 came to a conclusion based on the product tester's 14 interaction with the product being tested. The tracker identifier 508 will be described in further detail below.

In some embodiments, the testing interface 402 is configured for display on a computer screen or a laptop screen. In other embodiments, the testing interface 402 is configured for display on a hand-held device (e.g., an iPhone, iPad, iPad mini, tablet, etc.).

It should be noted that the testing interface 402 is not limited to the example discussed previously, and that the testing interface 402 may have other configurations in other embodiments.

Figure 2B:
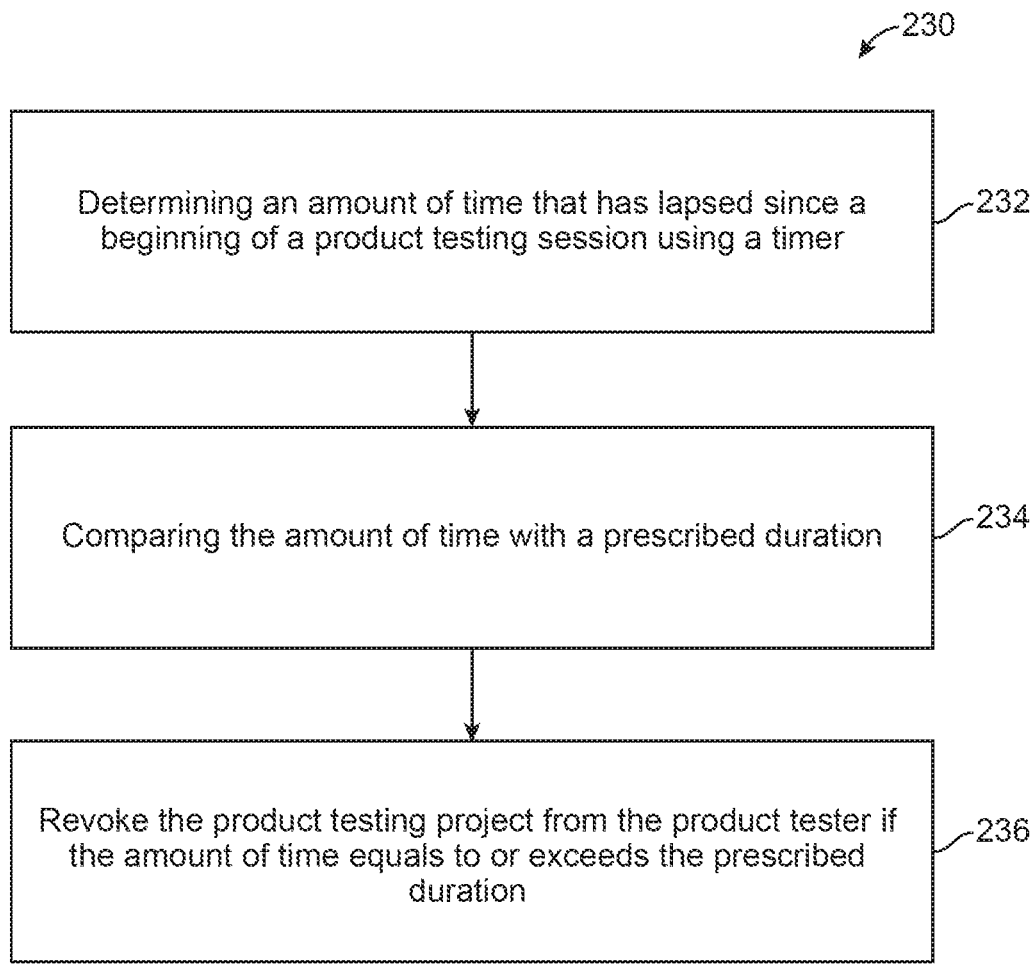
FIG. 2B illustrates a method of tracking a progress of a product testing session.

In some embodiments, after the testing interface 402 is provided to the product tester 14, the timer 1200 in the system 10 keeps track of the duration that has lapsed since the providing of the testing interface 402. In such cases, the method 200 may further include determining (by the timer 1200) an amount of time that has lapsed since the testing interface has been provided to the product tester 14. The method 200 may also include comparing the amount of time with a prescribed duration using the time-comparator 1202. If the lapsed time has exceed a the prescribed duration (e.g., a starting deadline), and the product tester 14 has not begun performing a product testing task, then the system 10 will revoke the product testing project from the product tester 14. For example, the system 10 may terminate the product testing session being used by the product tester 14. In some embodiments, the prescribed duration (starting deadline) may be set by the system 10 to be five minutes after a product testing session has begun. In other embodiments, the prescribed duration may be set by an administrator of the system 10 to have other values, such as a duration that is more than five minutes, or less than five minutes. Accordingly in some embodiments, a method 230 of tracking a progress of a product testing session may be provided (FIG. 2B). The method 230 may be a part of the method 200 in some embodiments. The method 230 includes determining an amount of time that has lapsed since a beginning of a product testing session using a timer (item 232), comparing the amount of time with a prescribed duration (item 234), and revoking the product testing project from the product tester if the determined time equals to or exceeds the prescribed duration (item 236). In some embodiments, the method 200 may also include terminating the product testing session. Also, in one implementation, item 236 may be performed by the testing interface generator 1100, which closes a virtual machine environment presenting the testing interface for the product tester 14 in response to the lapsed time meeting the prescribed duration.

In some embodiments, after the testing interface 402 is provided to the product tester 14, the method 200 further includes tracking an interaction of the product tester 14 with the web page. For example, the product tester 14 may be using his/her device (e.g., laptop, desktop, handheld device, such as a cell phone, etc.) to perform the product testing. In such cases, the tracker 1300 of the system 10 is configured to track a position of the cursor in the product tester's device as operated by the product tester 14. In some cases, if the product tester 14 is using a cell phone with a touchscreen to perform the product testing, the tracker 1300 may be configured to track a position of the finger position as applied on the touchscreen. Thus, as used in this specification, the term "cursor" is not limited to a displayed item operated using a touchpad, a mouse, or a knob, and the term "cursor" may also include non-displayed item that is associated with a movement of a finger as applied on a touchscreen.

In one implementation, the testing interface 402 may instruct the product tester 14 to click on a certain item on an image of a web page being tested. While the product tester 14 is manipulating the cursor in the web page, the tracker 1300 of the system 10 records the positions of the cursor as it appears in the web page. The system 10 may also use the graphic generator 1302 configured to generate a graphic representing the tracked movement. In some embodiments, the graphic comprises a line traversing a plurality of cursor positions. Also, the graphic may further comprise a selection identifier identifying a position in the image of the web page at which the product tester 14 performed a selection (e.g., a clicking of a button). For example, the selection may be a selection of a tab, a selection of a button, a selection of an icon, a selection of a text, or any combination of the foregoing, performed by the product tester 14.

Figure 6:
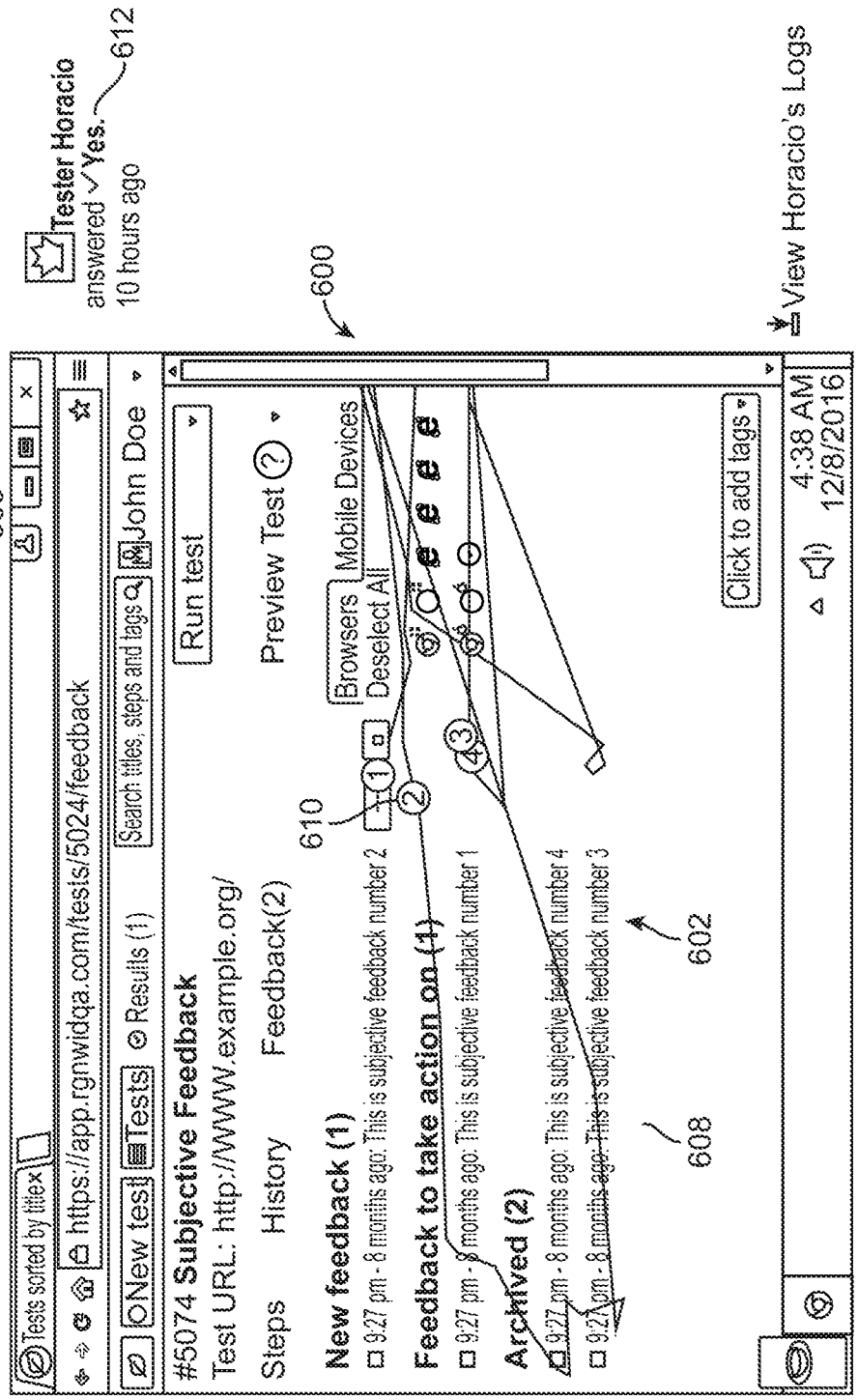
FIG. 6 illustrates an example of an image capturing an interaction of a product tester with a product being tested.

FIG. 6 illustrates an example of an image 600 capturing an interaction of a product tester with a product being tested. As shown in the figure, the image 600 includes an image of a web page 602 being tested, the task 604 prescribed by the product testing instruction, and the question 606 corresponding to the task 604. In the example, the task 604 instructs the product tester 14 to click on the "Archive" button, and the question 606 asks the product tester 14 whether the clicked item moved to the archived section. The image 600 also shows a graphic 608 generated by the graphic generator 1302. The graphic 608 is in a form of a line, which indicates where the product tester 14 has moved the cursor while performing the task 604. The graphic 608 also includes a plurality of circles 610 (example of selection identifiers) identifying a position in the image of the web page at which the product tester 14 has clicked on a button.

In some embodiments, the method 200 may further include storing the electronic image 600 in a non-transitory medium 1304 (FIG. 1B). The non-transitory medium 1304 is illustrated as an image database, but in other embodiments, the non-transitory medium 1304 may be any memory or storage device. The image 200 includes the image of the web page 602 and the graphic 608 superimposed with the image of the web page 602. In one implementation, for a given product testing task, the system 10 is configured to generate positional data regarding the position of the cursor as the product tester 14 interacts with the web page 602 to perform the assigned task. The positional data may include a position (e.g., X and Y coordinates) of the cursor. The positional data may be later used by the graphic generator to generate the graphic 608. For example, all of the positional data may be plotted to create the line shown in the example of the graphic 608 in FIG. 6. Also, in some embodiments, the system 10 may also generate timing data that are associated with the respective positions of the cursor. For example, cursor position (X1, Y1) may occur at t1, and cursor position (X2, Y2) may occur at t2. Thus, the system 10 may generate the timing data t1, t2, etc., and store such timing data in association with the respective cursor positions in the non-transitory medium.

FIG. 7 illustrates an example of a data structure 700 for storing cursor position data in association with timing data. The data structure 700 includes two columns for positional values in the x-coordinate and y-coordinate, respectively. The data structure 700 also includes a column for indicating whether the product tester 14 made a selection (e.g., by clicking a button) at a certain cursor position. In some embodiments, the data structure 700 may be used by the graphic generator 1302 to create the graphic 608 that is associated with an image of a web page being tested. In particular, the positional values in the data structure 700 may be used to create the lines in the graphic 608, and the select indicator(s) in the data structure 700 may be used to create the circle(s) 610 representing the position(s) at which the product tester 14 has made a selection. In some embodiments, the data structure 700 may be stored in the non-transitory medium 1304.

Also, in some embodiments, the data structure 700 may be linked with a certain tracker identifier in the data structure 500 of FIG. 5. For example, the data structure 700 with the identifier "23" may contain data for creating the graphic 608 in the image file 342 in the data structure 500. The image file 342 may contain an image of the web page being tested. In such cases, the data structure [Image file 342; ID=23] may be used to link the data structure 700 with the image file 342. Accordingly, when the system 10 presents an image for indicating a tracked action of a product tester 14 for the task No. 1 listed in the data structure 500, the system 10 will use the above data structure to look up the data structure 700 with the ID "23". The data in the data structure 700 are then used to generate the graphic 608 for presentation with an image of the web page.

As shown in FIG. 7, the data structure 700 may also include timing data indicating the respective times at which the positions of the cursor occurred. The timing data is advantageous because it may allow the graphic 608 to be presented in a form of a video. For example, the video generator 1310 may utilize the data structure 700 to create a video showing a changing of the position of the cursor over time. Thus, the video will indicate a tracked interaction of the product tester 14 with the web page being tested. In some embodiments, the video provided by the video generator 1310 may include a moving cursor. In other embodiments, the video provided by the video generator 1310 may include a growing line representing a collection of positional points by the cursor as the cursor is moved across the web page. In some embodiments, the video may be stored in a non-transitory medium 1314 (FIG. 1B). The non-transitory medium 1314 is illustrated as a video database, but in other embodiments, the non-transitory medium 1314 may be any memory or storage device. Also, in other embodiments, instead of having separate non-transitory media 1304, 1314 as image database and video database, the non-transitory media 1304, 1314 may be integrated as a single database.

The graphic 608 and the image of the web page being tested may be provided by the system 10 to a user associated with the first party 12. For example, in some embodiments, the user interface provided by the user interface generator 1350 may be configured to output an image and/or a video having the graphic 608 and the image of the web page for viewing by the user of the system 10. Such image and/or video may be provided as a part of a test result file so the user can see how the product tester 14 came to a certain product testing conclusion based on the interaction with the web page tested.

In some embodiments, the image and/or the video may be stored in association with the corresponding product testing task defined in the product testing instruction. In particular, the image and/or the video is for tracking the interaction of the product tester 14 while the product tester 14 is performing a certain task prescribed in the product testing instruction. Accordingly, each of the task prescribed to be performed by the product tester 14 will have a corresponding image and/or video tracking the interaction of the product tester 14 with the web page being tested. For example, if a product testing project has 28 tasks (steps), after the product tester 14 has finished the product testing project, the system 10 will have generated 28 images and/or 28 videos for the respective 28 tasks.

In some embodiments, all of the 28 images and/or the 28 videos in the example may be provided, or made available, to the user who is associated with the first party 12 (the provider of the product). In other embodiments, only one image and/or one video may be provided, or made available, to the user who is associated with the first party 12. For example, if a certain task in the product testing results in a "failed" result for the product testing, then the system 10 may provide only the image and/or only the video associated with the failed task. This may be advantageous because the user may not be concerned with tasks that have "pass" status, but may be more interested in viewing results for the task that results in a "failed" status. Furthermore, in some embodiments, the system 10 may store only the image and/or only the video that is associated with a failed task, and may delete other images and videos for other tasks that have "pass" status after the product testing project is completed or after the product testing project is completed for a certain pre-determined duration.

Figure 8A:
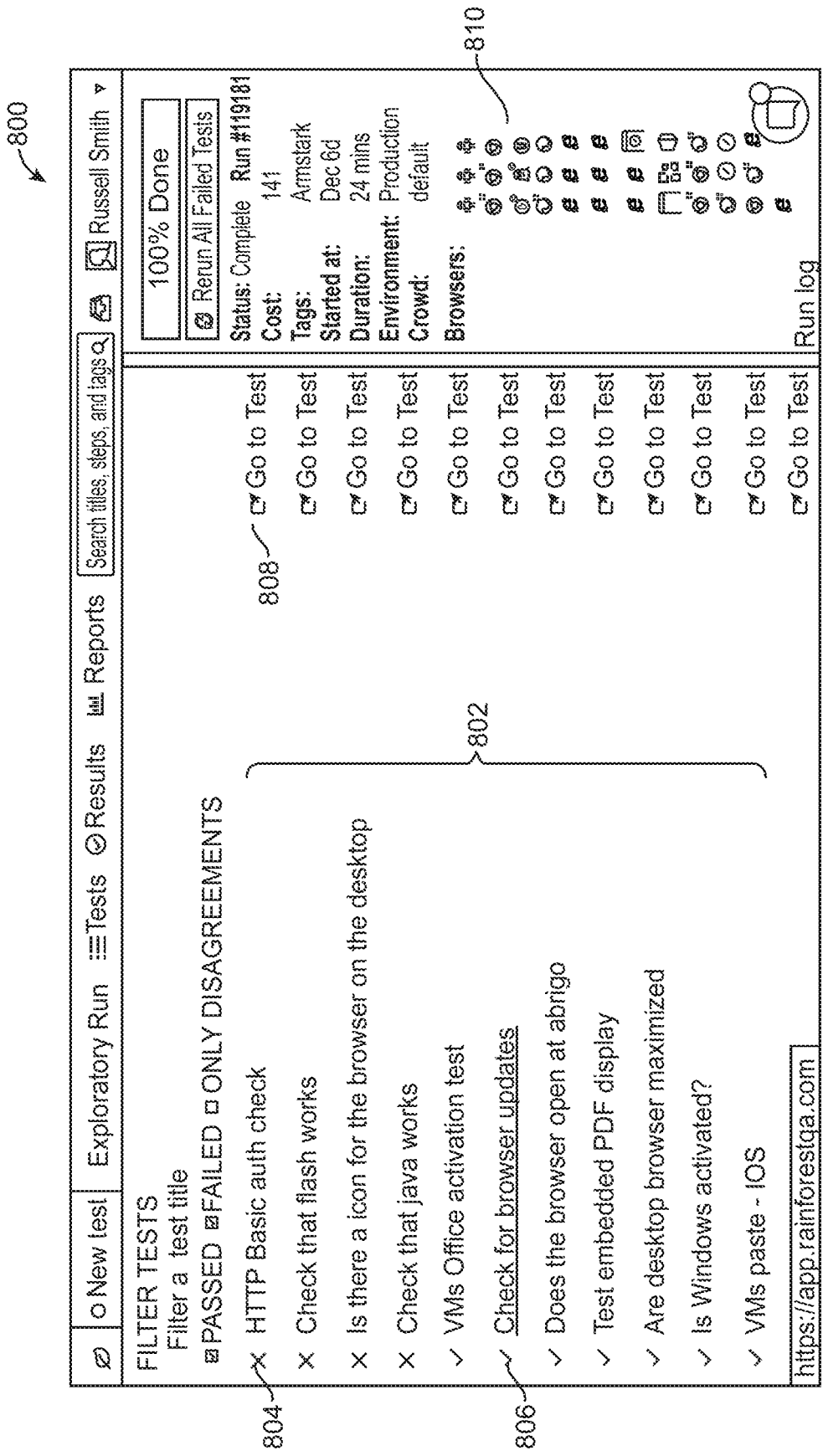
FIG. 8A-8C illustrates an example of a report summarizing a result of a product testing.
Figure 8B:
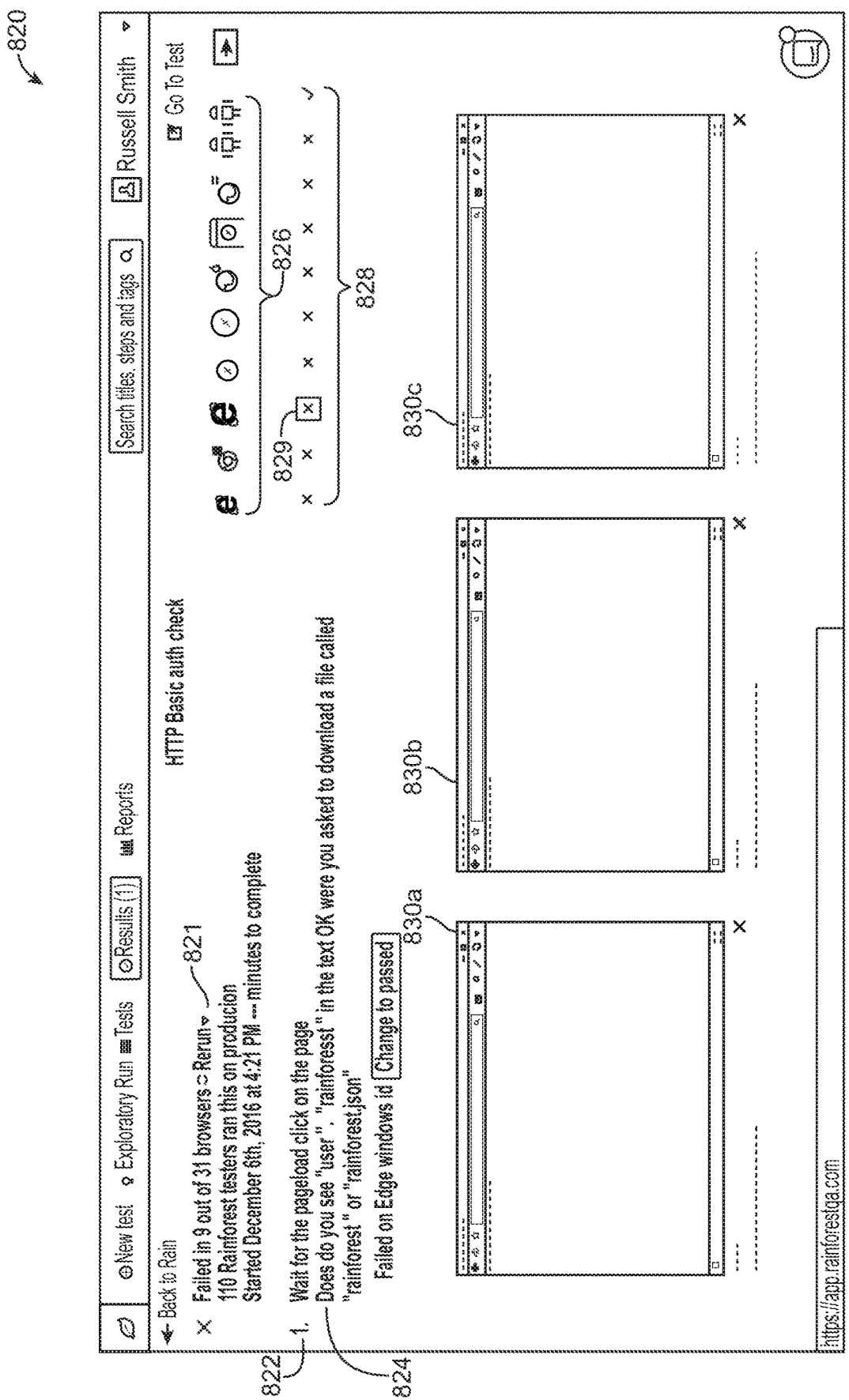
Figure 8C:
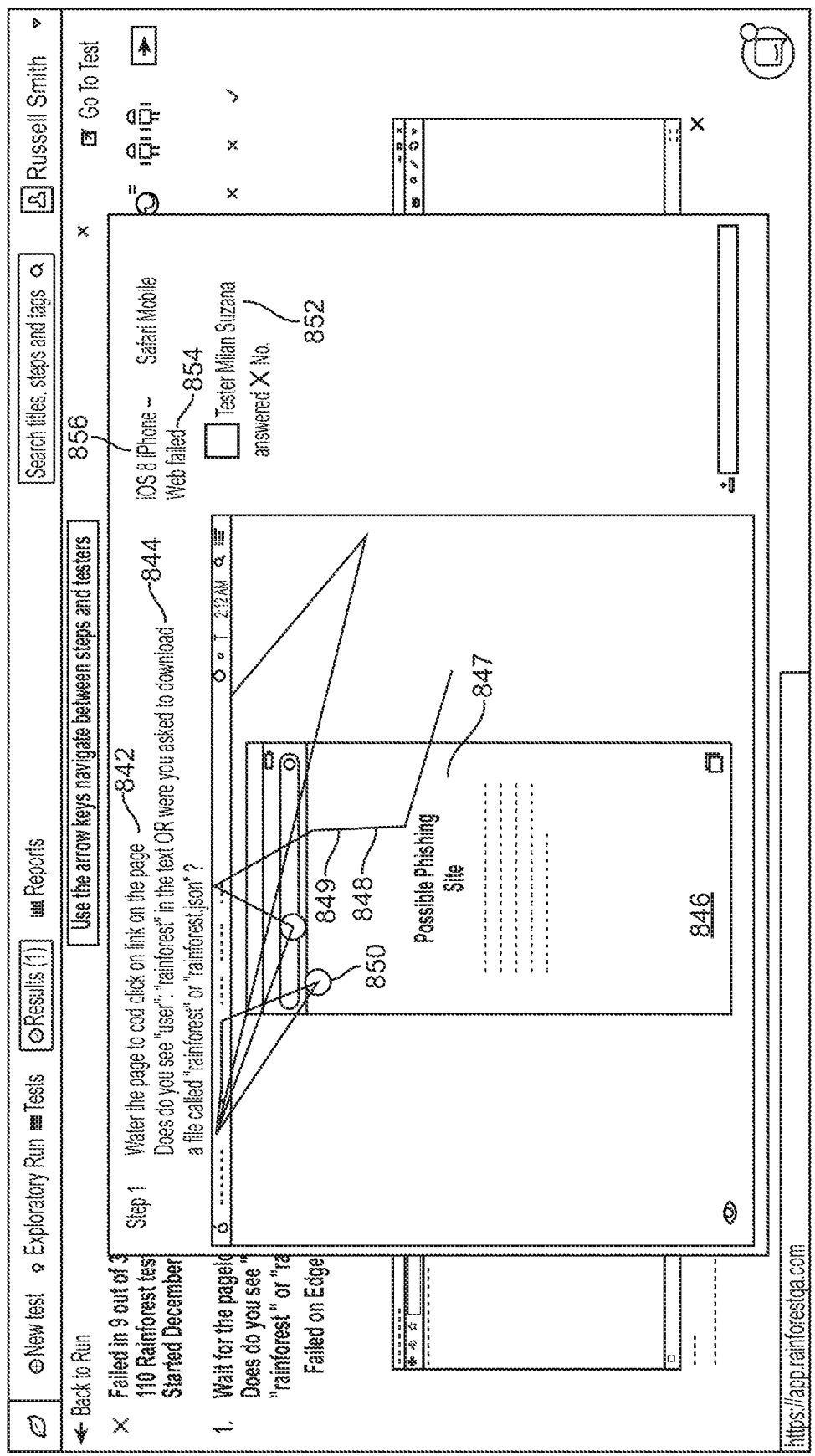

FIG. 8A-8C illustrates an example of a report 800 summarizing a result of a product testing. In some embodiments, the system 10 is configured to gather information from the finished product testing by one or more product testers 14, and generate the report 800 based on the gathered information. In the illustrated example, the report 800 is for a certain product that has been tested by the product testers 14. The report 800 includes a list of product testing tasks 802 performed by the product testers 14. The tasks 802 in the report 800 are the same tasks created (using the user interface provided by the user interface generator 1350) by the user associated with the first party 12 that provides the product for product testing. The report 800 also includes failed test identifier(s) 804 and passed test identifier(s) 806 next to different respective tasks. A task with a failed test identifier 804 indicates that the product testing failed when the product tester(s) performed that task. A task with a passed test identifier 806 indicates that the product testing passed when the product tester(s) 14 performed that task.

As shown in FIG. 8A, the report 800 also includes an object 808 next to each of the tasks, which when selected by the user, will provide further details about the product testing on that specific task. The report 800 also includes a list of browsers 810 in which the product testing of the product has been performed.

In some cases, the user viewing the report 800 may be interested in viewing details of the product testing for a certain task. In such cases, the user may select the corresponding object 808 next to the task 802. In response, the system 10 may present the report 820 shown in FIG. 8B for the user. The report 820 is for a certain task performed during the product testing. As shown in the figure, the report 820 includes a summary 821 of the product testing for that task. In the illustrated example, the summary 821 indicates that the specific task in question failed when the product testers 14 perform the product testing in 9 out of 31 browsers. The report 820 also shows the corresponding task 822 performed by the product testers 14 when the product testing failed, and the corresponding question 824. The 9 browsers in which the performance of the task failed are shown by the browser icons 826. The report 820 also includes pass/fail indicator 828 next to the different respective browser icons 826. In the example, a failed indicator 828 next to a browser icon 826 indicates that the performance of the task failed when the product testers 14 performed the task in the type of browser represented by the browser icon 826.

Also, in the illustrated example, the user viewing the report 820 has selected one of the pass/fail indicators 828 for a certain browser, as represented by the selector graphic 829. Accordingly, the report 820 displays three images 830a-830c that were captured when three respective different product testers 14 performed the task 822 in the browser type selected. From the images 830, the user viewing the report 820 can see what were on the product testers' 14 screen when they performed that specific task that result in a "failed" status.

The user viewing the report 820 can select one of the images 830a-830c to see more detail. For example, when the user selects one of the images 830a-830c, the system 10 may provide a report 840 shown in FIG. 8C to the user. The report 840 includes a description of the task 842, and the corresponding product testing question 844. The report 840 also includes an image 846 that includes an image 847 of the web page tested, and a graphic 848. The graphic 848 includes a line 849 that tracks the position of the cursor when the product tester 14 interacted with the web page, and selection identifiers 850 indicating the positions where the product tester 14 made selections (e.g., clicked a button). The features in the image 846 may be provided by the graphic generator 1302 of the system 10, as similarly discussed with reference to FIG. 6. Thus, image 846 allows the user to retroactively view the interaction of the product tester 14 with the web page while performing the task 842. In other embodiments, instead of a fixed image 846, the system 10 may provide a video showing a movement of the cursor and selection(s) (e.g., clicking of button) by the product tester 14.

As shown in the figure, the report 840 further includes an identifier of the product tester 14 who performed the product testing task. The identifier may be the actual name of the product tester 14 or other identifier that identifies the product tester 14. Also, in some embodiments, the identity of the product tester 14 may be kept confidential and may not be presented by the system 10 to the user.

The report 840 further includes a browser identifier 856 identifying the type of browser in which the task was conducted by the product tester 14, and a pass/fail indicator 854 indicating whether the task in question failed or passed during the product testing.

In some embodiments, the test result reports 800, 820, 840 may be generated using the test result retrieval module 1500 in the system 10. The test result retrieval module 1500 gather information regarding the product testing, and create the reports 800, 820, 840 for viewing by the user. The reports 800, 820, 840 may be presented through an user interface created by the user interface generator 1350 of the system 10. For example, in some embodiments, the user interface generator 1350 may generate and provide an user interface for use by an administrator of the system 10. In such cases, the reports 800, 820, 840 may be provided for viewing by the administrator through the user interface. Alternatively or additionally, the user interface generator 1350 may generate and provide an user interface for use by a user associated with the first party 12 providing the product for product testing. In such cases, the reports 800, 820, 840 may be provided for viewing by the user through the user interface.

It should be noted that the test result reports 800, 820, 840 are not limited by the examples described previously, and that the system 10 may provide test result report(s) having different configurations in different embodiments. For example, in other embodiments, the reports 800, 820, 840 may have fewer information than those described in the above example.

Also, in other embodiments, instead of providing reports associated with all of the product testers 14 for each task, the system 10 may consolidate the product testing results from the multiple product testers 14, and provide a consolidated product testing report to the user. For example, the analyzer 1502 in the system 10 may employ a logical algorithm to determine whether a certain product testing result from a product tester 14 is reliable or not. If the testing result is considered as non-reliable, the analyzer 1502 then disregards that particular product testing result.

As another example, the analyzer 1502 may compare two product testing results from two different product testers 14. If the two product testing results indicate the same conclusion (e.g., pass or fail), then the analyzer 1502 may determine the product testing results as reliable. In such cases, the system 10 may simply report to the user that the particular task in question has a pass or fail status without informing the user the number of product testers 14 performed the testing.

In some cases, if there are three product testers 14 for a particular task, the analyzer 1502 may pick a result (e.g., pass or fail) that has the majority vote. For example, if two product testers 14 performing the task provide a "Yes" answer to the corresponding question, and the third product tester 14 provides a "No" answer, then the analyzer 1502 will pick the "Yes" answer and may determine that the testing of the task has a "pass" status. On the other hand, if two product testers 14 performing the task provide a "No" answer to the corresponding question, and the third product tester 14 provides a "Yes" answer, then the analyzer 1502 will pick the "No" answer and may determine that the testing of the task has a "fail" status.

Accordingly, it is advantageous to have three product testers 14 assigned for a product testing project, and to have only two mutually exclusive answers (e.g., "Yes" and "No") as possibilities for answering the corresponding product testing question. This is because such arrangement allows the analyzer 1502 to be able to decide on a final product testing result even if a product testing result from one product tester 14 contradicts another product testing result from another product tester 14. Also, assigning the same product testing project to multiple product testers 14 allows different results to be compared for detection of non-reliable result. However, in other embodiments, more or fewer than three product testers 14 may be assigned for a product testing project, as discussed, and the number of answers may be more than two. For example, in other embodiments, the answers may be in multiple choice formats with three or more choices.

In some embodiments, the system 10 may be configured to provide a user interface for allowing a user to override a product testing result. For example, the user interface providing the report 800/820/840 may also provide a control for allowing a user to change a product testing result. If a product testing result indicates that a particular task has a "pass" status, the user may utilize the control to change the status from "pass" to "failed". Alternatively, if a product testing result indicates that a particular task has a "failed" status, the user may utilize the control to change the status from "failed" to "pass".

It should be noted that the analyzer 1502 of the system 10 is not limited to comparing product testing results. In other embodiments, the analyzer 1502 may also perform other analyses to determine different user metrics associated with the product testers 14 and/or different testing metrics relating to the reliability of the test results. For example, in some embodiments, the analyzer 1502 may compare the images (which tracked the actions of the product testers 14) stored in the image database 1304 to determine whether the three images are similar or not. If all three product testers 14 perform the same action prescribed by the task of the product testing instruction, the graphics representing the movements of the cursors in the three images may have some similar features. For example, if the product testing task requires the product testers 14 to move the cursor to a link and click on the link, the graphics representing the movement of the cursors should all include one or more selection identifiers at the link. If one of the graphics indicate that there is no selection of the link, the analyzer 1502 may then determine that the product testing result by the corresponding product tester 14 is not reliable. This may be the case even if this product tester 14 provided the same "Yes" or "No" answer to reach the same conclusion as that of the other two product testers 14.

As another example, during a product testing, the testing monitoring module 1400 of the system 10 may gather some intelligence regarding the performance of the product testers 14. After the product testing is finished, the analyzer 1502 may then retrieve the information from the testing monitoring module 1400 and perform further analysis based on the information. For example, the testing monitoring module 1400 may determine an amount of time for each product tester 14 to perform a certain task. Thus, after the product tester 14 finishes the product testing project, the testing monitoring module 1400 will have multiple time values for different respective tasks prescribed in the product testing instruction and performed by that product tester 14. The testing monitoring module 1400 also does the same for the other two product testers 14. After all three product testers 14 have finished the product testing, the analyzer 1502 may then compare the three time values associated with the respective three product testers 14 for a given task, and determine if any of the product testing results for that task from the three product testers 14 is unreliable. For example, if a certain task takes a first product tester 14 to complete in 30 seconds, takes a second product tester 14 to complete in 37 seconds, and a third product tester 14 to complete in 4 seconds, then analyzer 1502 may determine that the product testing result from the third product tester 14 is unreliable because the other two time values are closer to each other, and the third time value is different from both of the first two time values.

As a further example, when the system 10 provides the task for the product testers 14 to perform based on the pre-determined product testing instruction, the system 10 may insert one or more questions specifically designed to test the reliability of the product testers 14. For example, the system 10 may ask the product tester 14 a simple mathematical question, such as, "what is 14+6?" that is completely unrelated to the nature of the product being tested. If the product tester 14 is actively paying attention while performing the product testing, the product tester 14 is most likely to answer this question correctly. On the other hand, if the product tester 14 is not paying attention while performing the product testing, the product tester 14 may answer this question incorrectly, thereby indicating that the product testing result from this product tester 14 may be unreliable. This technique also has the benefit of detecting certain product tester 14 who may be carless, reckless, or who pretends to be performing the product testing.

Accordingly, in some embodiments, the testing monitoring module 1400 may be configured to compare an answer provided by the product tester 14 with an expected answer. If the answer provided by the product tester 14 matches the expected answer, then the testing monitoring module 1400 may determine that the product testing result by that product tester 14 is reliable. On the other hand, if the answer provided by the product tester 14 does not match the expected answer, then the testing monitoring module 1400 may determine that the product testing result by that product tester 14 is not reliable.

The testing monitoring module 1400 may also perform other functions to monitor a progress of the product testing. For example, the testing monitoring module 1400 may be configured to determine a percentage of the product testing completed, a duration spent by the product tester 14 on the product testing, a number of steps taken by the product tester 14, time wasted by the product tester 14, time lapsed before a link is clicked by the product tester 14, etc.

Figure 9:
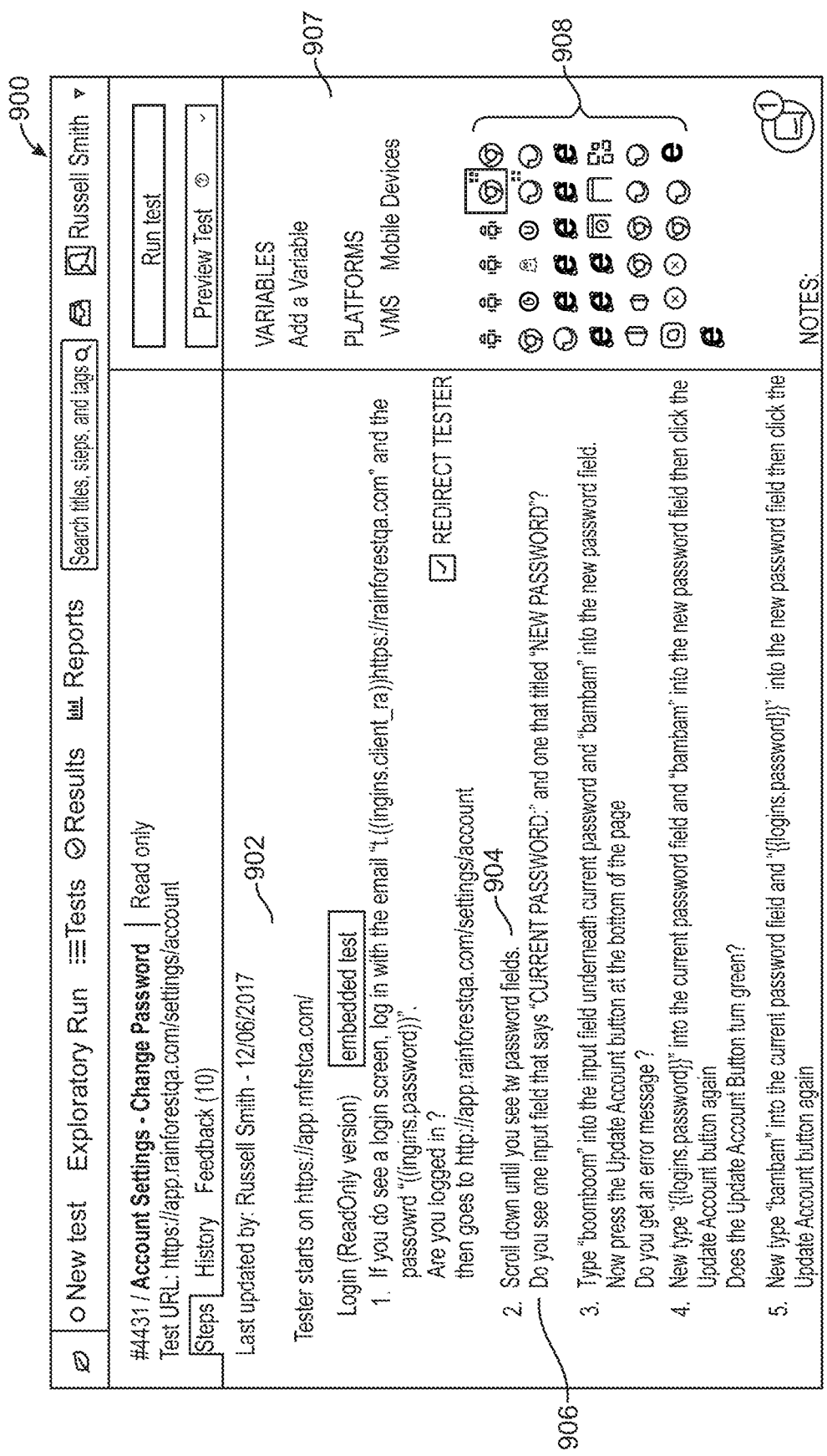
FIG. 9 illustrates an example of a user interface for allowing a user to create tasks for product testing and to define product testing parameters.

As discussed, the user interface generator 1350 is configured to provide an interface for a user to generate tasks for product testing and to define product testing parameters. FIG. 9 illustrates an example of a user interface 900 for allowing a user to generate tasks for product testing and to define product testing parameters. The user may be associated with the first party 12 providing the product for product testing, and/or a person associated with the second party 16 providing the system 10. The user interface 900 may be generated and provided by the user interface generator 1350 in the system 10 in some embodiments. In one implementation, after the product provider (first party 12) has registered with the system 10, a user at the first party 12 may then log into the system 10 (e.g., using user ID and password). After the user has logged into the system 10, the user interface generator 1350 of the system 10 may then provide the user interface 900 for the user. In some cases, there may be multiple different product providers (different first parties 12) providing different products for product testing. In such cases, each of the parties 12 will have its own unique set of user ID and password.

As shown in the figure, the user interface 900 includes a section 902 for allowing a user to create product testing tasks 904 and corresponding product testing questions 906. Each product testing task 904 prescribes a product tester 14 to perform an action on the product being tested. Each corresponding question 906 asks the product tester 14 to confirm whether a certain event occurs or not based on the action performed by the product tester 14 in accordance with the assigned task. Accordingly, each of the product testing tasks 904 and each of the product testing questions 906 are designed by the user to test specific features in the product. The user may use the user interface 900 to add, delete, edit, and move task(s) 904 and question(s) 906.

The user interface 900 also includes a section 907 having a plurality of platform/browser icons 908 for selection by the user creating the product testing tasks. Each of the platform/browser icons 908 represents a type of platform or browser in which the web page is desired to be tested. If the user wants the web page to be tested under 34 different types of platform/browser, for example, the user can select the 34 corresponding platform/browser icons 908 to prescribe such testing parameters. By means of non-limiting examples, the platform/browser icons 908 may identify Google Chrome, different versions of Chrome, different versions of Mozilla Firefox, different versions of Microsoft Internet Explorer, different iOS for different versions of iPhone, different versions of Safari, different versions of Android mobile browsers, different versions of iPhone 6 mobile browsers, different versions of Microsoft Office, etc.

Furthermore, in some embodiments, the user interface 900 may allow the user to prescribe how to test an application on a mobile device (e.g., iPhone, iPad, tablet, etc.). For example, the user may prescribe that a product testing be performed on a certain type of mobile device by using the mobile device to launch a browser to go to a website. Alternatively, the user may prescribe that the product testing be performed using mobile-native-device (through an actual mobile device) or mobile-simulator (simulated mobile environment).

In some embodiments, the system 10 is configured to package each product testing under each selected platform/browser as one product testing project (job). Following the above example in which the user has selected 34 different types of platform/browser for testing the product, and assuming that each product testing project is desired to be performed by three product testers 14, the system 10 will then generate 3×34=102 product testing projects. These 102 product testing projects will then be notified to the product testers 14 based on the notification 1005 provided by the notification generator 1004.

Also, in some embodiments, the user designing the product testing instruction may group multiple related web pages under one product testing project. In other embodiments, the product being tested may have multiple web pages, and the user may divide the product into different features for different product testing projects.

In some embodiments, after the user has created the product testing tasks and product testing parameters using the user interface 900, the user may save these information to generate a product testing instruction file. The product testing instruction file may be saved in a non-transitory medium (e.g., the product testing instruction database 1600) at the system 10. When the user determines that the product is ready for product testing, the system 10 is notified, and the notification generator 1004 of the system 10 then provides the notification 1005 to inform the product testers 14 that the product testing project is available, as discussed. When a product tester 14 has accepted the product testing project, the testing interface generator 1100 of the system 10 then provides a testing interface, along with the tasks and questions defined in the product testing instruction (stored in the database 1600) for the product tester 14 to conduct the product testing. Also, as discussed, in some embodiments, the system 10 may insert one or more questions into the product testing instruction specifically designed to test the reliability of the product testers 14. For example, the system 10 may ask the product tester 14 a simple mathematical question, such as, "what is 14+6?" that is completely unrelated to the nature of the product being tested, and that is designed to determine reliability of the product testing result.

Figure 10B:
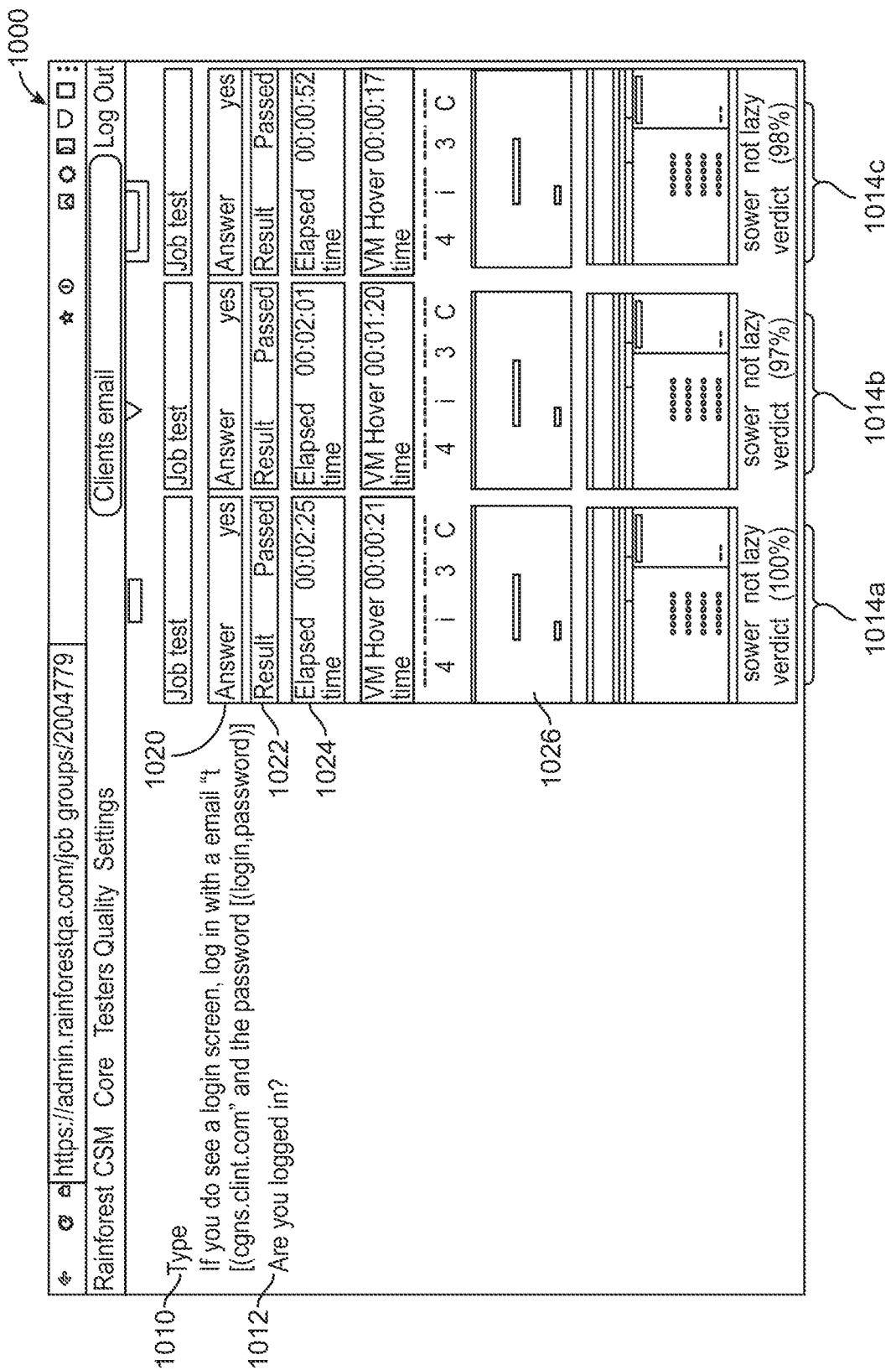
Figure 10C:
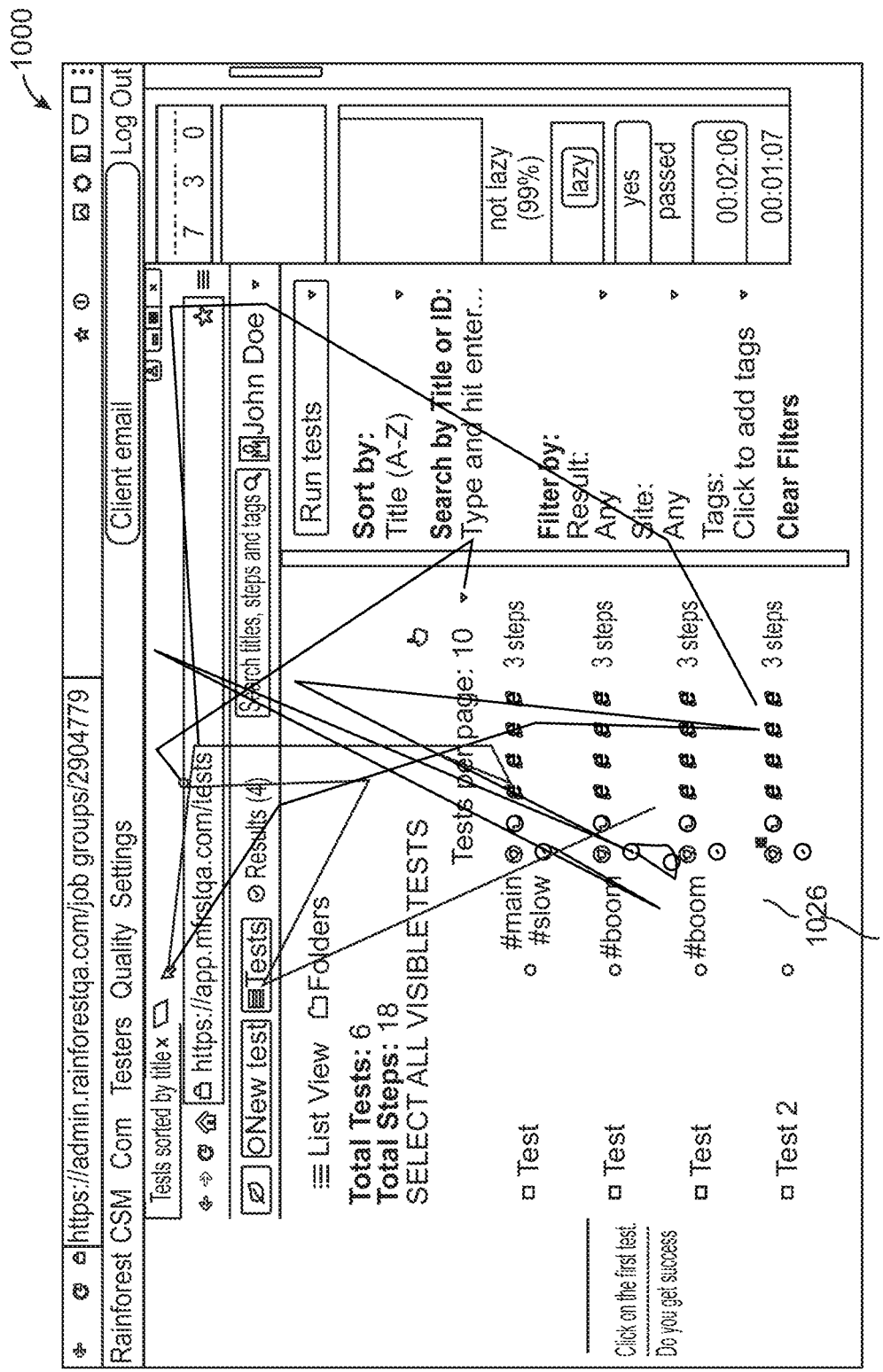
Figure 10D:
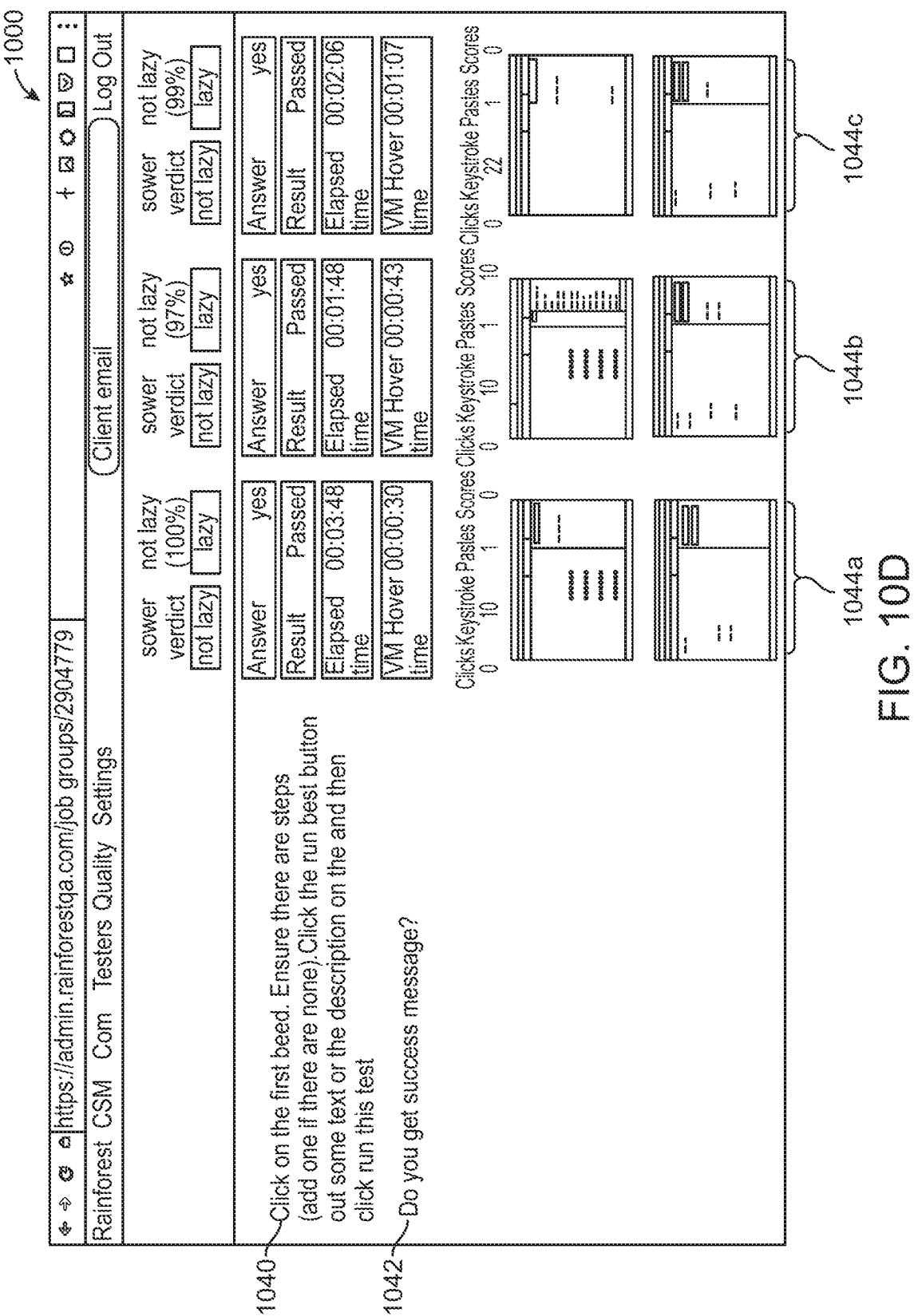
Figure 10E:
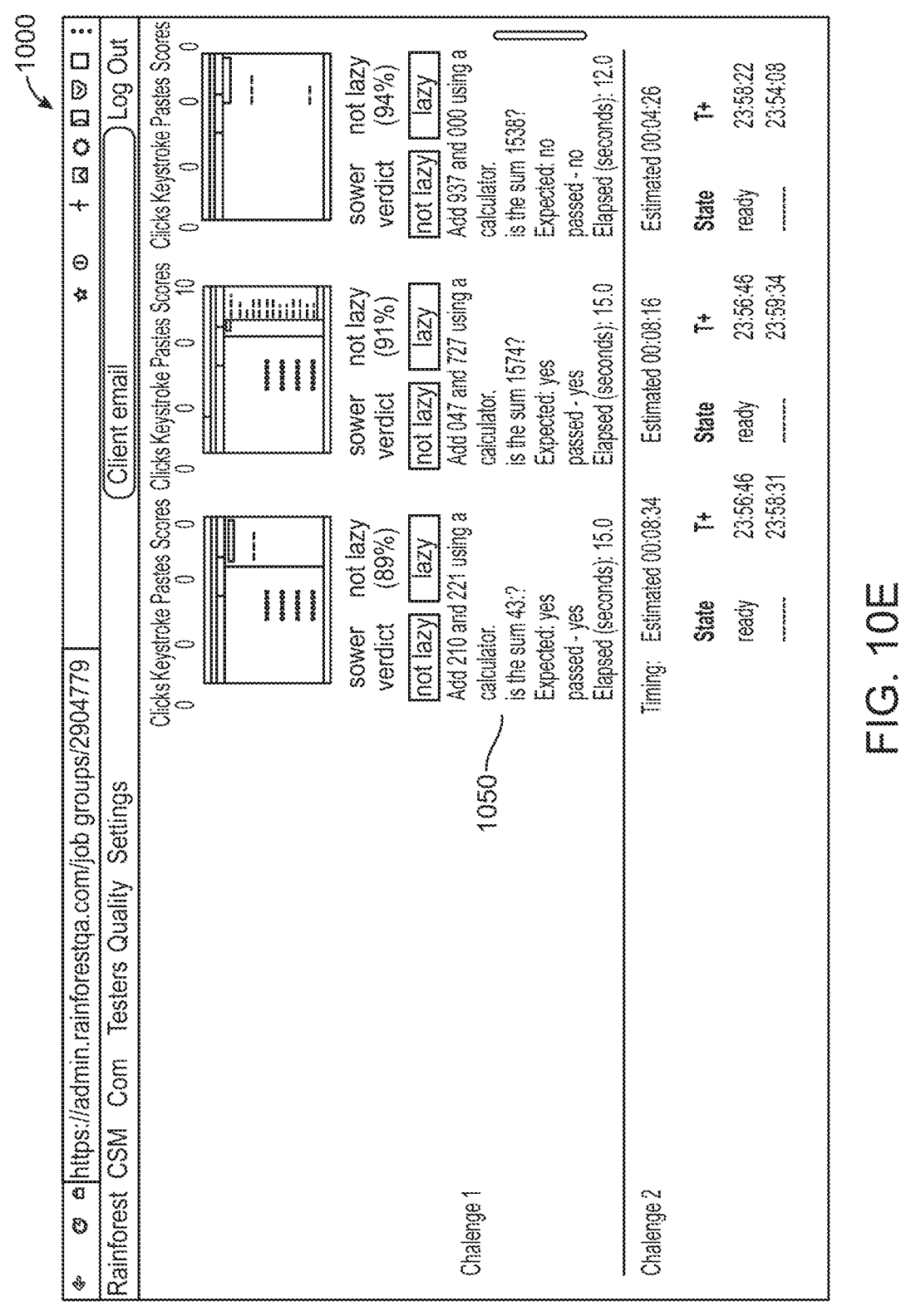

In some embodiments, the system 10 may be configured to provide an administrative product testing report for use by personnel at the second party 16. Such report provides a user at the second party 16 a detailed view of all of the tasks in a product testing. The report may be generated using the test result retrieval module 1500 (which gathers and compiled all of the relevant information), and provided to the user via an user interface generated by the user interface generator 1350. FIGS. 10A-10E illustrate an example of a report 1000 that is for viewing by a user at the second party 16. The report 1000 includes data 1002 regarding the product testing performed, including name of client (product provider), product testing identification, type of platform/browser in which the product testing was conducted, etc. The report 1000 also includes the identifications 1004*a*-1004*c* of three product testers 14 who performed the product testing. The report 1000 also includes a summary of the product testing organized by tasks. For example, as shown in FIG. 10B, the report 1000 includes a section that provides the product testing task 1010 and its corresponding product testing question 1012. The report 1000 also includes respective results 1014*a*-1014*c* associated with the respective product testers 14. Each result 1014 indicates the product tester's 14 answer 1020 to the product testing question, a pass/fail indicator 1022 indicating whether the performance of the task passes or not, a time value 1024 indicating an amount of time it took for the product tester 14 to complete the task 1010, and an image 1026 that tracked the action of the product tester 14 while performing the task 1010. The image 1026 may be generated by the graphic generator 1302 as similarly discussed previously. In some cases, the user may click on the image 1026, and the system 10 may then provide a more detailed view of the image 1026 (FIG. 10C). The image 1026 includes a graphic that indicates the action of the product tester 14 performed during the product testing, as similarly discussed. As shown in FIG. 10D, the report 1000 may also include respective results 1044*a*-1044*c* associated with the respective product testers for a different task 1040, which has a corresponding product testing question 1042. Furthermore, as shown in FIG. 10E, the report 1000 may also include the inserted questions 1050 for the respective product testers 14 that tested the reliability of the product testing results.

As discussed, in some embodiments, the system 10 may be configured to provide a user interface for allowing a user to override a product testing result. For example, the user interface providing the report 1000 may also provide a control for allowing a user (e.g., an administrator, or a personnel associated with the second party 16, etc.) to change a product testing result. If a product testing result indicates that a particular task has a "pass" status, the user may utilize the control to change the status from "pass" to "failed". Alternatively, if a product testing result indicates that a particular task has a "failed" status, the user may utilize the control to change the status from "failed" to "pass".

The system 10 of FIG. 1B will now be described in further detail. The system 10 includes one or more input(s) 1002 for receiving a product testing request, information about the product, and product testing instruction. The system 10 also includes a notification generator 1004 configured to generate a notification 1005 to inform a plurality of product testers 14 that a product is available for product testing. As discussed, in some embodiments, the product is associated with the first party 12 developing the product, and the notification generator 1004 is associated with the second party 16 that is not the same as the first party 12.

In some embodiments, the notification 1005 is for display in a web browser. For example, the product tester 14 may open a web browser on his/her device. The web browser may include an add-on feature, which allows the product tester 14 to receive the notification 1005 from the system 10. In other embodiments, the notification 1005 may be for display in a field created by a product testing notification application. For example, the product tester 14 may install a product testing notification application onto his/her device, which allows the product tester 14 to receive the notification 1005 from the system 10.

In further embodiments, the notification may be transmitted to crowdflower or a mechanical turk.

The system 10 also includes a communication interface 1008 configured to receive an electronic reply 1010 from a device 1020 being used by a first product tester 14 of the plurality of product testers, the reply 1010 indicating that the first product tester 14 will perform the product testing. In some embodiments, the communication interface 1008 and the one or more input(s) 1002 may be integrated.

In some cases, the electronic reply 1010 may be generated using a web browser utilized by the product tester 14. For example, as similarly discussed, the web browser on a device utilized by the product tester 14 may include an add-on feature, which allows the product tester 14 to receive the notification from the system 10. The same add-on feature may also allow the product tester 14 to provide his/her reply (for reception by the system 10) to accept or to sign up for a product testing project.

In other cases, the electronic reply 1010 may be generated using a product testing notification application utilized by the product tester 14. For example, as also similarly discussed, the product tester 14 may install a product testing notification application onto his/her device, which allows the product tester 14 to receive the notification from the system 10. The same product testing notification application may also allow the product tester 14 to provide his/her reply (for reception by the system 10) to accept or to sign up for a product testing project.

As similarly discussed, in other embodiments, the electronic reply may be generated by a device that is using crowdflower or a mechanical turk.

In some embodiments, the system 10 may also include a reply counter 1040 configured to keep track with a number of replies 1010, and a comparator 1042 configured to compare the number of replies 1010 with a prescribed number. In some embodiments, the communication interface 1008 is configured to receive one or more additional electronic replies from one or more additional product testers 14 from the plurality of product testers 14 until a prescribed number of electronic replies has been reached. In response to each reply received by the communication interface 1008, the reply counter 1040 will increment by one. The communication interface 1008 continues to receive additional reply until the total number of replies is equal to the prescribed number of electronic replies, as determined by the comparator 1042. In the illustrated embodiment, the prescribed number of replies is one reply. In other embodiments, the prescribed number of replies may be more than one. For example, in some embodiments, the prescribed number of electronic replies may be three, four, five, six, or seven. In other embodiments, the prescribed number of electronic replies may two. In further embodiments, the prescribed number of electronic replies may be more than seven.

In some embodiments, the system 10 may further include a filter 1050 configured to select the plurality of product testers 14 from a list of available product testers 14 for providing the notification. For example, by means of non-limiting examples, the filter 1050 may be configured to select the plurality of product testers based at least in part on respective scores of the plurality of product testers, respective ages of the plurality of product testers, respective language skills of the plurality of product testers, respective locations of the plurality of product testers, respective age groups of the plurality of product testers, respective industry expertise of the plurality of product testers, or any combination of the foregoing. Also, in one example, if a product is desired to be tested by individuals who can read Italian, the filter 1050 may then perform filtering to obtain a list of all product testers 14 who can read Italian. In such cases, the notification 1005 may be provided by the notification generator to only the product testers 14 who can read Italian.

The system 10 further includes a testing interface generator 1100 configured to generate a testing interface for use in a testing environment. The testing interface may be the testing interface described with reference to FIG. 4. In other embodiments, the testing interface may have other configurations. As similarly discussed, the testing interface is configured to present features of the product and product testing instruction for allowing the first product tester 14 to perform the product testing on the product based on the product testing instruction. The product testing instruction in the testing interface is configured to provide a plurality of tasks for testing the product. For example, the product testing instruction may prescribe one or more actions be performed by the product tester 14 on a web page being tested. In some embodiments, the testing interface is configured for display on a hand-held device (e.g., an iPhone, iPad, iPad mini, tablet, etc.). In other embodiments, the testing interface is configured for display on a computer screen or a laptop screen.

In some embodiments, the product testing instruction may be created by a user through an user interface provided by the user interface generator 1350. The user creating the product testing instruction may be associated with the first party 12 providing the product for testing, or may be associated with the second party 16. The user interface allows the user to create multiple product testing tasks, and multiple corresponding product testing questions, to test a product. In some cases, the product includes a web page, and the user interface allows the user to select one or more platforms/browsers in which to test the web page. The product testing instruction may be stored in the product testing instruction database 1600.

In some embodiments, the user interface generator 1350 may be configured to provide a first product tester 14 access to a testing environment for allowing the first product tester 14 to perform product testing on a product based on the product testing instruction. The user interface generator 1350 may also be configured to provide a second product tester 14 access to another testing environment for allowing the second product tester 14 to perform another product testing on the same product based on the same product testing instruction. In one implementation, the user interface generator 1350 may provide different virtual environments for different respective product testers 14. Accordingly, different product testers 14 may perform the product testing on different respective virtual machines that provide the testing interfaces for testing the product.

Also, in some embodiments, the testing interface is configured to present an image of a web page (e.g., a web page being tested), and the product testing instruction is configured to instruct the first product tester 14 to perform an action on the image of the web page being tested. The testing interface may further be configured to present a question for the first product tester 14 to answer after the action has been performed based on the product testing instruction. The system 10 may further include a non-transitory medium for storing the product tester's answer to the question in a test result file.

In some embodiments, the system 10 also includes a timer 1200 that keeps track of the duration that has lapsed since the testing interface 402 was provided to the product tester 14. The system 10 also includes a time-comparator 1202, which compares the lapsed time with a prescribed threshold. If the lapsed time has exceeded the prescribed threshold and the product testing is not completed by the product tester 14, then the system 10 will revoke the product testing project from the product tester 14. For example, the system 10 may terminate the product testing session being used by the product tester 14. In some embodiments, in response to the revoked product testing project from the product tester 14, the system 10 will update the reply counter 1040 (e.g., by subtracting the total count by one) to indicate that a slot for the product testing project is available (due to the product testing project being released back to the pool of product testers 14 for acceptance). If another product tester 14 submits a reply to take the slot for the product testing project, the product testing project (which was not completed by the previous product tester 14) is then assigned to this other product tester 14.

As shown in FIG. 1B, the system 10 also includes a tracker 1300 configured to track an interaction of the first product tester 14 with the product. In some embodiments, the product may be a web page, and the tracker 1300 is configured to track an interaction of the first product tester 14 with an image of the web page.

Also, in some embodiments, the tracker 1300 is configured to track a movement of a cursor operated by the first product tester 14. For example, the first product tester 14 may be using his/her device (e.g., laptop, desktop, handheld device, such as a cell phone, etc.) to perform the product testing. In such cases, the tracker 1300 is configured to track a position of the cursor in the product tester's device as operated by the first product tester 14. In some cases, if the product tester 14 is using a cell phone with a touchscreen to perform the product testing, the tracker 1300 may be configured to track a position of the finger position as applied on the touchscreen. Thus, as used in this specification, the term "cursor" is not limited to a displayed item operated using a touchpad, a mouse, or a knob, and the term "cursor" may also include non-displayed item that is associated with a movement of a finger as applied on a touchscreen.

Also, in some embodiments, the tracker 1300 is configured to track a selection of a tab, recording a selection of a button, recording a selection of an icon, recording a typed text, or any combination of the foregoing, performed by the first product tester 14.

The system 10 further includes a graphic generator 1302 configured to generate a graphic representing the tracked movement by the tracker 1300. In some embodiments, the graphic comprises a line traversing a plurality of cursor positions. In some embodiments, the graphic may also comprises a selection identifier identifying a position in the image of the web page at which the first product tester 14 performed a selection.

The system 10 may also include an image database 1304 configured to store an electronic image in a non-transitory medium, the electronic image comprising the image of the web page and the graphic superimposed with the image of the web page. In some embodiments, the image database 1304 is configured to store the electronic image in association with an identity of the first product tester 14 and in association with the product being tested. The image database 1304 may be one or more non-transitory medium located at a same facility or at different facilities.

Alternatively or additionally, the system 10 may further include a video generator 1310 configured to generate a video of the tracked interaction. In some embodiments, the video may show a movement of a cursor as operated by the product tester 14 while testing a web page. The video may also show a selection of an object in the web page by the product tester 14. In one implementation, the video may be a recording of screenshots over time to show an interaction of the product tester 14 with the web page being tested. In other embodiments, the video may contain images of a processor-generated graphic (tracking an interaction of the product tester 14) superimposed with image(s) of the web page being tested. For example, the graphic may be a "growing" line that follows a position of a cursor, thereby representing cursor positions over time. In some embodiments, the video may also show a selection identifier identifying a position in the image of the web page at which the first product tester 14 performed a selection (e.g., a clicking operation). For example, the graphic may include an identifier (e.g., a circle) placed on the "growing line" wherever the product tester 14 performs a clicking operation.

In some embodiments, the system 10 may also include a video database 1314 configured to store the video in a non-transitory medium. In some embodiments, the video database 1314 is configured to store the video in association with an identity of the first product tester 14 and in association with the product being tested. The image database 1314 may be one or more non-transitory medium located at a same facility or at different facilities.

As shown in FIG. 1B, the system 10 also includes a testing monitoring module 1400 configured to monitor a progress of the product testing. By means of non-limiting examples, the testing monitoring module 1400 is configured to determine a percentage of the product testing completed, a duration spent by the first product tester, a number of steps taken by the first product tester, time wasted by the first product tester, time lapsed before a first link is clicked by the first product tester, etc.

The system 10 further includes a test result retrieval module 1500 configured to obtain a first testing result achieved by the first product tester 14 completing the product testing. The test result retrieval module 1500 is also configured to obtain additional testing result(s) from one or more additional product tester(s) 14. For example, the test result retrieval module 1500 may be configured to also obtain a second testing result achieved by the second product tester 14 completing the product testing. The system 10 further includes an analyzer 1502 configured to analyze the first testing result and the second testing result to determine whether the first testing result, the second testing result, or both of the first testing result and the second testing result, are reliable or not.

In some embodiments, the analyzer 1502 may also be configured to use other information obtained by the testing monitoring module 1400, to determine whether one or more of the product testing results are reliable or not.

The test result retrieval module 1500 may be configured to generate one or more product testing reports, such as those shown in FIGS. 8A-8C and FIGS. 10A-10E. The product testing reports may be provided to one or more users through one or more user interface(s) provided by the user interface generator 1350. For example, one or more reports may be provided to a user associated with the first party 12 providing the product being tested. As another example, one or more reports may be provided to an administrator or another user associated with the second party 16.

Although the system 10 has been described with reference to connecting a product tester 14 with a certain product testing project to test a certain product created by a party 12, in other embodiments, the system 10 may connect multiple product testers 14 to a certain product testing project. In one implementation, the testing interface module is configured to provide multiple instances of the testing interface to multiple product testers 14. For example, the testing interface (e.g., an instance of it) may provide the features of the product and the product testing instruction for allowing a second product tester 14 to perform the product testing on the product based on the product testing instruction. Also, in some embodiments, the system 10 may be configured to provide multiple instances of virtual testing environment for multiple product testers 14 to perform product testing.

In addition, in other embodiments, the system 10 may connect multiple product testers 14 to multiple product testing projects to test different products created by different parties 12.

It should be noted that the system 10 may be implemented using a single device, or using a plurality of devices. For example, the entire system 10 may be implemented on a server in some embodiments. In other embodiments, different components of the system 10 may be implemented on different machines, or on different sets of machines. For example, in some embodiments, the input(s) 1002, the notification generator 1004, the communication interface 1008, the reply counter 1040, the comparator 1042, and the filter 1050 may be implemented using a first set of one or more devices, the testing interface generator 1100 may be implemented using a second set of one or more devices, the tracker 1300, the graphic generator 1302, and the video generator 1310 may be implemented using a third set of one or more devices, the testing monitoring module 1400 may be implemented using a fourth set of one or more devices, and the test result retrieval module 1500 and the analyzer 1502 may be implemented using a fifth set of one or more devices. A device may be a processor, a computer, a server, a database, etc.

Although the above embodiments have been described with reference to testing a product that is a web page or a web site, in other embodiments, the system and method described herein may be applied to test other products. By means of non-limiting examples, the product may be any software, any hardware, any physical device, or any computer modeling.

Also, in some embodiments, a component in the system 10 may be partially or completely implemented at a product tester's 14 device or at a device used by the first party 12 (e.g., a computer at the provider of the product being tested). For example, in some embodiments, all or a part of the testing interface generator 1100 may be implemented at a product tester's 14 device. In one implementation, a product tester may install an application provided by the second party 16 onto a device (e.g., a laptop, a desktop computer, a handheld device, etc.) of the product tester 14, which allows the device to display a testing interface in response to the product tester 14 accepting a product testing project. The same application may also be installed by multiple product testers 14.

Similarly, all or a part of the tracker 1300, all or a part of the graphic generator 1302, and/or all or a part of the video generator 1310 may be implemented at a product tester's 14 device. In one implementation, a product tester may install an application provided by the second party 16 onto a device (e.g., a laptop, a desktop computer, a handheld device, etc.) of the product tester 14, which allows the device to track an action of the product tester 14 as the product tester 14 is using the device to perform the product testing, and to generate images and/or videos capturing the action of the product tester 14. The same application may also be installed by multiple product testers 14.

As another example, all or a part of the user interface generator 1350 may be implemented at a product provider's (first party's 12) device. In one implementation, a product provider may install an application provided by the second party 16 onto a device (e.g., a laptop, a desktop computer, a handheld device, etc.) of the product provider, which allows the product provider to use its device to create product testing instruction, select product testing parameters, and provide information regarding the product that is desired to be tested. The application also allows the device at the product provider to view product testing results transmitted by the system 10. The same application may also be installed by multiple product providers 12.

Accordingly, the system 10 described herein is not limited to one or more devices associated with the second party 16, and may include one or more devices being used by the product testers 14, and/or one or more devices being used by users at the product provider (the first party 12).

Furthermore, in some embodiments, any of the components of the system 10 may be implemented using hardware, software, or a combination of hardware and software. For example, each of the items below may be implemented using a hardware, software, or a combination of both: the one or more input(s) 1002, the notification generator 1004, the communication interface 1008, the reply counter 1040, the comparator 1042, the filter 1050, the product tester management module 1080, the testing interface generator 1100, the timer 1200, the time-comparator 1202, the tracker 1300, the graphic generator 1302, the video generator 1310, the user interface generator 1350, the testing monitoring module 1400, the test result retrieval module 1500, the analyzer 1502.

Also, in some embodiments, a processor-readable medium including a set of instructions for providing one or more features described herein is provided. The instructions in the processor-readable medium, when executed by a processing unit, will cause a method for providing a product testing to be performed. The instructions may include: instruction for providing a notification to inform a plurality of product testers that a product is available for product testing, wherein the product is associated with a first party and the notification generator is associated with a second party that is not the same as the first party; instruction for receiving an electronic reply from a device being used by a first product tester of the plurality of product testers through a network, the reply indicating that the first product tester will perform the product testing; instruction for updating a reply count in response to the received electronic reply; and instruction for, in response to the electronic reply, providing a testing environment that comprises a testing interface for the first product tester, the testing interface presenting features of the product and the product testing instruction for allowing the first product tester to perform the product testing on the product based on the product testing instruction, the product testing instruction providing a plurality of tasks for testing the product.

As illustrated in the above embodiments and examples, the system 10 and the method 200 described herein are advantageous because they allow a product to be tested efficiently under multiple different testing parameters. For example, a software application may be tested under 10 different platforms by multiple product testers 14. Because the product testing may be performed by multiple product testers 14 in parallel, the user at the product provider can obtain product testing results very quickly. Also, because multiple product testers 14 can be assigned to perform each product testing (e.g., testing an application under a certain platform), the product test result being provided to the product provider can be very accurate and reliable. More importantly, the above benefits are provided for the product provider without the need for the product provider searching for qualified product testers. Accordingly, embodiments and features of the system 10 and the method 200 described herein have practical and real world utility, and they create tangible and concrete results that significantly improve the way product testing is performed.

Machine-Based Product Testing Performed by Product Testing Device

Figure 11:
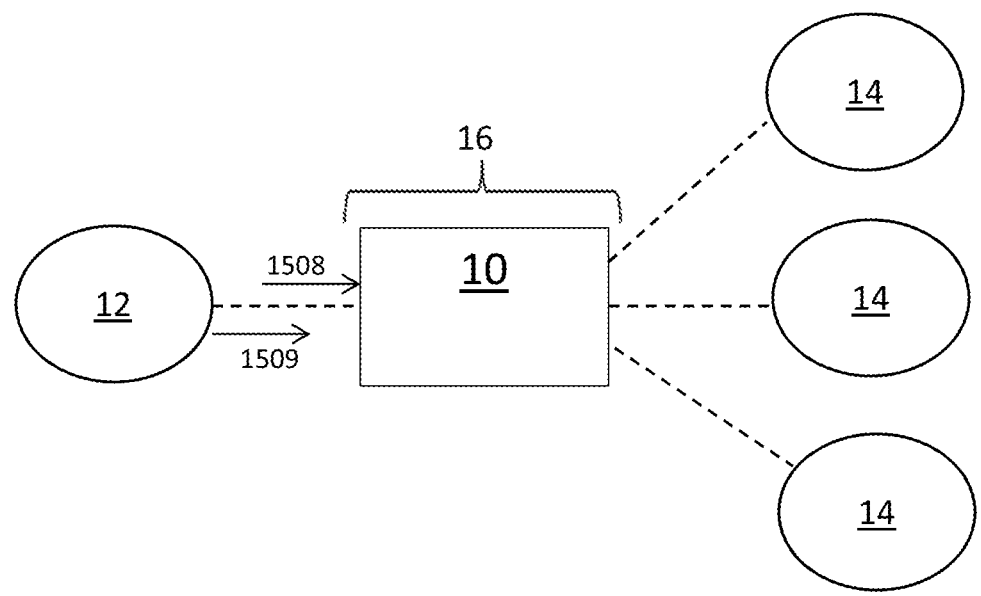
FIG. 11 illustrates a system for providing product testing.

As described in the above embodiments, the system 10 is configured to obtain a product from the party 12, and provide testing interface for allowing one or more tester(s) 14 to perform product testing on the product. In some embodiments, the system 10 may be configured to perform product testing on one or more additional product(s) without requiring any human tester 14. FIG. 11 illustrates an example of such scenario. As shown in the figure, the party 12 provides a product 1508 for product testing, and the system 10 provides testing interface for allowing one or more product testers 14 to perform product testing on the product 1508. In the illustrated example, the product being tested comprises software. Subsequent to the product testing performed by the tester(s) 14, the party 12 may update the product to create a new version of the product. The party 12 may then send the updated product (e.g., new product) 1509 to the system 10 for product testing. In some embodiments, in response to receiving a request for product testing from the party 12 to perform testing on the updated product 1509, the system may create notification 1005 to initiate another round of product testing by one or more tester(s) 14, as similarly discussed. Alternatively, in other embodiments, instead of having one or more human tester(s) 14 performing product testing on the updated product 1509, the system 10 itself may perform product testing on behalf of a human tester 14.

In one implementation, the system 10 may utilize the tracked information obtained by the tracker 1300 to perform testing of the new product 1509. The system 10 may re-execute the tracked actions of previous human tester 14 to test the new product 1509. Accordingly, while the earlier product 1508 may be tested by human tester(s) 14, a later product 1509 may be tested by the system 10. In other words, an earlier product testing (e.g., first product testing) may be human-based, and a later product testing (e.g., a second product testing) may be machine-based.

Figure 12:
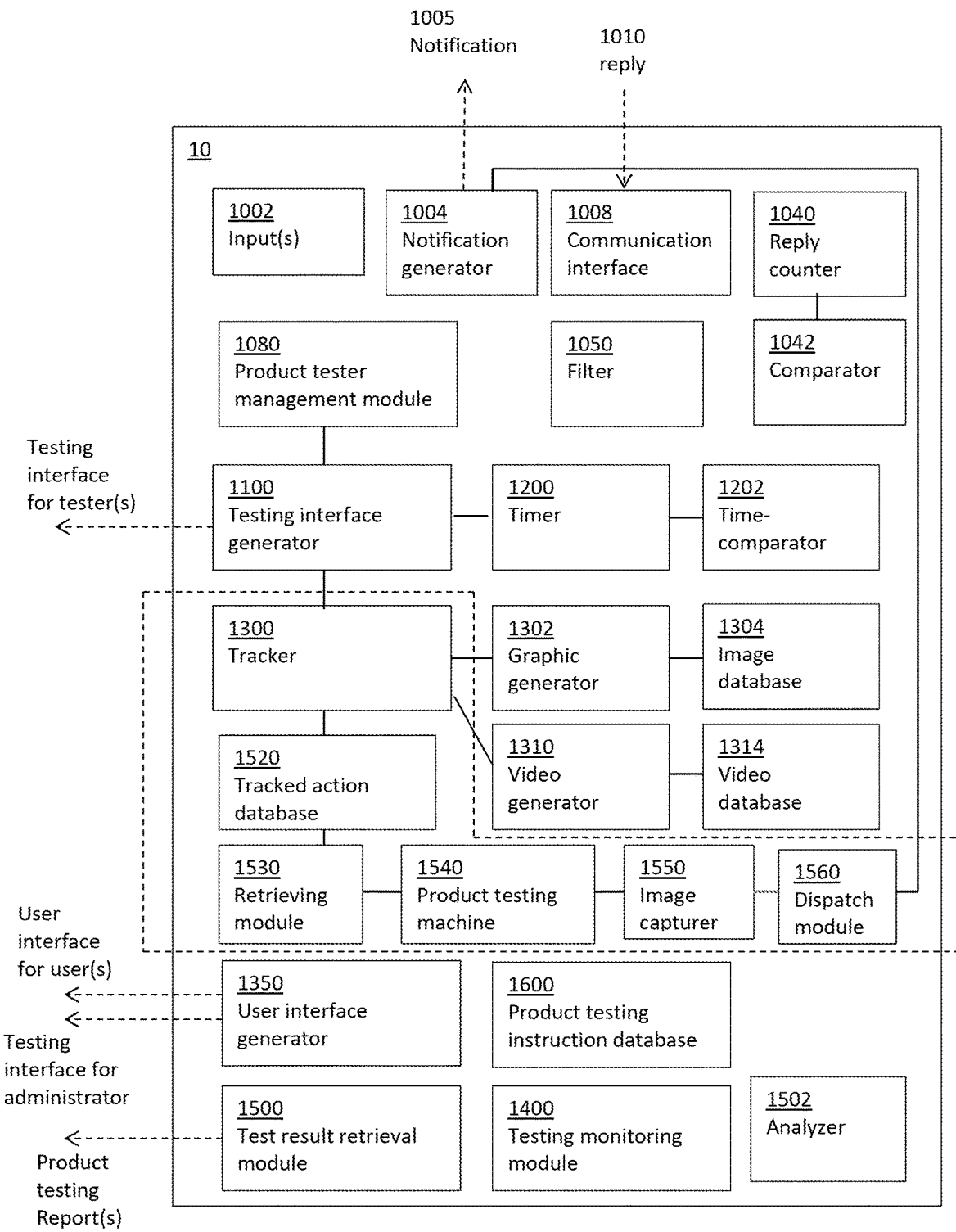
FIG. 12 illustrates an example of the system of FIG. 11.

FIG. 12 illustrates a system 10 for providing product testing, wherein the system 10 includes additional features for allowing machine-testing of products. The system 10 is the same as the system 10 of FIG. 1B, except that the system 10 also includes a non-transitory medium 1520 (e.g., a tracked action database) for storing data based on a testing of a first product, a retrieving module 130, and a product testing machine 1540. The data stored in the non-transitory medium 1520 may be data regarding one or more tracked actions of tester(s) 14 performed while testing the first product 1508. The retrieving module 1530 is configured to access an electronic file containing the data (generated based on the testing of the first product 1508) from the non-transitory medium 1520. The product testing machine 1540 is configured to perform machine-testing for the second product 1509 based on the data in the electronic file. The second product 1509 may include one or more features that are different from the first product 1508.

As shown in the figure, the non-transitory medium 1520 is coupled to the tracker 1300. As similarly discussed, the tracker 1300 is configured to track an interaction of a tester with a testing interface (e.g., testing interface 402) that presents features of a product being tested. The tracker 1300 is configured to provide data (representing tracked actions of testers 14) for storage in the non-transitory medium 1520 in a form of an electronic file, wherein the data is based on the tracked interaction of the testers 14. The tracker 1300 may configured to track a movement of a cursor operated by the tester 14. Additionally, or alternatively, the tracker 1300 may be configured to track a selection of a tab, a selection of a button, a selection of an icon, a selection of a text, or any combination of the foregoing. The tracker 1300 may also track a movement of a finger swipe, or a simulated finger swipe.

The non-transitory medium 1520 is configured to store the electronic file in association with an identity of the first product 1508. For example, the electronic file may include information regarding tracked action(s) of a tester 14 that was performed to test a feature of the first product 1508, and such electronic file is stored in the non-transitory medium 1520 in association with the identity of the first product 1508. The non-transitory medium may also store one or more additional electronic files that are associated with the identity of the first product 1508. For example, the additional electronic file may include information regarding tracked action(s) of another tester 14 that was performed to test the same feature of the same first product 1508.

In some cases, if there are multiple electronic files in the non-transitory medium 1520 that are associated with the same tested product, the retrieving module 1530 may then be configured to select one of the electronic file for use by the product testing machine 1540. For example, there may be a first electronic file having data regarding tracked actions of a first tester 14 who performed product testing on a product, and a second electronic file having data regarding tracked actions of a second tester 14 who performed product testing on the same product. In such cases, the retrieving module 1530 may be configured to select one of the electronic files in the non-transitory medium 1520 having a latest time stamp for use by the product testing machine 1540.

In some embodiments, the data in the electronic file may include information regarding tracked actions of a tester 14, and respective time stamps of the tracked actions. The product testing machine 1540 is configured to re-execute the tracked actions for performing the testing of the second product based on the information in the electronic file regarding the tracked actions of the tester 14. The time stamps allow the product testing machine 1540 to know the order of the actions to re-execute. In some embodiments, the product testing machine 1540 may be configured to re-execute the tracked actions according to the same timing of the time stamps. In other embodiments, the product testing machine 1540 may re-execute one or more of the tracked actions at timing that is different from those represented by the time stamps.

In some embodiments, the data in the electronic file are based on tracked action(s) performed using a cursor and/or a keyboard. For example, the data in the electronic file may comprise: cursor positions; a text typed by a tester; a location of the text typed by the tester, a location of an object selection; or any combination of the foregoing. The data in the electronic file may also be based on action(s) performed using a touchpad or touch screen. The tracked action(s) in the electronic file may be actions performed by a tester 14 while performing a prescribed task to test a feature of the first product 1508. If the product testing of the first product 1508 involves multiple tasks, the electronic file may include multiple sets of tracked actions for the respective tasks. Alternatively, the non-transitory medium 1520 may store multiple electronic files for respective tasks to test the first product 1508. For example, a first electronic file may contain data regarding tracked action(s) of a tester who tested a first feature of the product, and a second electronic file may contain data regarding tracked action(s) of the tester who tested a second feature of the product. In such cases, the first electronic file may be considered a first sub-file, and the second electronic file may be considered a second sub-file, wherein the first sub-file and the second sub-file are parts of a super-file that is associated with the testing of the product. Thus, as used in this specification, the term "file" may be a single file, a sub-file that is a part of a super-file, multiple sub-files, multiple files that are associated with each other, or a folder that contains multiple files or sub-files.

In some cases, the data in an electronic file stored in the non-transitory medium 1520 may have the following data structure, or may be based on data having the following data structure: (Action type; details of tracked action). The following are some examples of action type and details of tracked action:

| Action type | Details of tracked action |
|---|---|
| Cursor movement | (X1, Y1), (X2, Y2) |
| Object selection | (X1, Y1) |
| Text/key typing | (X1, Y1), Text/Key |
| Finger/simulated swipe | Swipe trajectory |

In the above examples, if a tracked action concerns cursor movement, then the associated detail of the tracked action may be a beginning position (X1, Y1) of the cursor, and an ending position (X2, Y2) of the cursor. If the tracked action concerns object selection, then the associated detail of the tracked action may be a location (X1, Y1) of the object that was selected. If the tracked action concerns text/key typing, then the associated detail of the tracked action may be a location (X1, Y1) of the text/key being typed, and the text/key being typed. If the tracked action concerns a finger/simulated swiping, then the associated detail of the tracked action may be a trajectory of the swiping. By means of non-limiting examples, the trajectory of the swiping may be a horizontal swipe, a vertical swipe, a diagonal swipe, a circular swipe, or any of other user-created swiping patterns.

In some embodiments, the electronic file retrieved by the retrieving module 1530 may comprise a script. The script may be generated by a script generator using data regarding tracked action(s) of a tester 14. For example, if the data regarding tracked action is "Text/key typing, (225, 850), Blue", the script generated based on such data may be a command or instruction prescribing that the text "Blue" be typed at the coordinate (225, 850) at a testing interface (e.g., testing interface 402) that is configured to test the product. The product testing machine 1540 is configured to run the script (which includes data based on tracked action(s) of a tester 14 while testing the first product 1508) for testing the second product 1509. The script generator may be a part of the system 10. In some cases, the script generator may be a part of the product testing machine 1540. In such cases, the product testing machine 1540 is configured to access an electronic file in the non-transitory medium 1520 that contains data representing tracked actions of a tester 14. The script generator in the product testing machine 1540 then generates a script based on the data representing the tracked actions, and the product testing machine 1540 then runs the script to perform machine-testing of the second product 1509. In other embodiments, the script generator may be implemented in the retrieving module 1530 and/or in the tracker 1300. The script generator will be described in further detail below with reference to FIG. 22, which illustrates an apparatus 2200 that may be used to implement the script generator.

In some embodiments, the script generator may be configured to consider the testing performed by multiple testers 14 (as opposed to just selecting data based on one tester 14). In particular, the script generator may be configured to examine the tracked actions from multiple testers 14, which were performed to test the same feature of the same product, and extract the commonalities to create the script. For example, when interacting with a product to test a feature of the product, a first tester 14 may perform action A, and then may wait 30 seconds before performing action B. On the other hand, a second tester 14 may perform action A, and may then 5 seconds before performing action B to accomplish the same task to test the same feature of the product. In such case, the script generator may combine or merge these two sets of data to create a script, which prescribes that action A be performed, and then action B be performed 5 seconds after action A. In this example, the script generator performs a "MIN" function to select the smallest time gap between two actions A, B. In other embodiments, the script generator may determine that the time gap between actions A, B does not affect a result of the testing. In such cases, the script generator may create a script that prescribes action A be performed, and then action B be performed immediately or 1 second after action A. In such cases, the script generator incorporate a time gap between actions A, B that is different from both the ones tracked in the first and second testers 14.

The script generator is advantageous because it converts the data representing previously tracked actions of a tester 14 into command(s) or instruction(s) executable by the product testing machine 1540 to perform machine-based product testing. In other embodiments, the system 10 may not include the script generator. Instead, the product testing machine 1540 is configured to receive data representing previously tracked actions of a tester 14, and use the data directly as input to perform a product testing on the product. In such cases, the product testing machine 1540 itself is configured to understand the data representing the tracked actions of the tester 14, and apply such data in a product testing algorithm to cause a product testing to be performed based on the data. In one implementation, the data is received by the product testing machine 1540 as input, and the product testing machine 1540 then runs an algorithm using the data to perform product testing on the second product 1509. Thus, the script generator may not be needed in some embodiments.

Returning to FIG. 12, in some embodiments, the product testing machine 1540 is configured to simulate actions of a tester 14 based on the data in the electronic file. For example, the product testing machine 1540 may be configured to virtually move a cursor with respect to a testing interface (e.g., the testing interface 402) without input from a cursor control. As another example, the product testing machine 1540 may be configured to virtually make a selection in a testing interface without input from a user control. As a further example, the product testing machine 1540 may be configured to virtually type a text in a field of a testing interface without input from a keyboard. As another example, the product testing machine 1540 may be configured to virtually create a finger/simulated swipe in a testing interface without input from a user control (e.g., touchpad, touch screen, etc.). The product testing machine 1540 may be configured to perform any combination of the foregoing to perform a product testing task.

Figure 13A:
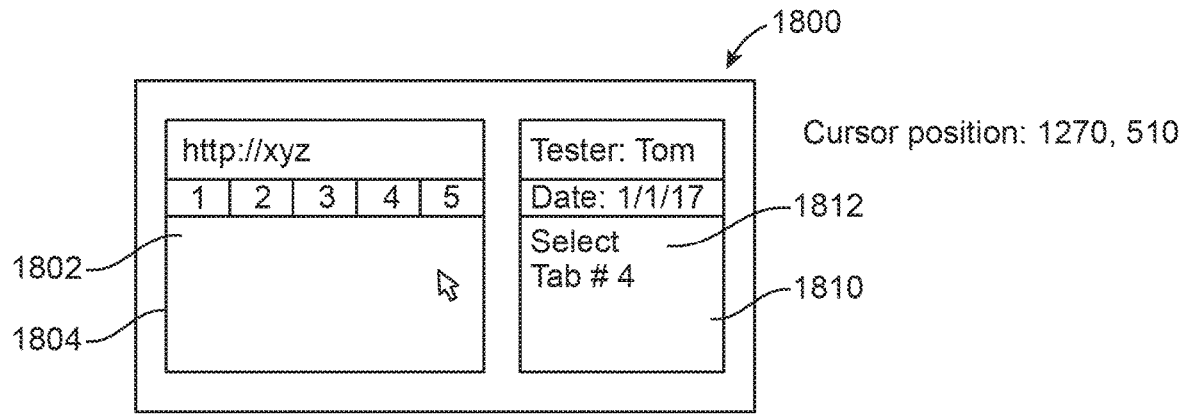
FIGS. 13A-13F illustrate an example of tracking actions of a tester performing product testing using a testing interface.
Figure 13B:
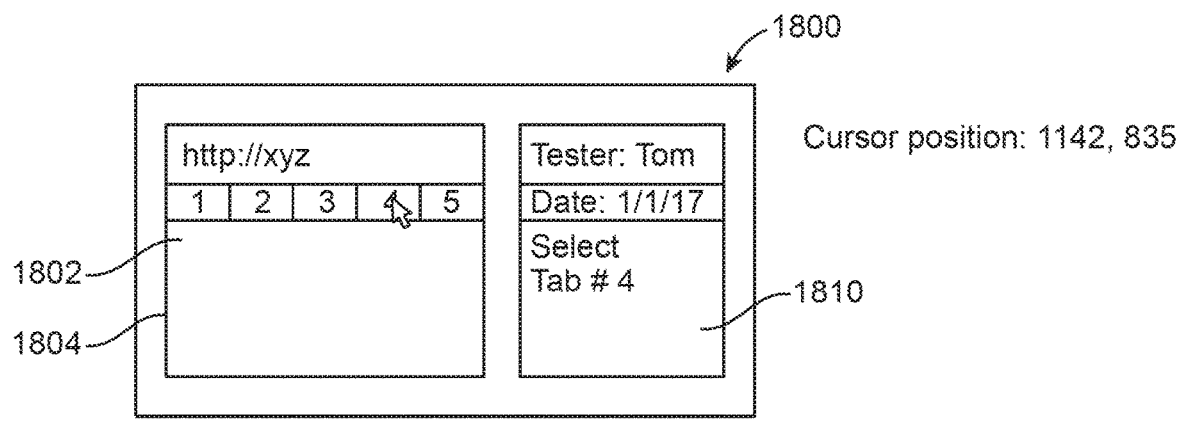
Figure 13C:
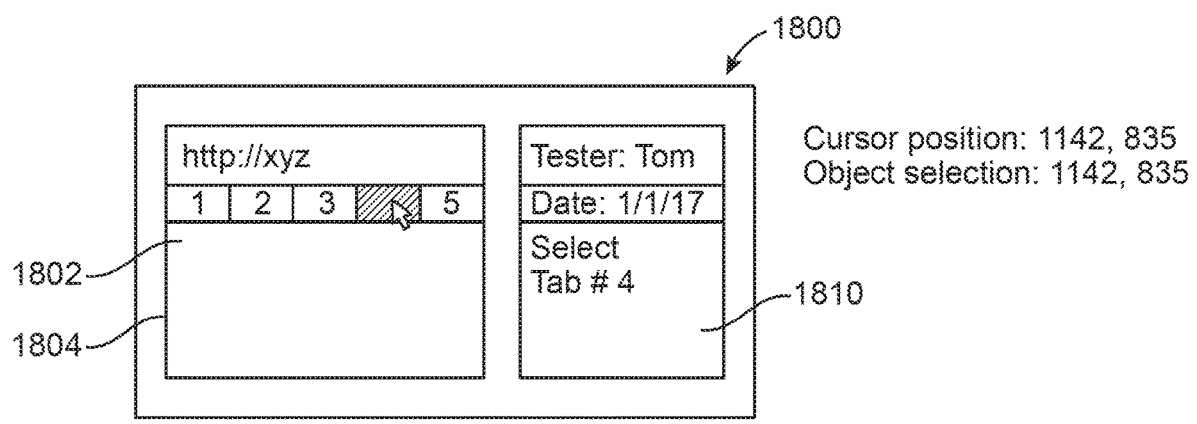
Figure 13D:
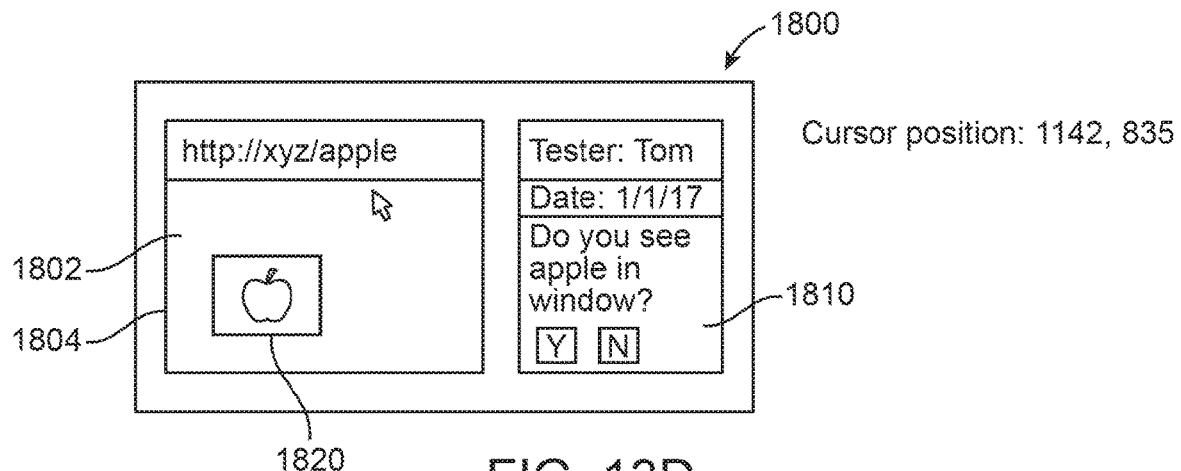
Figure 13E:
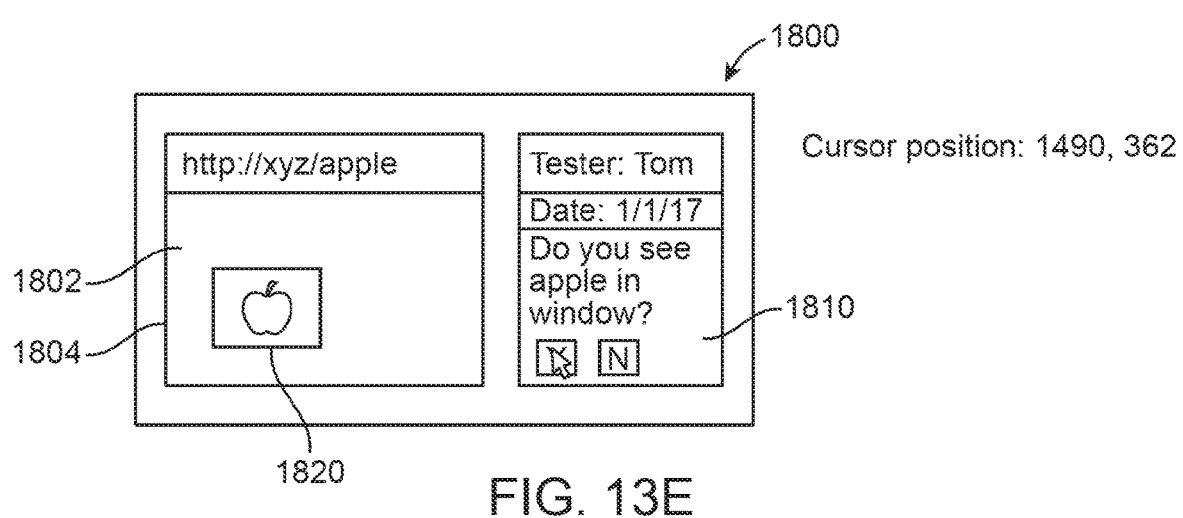
Figure 13F:
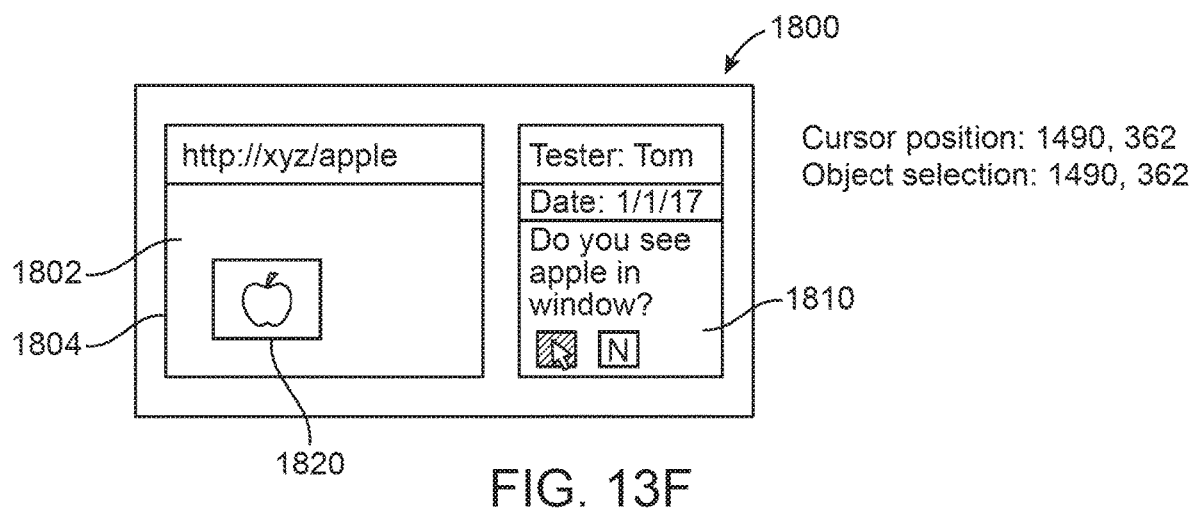

FIGS. 13A-13F illustrate an example of the above features regarding tracking actions of a tester 14 during testing of a first product, and using the tracked actions to perform machine-based product testing on a second product. As shown in FIG. 13A, the system 10 presents a testing interface 1800 for allowing a tester 14 to perform testing on a first product 1802. The first product 1802 may be the first product 108 shown in FIG. 11. The testing interface 1800 is similar to the testing interface 402 of FIG. 4. The testing interface 1800 includes a window 1804 for presenting features of the first product 1802 being tested. In the illustrated example, the first product 1802 comprises a web page. In other examples, the first product 1802 may be a web site, a computer application (e.g., an enterprise application), a mobile (e.g., handheld) device application, an application for a specialized processor, etc.

As shown in FIG. 13A, the testing interface 1800 also includes a field 1810 providing one or more tasks 1812 for the product tester 14 to perform on the first product 1802. The field 1810 may also provide a question for the tester 14 to answer in some cases. As shown in FIG. 13A, the first product 1802 being tested by the tester 14 via the testing interface 1800 includes tabs 1-5. The testing interface 1800 is configured to test the feature of tab 4 in the example. Accordingly, the testing interface 1800 provides instruction in the field 1810 to instruct the tester 14 to select tab 4. In response to the testing instruction to perform the tab 4 selection task, the tester 14 moves the cursor from the position shown in FIG. 13A to a new position shown in FIG. 13B. While the tester 14 is performing this action, the tracker 1300 of the system 10 tracks the interaction of the tester 14 with respect to the first product 1802 presented in the testing interface 1800. For example, the tracker 1300 may determine that the cursor is at position (X=1270, Y=510) in FIG. 13A, and is then moved to new position (X=1142, Y=835) in FIG. 13B. When the tester 14 selects tab 4 (shown in FIG. 13C), the tracker 1300 also tracks the selection. In the illustrated example, after the tester 14 selects tab 4, the first product 1802 presents an image 1820 of an apple (FIG. 13D), and the field 1810 of the testing interface 1800 asks the tester 14 to confirm whether he/she sees an apple. The tester 14 then answers the question by moving the cursor from the position (X=1142, Y=835) shown in FIG. 13D to a new position (X=1490, Y=362) shown in FIG. 13E. The tester 14 then clicks on the "Y" button at the cursor position (X=1490, Y=362) to confirm that the tester 14 can see the apple. While the tester 14 is performing these actions, the tracker 1300 tracks the interaction of the tester 14 with respect to the testing interface 1800. As a result of testing the feature of tab 4 in the above example, the tracker 1300 may generate the following data representing the tracked actions of the tester 14:

| No. | Action type | Details of tracked action |
|---|---|---|
| 1 | Cursor movement | (1270, 510), (1142, 835) |
| 2 | Object selection | (1142, 835) |
| 3 | Cursor movement | (1142, 835), (1490, 362) |
| 4 | Object selection | (1490, 362) |

The above data may be stored in the non-transitory medium (e.g., tracked action database) 1520 of the system 10 for later use. The data may be stored in association with the first product 1802 tested by the tester 14. The data may also be stored in association with an identity of the tester 14. Also, in some embodiments, the data may be stored in association with metadata indicating the nature of the tester interaction. For example, the above first two tracked actions (actions 1, 2) may be stored with metadata "product feature selection" indicating that the actions were performed to select a feature in the product being tested. Similarly, the last two tracked actions (actions 3, 4) in the above example may be stored with metadata "confirm feature=Y" indicating that the actions were performed to confirm a presence of a feature in the product being tested, and that the testing of the tab 4 is successful because the tester 14 confirmed the presence of the feature. Furthermore, the non-transitory medium 1520 may store the image of FIG. 13F in association with the data representing the tracked actions. This image is useful because it includes a content (e.g., image of an apple in the example) indicating a successful result of the task for testing the tab 4 feature of the first product 1802.

In other embodiments, instead of tracking cursor operations anywhere in the testing interface 1800, the tracker 1300 may be configured to track cursor operation with respect to the product itself (i.e., features in the window 1804). In such cases, the tracker 1300 does not track cursor operations in the field 1810 of the testing interfaced 1800. However, the tracker 1300 may still track other forms of tester interaction with the testing interface 1800. For example, instead of asking the tester 14 to use the cursor to select "Y" or "N" to confirm whether he/she sees an apple, the testing interface 1800 may ask the tester 14 to press key "Y" or "N" in the keyboard, or may ask the tester 14 to say "Yes" or "No". Accordingly, the tracker 1300 may be configured to track key stroke, voice input, etc. Data representing such tracked actions will then be stored in the non-transitory medium 1520.

Figure 14:
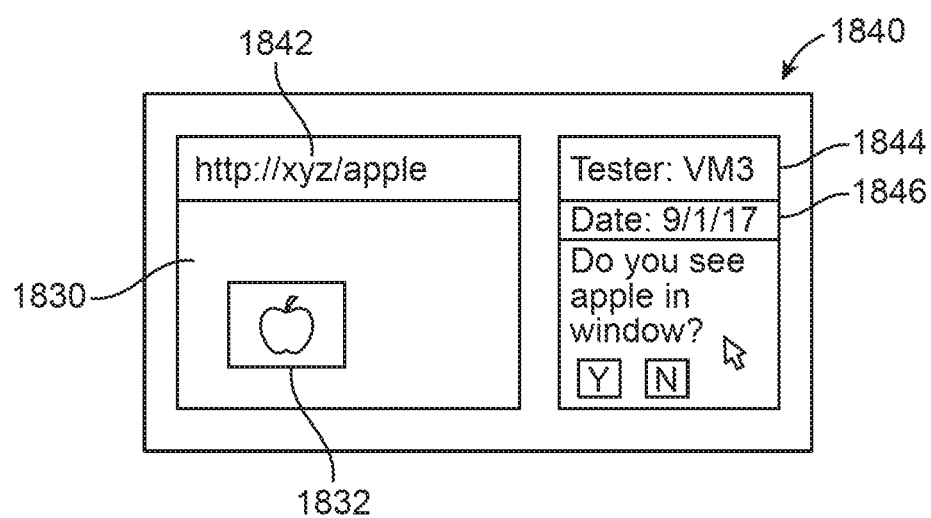
FIG. 14 illustrates an example of an interface being used by a product testing machine to perform product testing.
Figure 15:
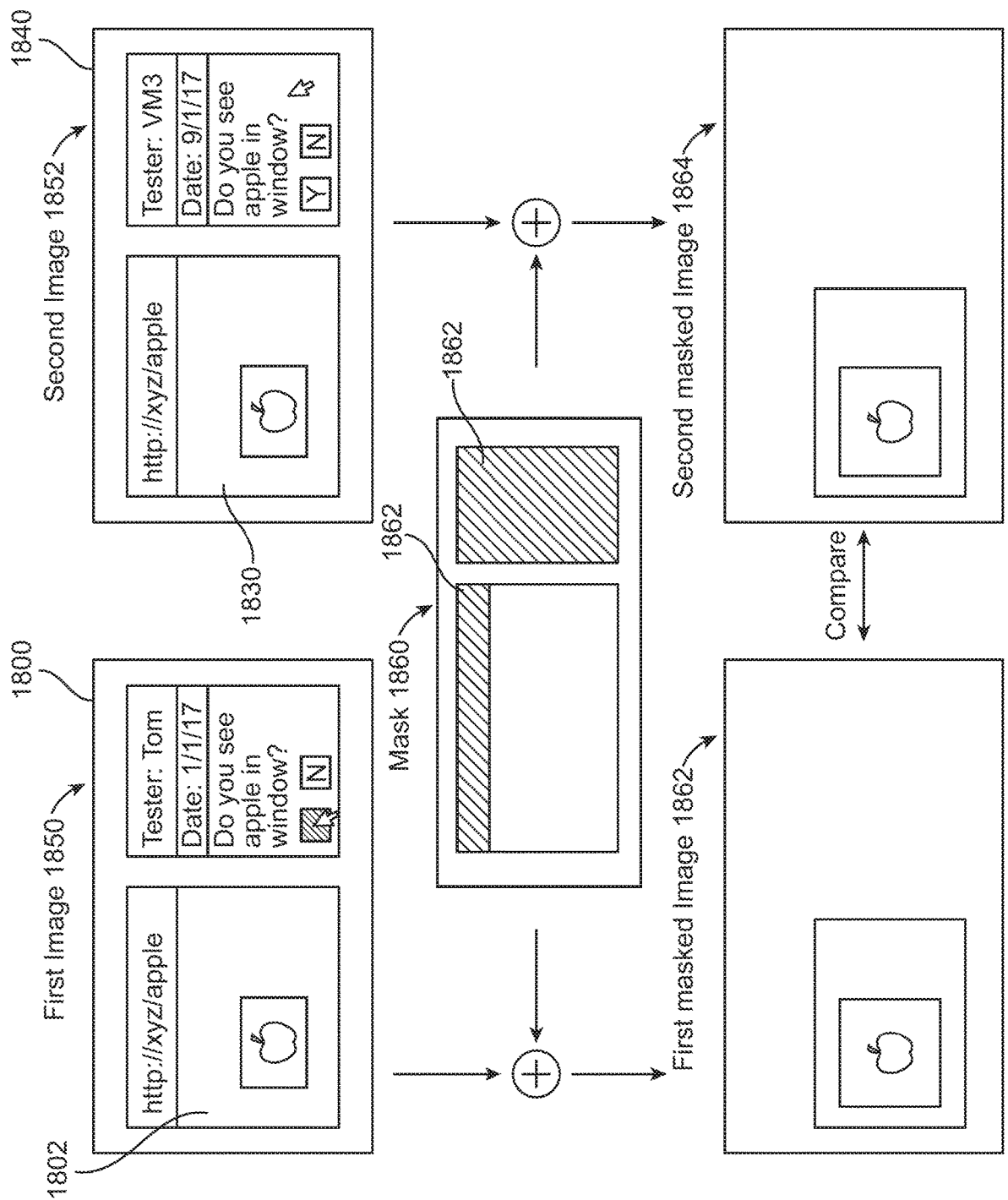
FIG. 15 illustrates an image processing technique.

After the first product 1802 has been tested, the system 10 may later receive another request to test a new product (a second product) that is an updated version of the first product 1802. When this happens, instead of having a tester 14 performing testing on the second product, the system 10 itself performs testing of the new product based on the data stored in the non-transitory medium 1520. Following the above example, the retrieving module 1530 of the system 10 access the non-transitory medium 1520 to obtain the data representing the previously tracked actions of the tester 14 performed while testing the first product 1802. The product testing machine 1540 then performs testing of the second product based on the data. In some embodiments, the data may be used to create a script that prescribes actions to be performed by the product testing machine 1540. Accordingly, the product testing machine 1540 executes the script, which causes the product testing machine 1540 to electronically operate a testing interface to test feature(s) of the second product. In particular, when testing the tab 4 feature of the second product based on the previously tracked actions (actions 1, 2 in the example), the product testing machine 1540 moves the cursor to position (1142, 835), and selects the tab 4 at the position (1142, 835). As a result of these operations by the product testing machine 1540, the second product 1830 (which may be the second product 1509 of FIG. 11) in the testing interface 1840 displays an apple in a window 1832 (FIG. 14). Because the next two tracked actions (actions 3, 4 in the example) are for confirming a presence of an object in the product to determine if the testing of the feature in the product is successful or not, the product testing machine 1540 does not repeat the tracked actions 3, 4. Instead, the product testing machine 1540 may compare the image from the testing interface 1840 obtained while the product testing machine 1540 is testing the new product 1830, with the previously saved image (i.e., the image of FIG. 13F in the example) from the testing interface obtained while the tester 14 was testing the first product 1802. FIG. 15 illustrates this concept.

As shown in FIG. 15, the product testing machine 1540 may obtain a first image 1850 that is associated with the testing of the first product 1802, and obtain a second image 1852 that is associated with the testing of the second product 1830. The first image 1850 is based on a completion of a first task (the task to test the tab 4 feature of the first product 1802 in the example) performed during the testing of the first product 1802 by the tester 14, and the second image 1852 may be based on a completion of a second task (the task to test the tab 4 feature of the second product 1830 in the example) performed during the testing of the second product 1830 by the product testing machine 1540. In the illustrated example, the first image 1850 is the same as that shown in FIG. 13F (which was previously stored after the tester 14 performs the task to test the tab 4 feature in the first product 1802), and the second image 1852 is the same as that shown in FIG. 14 (which is obtained after the product testing machine 1540 has tested the tab 4 feature in the second product 1830). Accordingly, the first image 1850 comprises a first content (e.g., the image of the apple in the above example) of a first content of the first testing interface 1800 configured for testing the first product 1802, the first content indicating a first result (e.g., a successful result) of a first task for testing the first product 1802. Also, the second image 1852 comprises a second content (e.g., the image of the apple in the above example) of a second content of the second testing interface 1840 configured for testing the second product 1830, the second content indicating a second result of a second task for testing the second product 1830.

In other embodiments, the first image 1850 may be an image of the first product 1802 without the first testing interface 1800, and the second image 1852 may be an image of the second product 1830 without the second testing interface 1840. Accordingly, the first image 1850 comprises a first content (e.g., the image of the apple in the above example) of the first product 1802, the first content indicating a first result (e.g., a successful result) of a first task for testing the first product 1802. Also, the second image 1852 comprises a second content (e.g., the image of the apple in the above example) of the second product 1830, the second content indicating a second result of a second task for testing the second product 1830.

As shown in FIG. 15, the product testing machine 1540 is also configured to apply a mask 1860 to the first image 1850 to create a first masked image 1862, apply the mask 1860 to the second image 1852 to create a second masked image 1864, and compare the first masked image 1862 with the second masked image 1864. The mask 1860 is configured to block out one or more portions of the first image 1850 and the second image 1852. The mask 1860 is advantageous because it blocks out information in the captured images 1850, 1852 that are different from each other, but are not relevant in deciding whether the testing of the product feature fails or not. For example, as shown in the testing interface 1840 of FIG. 14, the identity 1842 of the product being tested is different from that shown in FIG. 13F. Also, the tester identity 1844 in the testing interface 1840 of FIG. 14 is "VM3", indicating that the testing is being performed by virtual machine No. 3, which is also different from that shown in FIG. 13F (showing the tester being "Tom"). In other cases, the tester identity 1844 may be shown in the product itself, as opposed to being displayed in a field of the testing interface. The testing date 1846 in the testing interface 1840 of FIG. 14 is also different from that shown in FIG. 13F. The product identity 1842, the tester identity 1844, and testing date 1846 are different between the first image 1850 and the second image 1852. However, they are not relevant in deciding whether the testing of the product feature fails or not. Accordingly, the mask 1860 contains one or more regions 1862 configured to block out these items in the first image 1850 and the second image 1852. In some embodiments, if the first image 1850 includes an image of the first product 1802 (without the first testing interface 1800), and if the second image 1852 includes an image of the second product 1830 (without the second testing interface 1840), then the mask 1860 may have one or more regions 1862 configured to block out items in the image of the first product 1802, and corresponding items in the image of the second product 1830.

After the first masked image 1862 and the second masked image 1864 are obtained, the product testing machine 1540 then compares them to see if they are the same or sufficiently similar. If so, the product testing machine 1540 may then determine that the testing of the feature (e.g., the tab 4 feature in the above example) in the new product 1830 passes. On the other hand, if the comparison result indicates that the first masked image 1862 and the second masked image 1864 are not the same or not sufficiently similar, the product testing machine 1540 may then determine that the testing of the feature in the new product 1830 fails. Accordingly, the product testing machine 1540 is configured to determine whether the testing of a feature of a product fails or not based on the comparison of the first masked image 1862 and the second masked image 1864.

Various techniques may be employed in different embodiments to compare the first masked image 1862 and the second masked image 1864 with each other. In some embodiments, the product testing machine 1540 may be configured to perform cross correlation to determine a level of similarity between the first and second masked images 1862, 1864. If the level of similarity is above a certain prescribed threshold, then the product testing machine 1540 may consider the first and second masked images 1862, 1864 as being the same or sufficiently similar. The prescribed threshold may be 0.8, 0.9, 0.95, etc, or any of other user-defined number (with 1.0 representing the situation in which the masked images 1862, 1864 are identical).

In other embodiments, the product testing machine 1540 may be configured to perform an image subtraction between the first and second masked images 1862, 1864 to obtain a subtracted image. If the first and second masked images 1862, 1864 are identical, the subtracted image will have zero pixel values throughout. On the other hand, if the first and second masked images 1862, 1864 are substantially similar, the subtracted image will have some non-zero pixel values, but not a lot. In one implementation, the product testing machine 1540 may be configured to count the number of non-zero pixel values in the subtracted image. If the number is below a certain prescribed threshold, the product testing machine 1540 may consider the first and second masked images 1862, 1864 as being the same or sufficiently similar. The prescribed threshold may be 100 pixels, 80 pixels, 50 pixels, 10 pixels, etc, or any of other user-defined number. Alternatively, the prescribed threshold may be expressed as a percentage of the total number of pixels in the image. For example, the prescribed threshold may be 5% of the total pixel numbers, 3% of the total pixel numbers, 1% of the total pixel numbers, etc, or any of other user-defined percentage.

In some embodiments, in addition to, or in the alternative of, considering the number of non-zero pixel values in the subtracted image, the product testing machine 1540 may also analyze the distribution of the non-zero pixel values in the subtracted image to determine whether the first and second masked images 1862, 1864 are the same or substantially similar. If the non-zero pixel values in the subtracted image are spread out, then the product testing machine 1540 may determine that the non-zero pixel values are due to noise or due to inaccuracy in the alignment of the features in the two masked images 1862, 1864. In such cases, the two masked images 1862, 1864 may be considered as being sufficiently similar. On the other hand, if the non-zero pixel values in the subtracted image are clustered in group(s), then the product testing machine 1540 may determine that the two masked images 1862, 1864 are different or not substantially similar.

In the above example, the system 10 has been described with reference to testing a feature of the product 1830. In other embodiments, the system 10 may be configured to test multiple features of the product 1830, wherein the multiple features includes at least a first feature and a second feature. In such cases, the product testing machine 1540 may be configured to test the first feature, and the second feature. In one implementation, the product testing machine 1540 may be configured to test the first feature of the product 1830 by running a first script that is based on a first tracked action of a tester 14, and test the second feature of the product 1830 by running a second script that is based on a second tracked action of the tester 14.

Also, the above example is described with reference to testing a tab feature of a webpage. In other embodiments, the system 10 may be configured to test other features of other types of products. For example, the system 10 may test a selection of a link, a selection of a button, an input of a command, etc.

Figure 16:
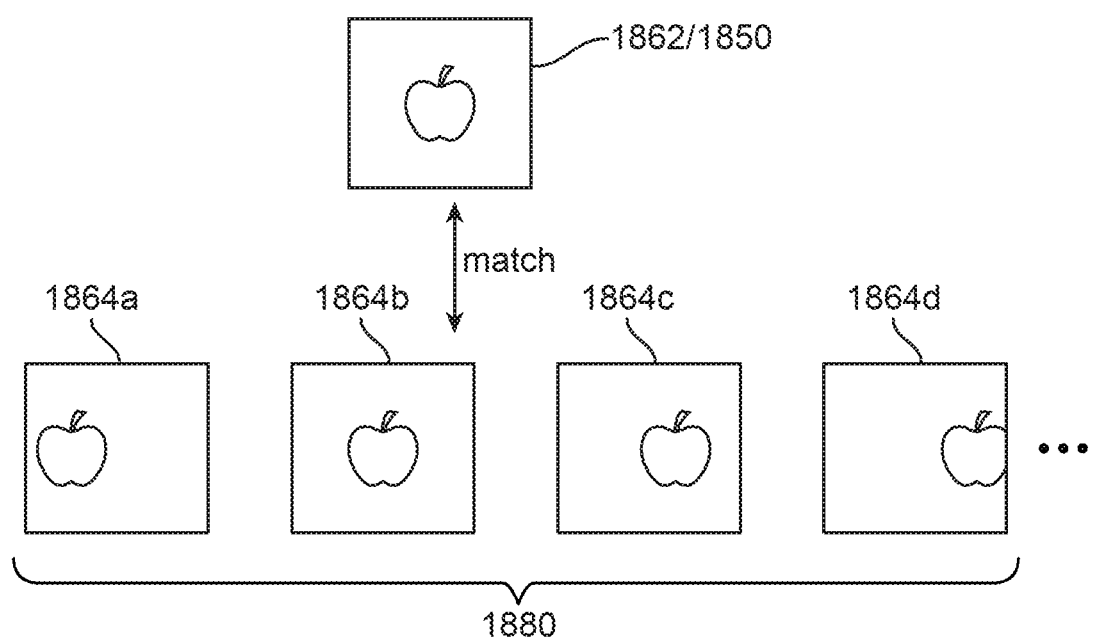
FIG. 16 illustrates a concept of image capture for image matching.

In some cases, the first image 1850 of the testing interface 1800 (that was captured during a previous testing of an earlier product 1802) may include a feature with varying configuration over time (e.g., a video, an animation, a moving object, etc.). In such cases, when the product testing machine 1540 performs machine-testing of the later product 1830, the testing interface 1840 may also include the same feature with the varying configuration—i.e., when the same stage of the testing is reached. For example, instead of being a still image, the image of the apple in the first image 1850 in the above example may be one of a plurality of image frames in a video of the first product 1802 that was captured during a testing session. In this example, the video shows a moving apple. Following this example, in order to determine whether the machine-based product testing being performed on the second product 1830 fails or not, the system 10 is configured to find an image (from a sequence of image frames in the video of the moving apple in the second product 1830) that matches the image of the apple in the first image 8150 (or in the first masked image 1862). FIG. 16 illustrates the above concept. As shown in the figure, the first image 1850/the first masked image 1862 includes the image of the apple, which is one of the image frames in the video of the moving apple. When the machine-based testing performed by the product testing machine 1540 reaches the same stage (e.g., at the page of the second product 1830 showing a video of a moving apple), the system 10 then compares the image frames in the video with the image of the apple from the first image 1850 or from the first masked image 1862. In the illustrated example, there are four image frames 1864a-1864d in the video of the moving apple in the second product 1830. Accordingly, the system 10 performs the image comparison to compare each of these four image frames 1864a-1864d with the image of the apple from the first image 1850 or first masked image 1862. As shown in the figure, image frame 1864b matches with the image of the apple associated with the first product 1802. Accordingly, the system 10 can determine that the testing of the tab 4 feature of the second product 1830 passes. In one implementation, the image capturing feature described above may be performed by an image capturer 1550 (shown in FIG. 12). The image capturer 1550 is configured to determine a second image (which may be the second image 1852 or the second masked image 1864) by comparing a sequence of image frames 1864 with the first image (which may be the first image 1850 or the first masked image 1862), and selecting one of the image frames 1864 that matches the first image as the second image. In some embodiments, the image capturer 1550 is configured to compare a region-of-interest in the first image with corresponding region-of-interest in the sequence of image frames. The image capturer 1550 is advantageous because it addresses the situation in which the stored first image 1802 (representing a success testing of a feature of the first product 1508/1802) is a part of a video or moving feature in the first product 1508/1802. As shown in the above example, the machine-based testing by the product testing machine 1540 is based on a comparison of captured images (one from human-based testing, and another one from machine-based testing). If the first captured image is from a video or a moving feature of the first product 1508/1802, then the product testing machine 1540 will need to search through image frames from the same corresponding video or moving feature in the second product 1509/1830 in order to verify whether there is an image that matches with the first image (e.g., the first image 1850/first masked image 1862).

Returning to FIG. 12, in some embodiments, the system 10 may comprise a dispatch module 1560 configured to automatically send out a request to test the second product 1830 if the testing of the feature of the second product 1830 based on the comparison of the first and second masked images 1862, 1864 fails. In some cases, the testing of the new product by the product testing machine 1540 based on previously tracked actions of a tester 14 may result in a failed testing. This is a possible scenario because an updated product may have a feature that renders a previously tracked product testing action inapplicable for testing the updated product. If the machine-based product testing fails, the dispatch module 1560 then generates a signal to cause the notification generator 1004 to send out one or more requests for product testing by one or more testers 14. The technique and features associated with product testing by testers 14 were previously described, and will not be repeated here. If the product testing by one or more testers 14 fails, the system 10 may then determine that the second product 1830 (e.g., the updated product) fails product testing (because it fails both the machine-based testing, and the human-based testing). On the other hand, if the product testing on the new product 1830 by one or more testers 14 passes, the system 10 may then determine that the new product 1830 passes product testing. In such cases, the system 10 then saves the tracked actions (the ones that results in the passing of the product testing on the new product 1830) of the tester 14 in the non-transitory medium 1520 for later use. For example, if another new product later (e.g., another updated product) is received by the system 10 for product testing, the system 10 may then retrieve the electronic file with the latest tracked tester's actions for use by the product testing machine 1540 to perform machine-based product testing on the newest product.

In the above example, the product testing machine 1540 is described as repeating a selection of an object in the second product 1830 at a location in the second product 1830 that is the same as the location in the first product 1802 (as tracked by the tracker 1300). This is because the selection of the object in the first product 1802 by the tester 14 is tracked by the tracker 1300, and it is assumed that the same object will appear in the second product 1830 when tested by the product testing machine 1540. However, in some embodiments, the object selected in the first product 1802 may appear at a different location in the second product 1830. For example, when the party 16 updates the first product 1802 to create the second product 1830, the party 16 may move the object (e.g., a tab) in the first product 1802 to another location in the second product 1830. Accordingly, in some embodiments, when the tracker 1300 tracks a selection of an object when the tester 14 tests the product, the tracker 1300 may also capture an image of the object being selected. In the above example, the tracker 1300 may capture an image of tab 4 when the tester 14 selects tab 4. The captured image of the object may then be stored in the non-transitory medium 1520 in association with the data representing the tracked action (e.g., the tracked selection of the tab 4 in the example). In one implementation, the capturing of the image of a selected object may be performed by capturing a screenshot of the product when the tester 14 selects an object, and the coordinate of the object selection, which indicates the object being selected in the screenshot. Later on, when the product testing machine 1540 performs machine-testing of the second product 1830, instead of repeating the selection of the object at the same location as that in the first product 1802, the product testing machine 1540 searches an image of the second product 1830 to look for the same object that was previously selected by the tester 14 in the first product 1802. For example, the product testing machine 1540 may perform an image search to locate the tab 4 in the second product 1830, and if the tab 4 is found, then product testing machine 1540 may then select the tab 4, regardless of whether the tab 4 is at the same position with respect to the second product 1830 as that in the first product 1802. Therefore, in other embodiments, instead of re-playing a testing action based on position (e.g., X, Y coordinates) of a previous testing action by a tester 14, the product testing machine 1540 may re-play a previously tracked testing action based on appearance of an object and/or semantics.

It should be noted that the product being tested is not limited to the example and features described herein, and that the product being tested may have other features, and/or may be of different types. By means of non-limiting examples, the product may comprise a web page, a web site, a computer application, a mobile device application, or a processor application.

It should be noted that the system 10 is not limited to have the configuration shown in FIG. 12, and that the system 10 is not limited to having the features described herein. In some embodiments, the system 10 may not include one or more of the items described with reference to FIG. 12. Also, one or more of the items described with reference to FIG. 12 may be combined in some embodiments. For example in some embodiments, the retrieving module 1530 and the product testing machine 1540 may be integrated. In such cases, the retrieving module 1530 may be one or more inputs, or one or more input interfaces, of a processing unit, wherein the processing unit may implement, or may be a part of, the product testing machine 1540. In addition, in some embodiments, the product testing machine 1540 may be a processing unit, or a part of a processing unit. Such processing unit may also be used to implement the tracker 1300, the retrieving module 1530, the image capturer 1550, the dispatch module 1560, or any combination of the foregoing. Alternatively, such processing unit may be communicatively coupled to the tracker 1300, the retrieving module 1530, the image capturer 1550, the dispatch module 1560, or any combination of the foregoing. Furthermore, in some embodiments, the electronic product testing system 10 may include only the product testing machine 1540. In other embodiments, the electronic product testing system 10 may not include the user interface generator 1350, the product testing instruction database 1600, the test result retrieval module 1500, the testing monitoring module 1400, the analyzer 1502, or any combination of the foregoing. Also, in some embodiments, the electronic product testing system 10 may not include one or more items that are outside the dashed-box in FIG. 12. In still further embodiments, the non-transitory medium 1520 may be excluded from the system 10. In such cases, the system 10 is communicatively coupled to the non-transitory medium 1520 (e.g., via the Internet, a cable, or any of other types of network connection). Furthermore, in other embodiments, the product testing machine 1540 may be considered as a testing device. Such testing device may optionally include the image capturer 1550 and/or the dispatch module 1560. Also, such testing device may include a processing unit for providing one or more features described herein.

Figure 17:
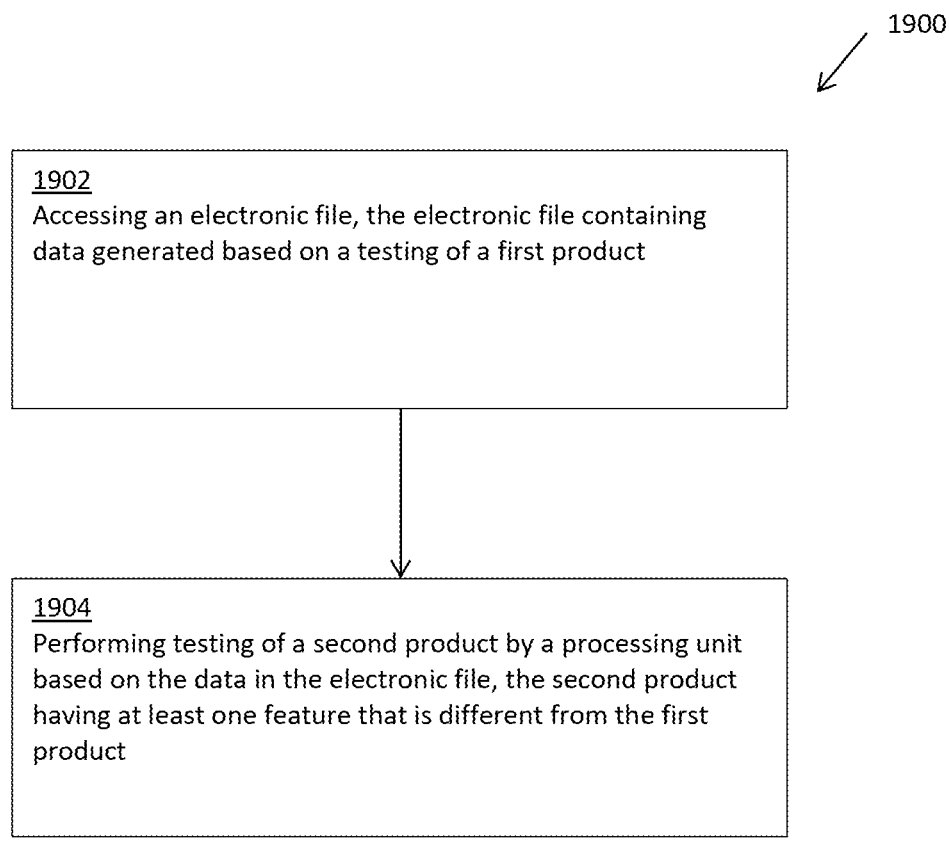
FIG. 17 illustrates a method for providing product testing.

FIG. 17 illustrates a method 1900 in accordance with some embodiments. The method 1900 is a processor-implemented method for product testing. The method 1900 may be performed by the system 10 of FIG. 12. As shown in the figure, the method 1900 includes accessing an electronic file, the electronic file containing data generated based on a testing of a first product (item 1902); and performing testing of a second product by a processing unit based on the data in the electronic file (item 1904). The second product may have at least one feature that is different from the first product. The first product may be the first product 1802 described in the previous example, and the second product may be the second product 1830 described in the previous example.

In some embodiments, with respect to the method 1900, the data in the electronic file comprises information regarding tracked actions of a tester, and respective time stamps of the tracked actions.

In some embodiments, with respect to the method 1900, the act of performing the testing of the second product comprises re-executing the tracked actions to test the second product based on the information in the electronic file regarding the tracked actions of the tester.

In some embodiments, with respect to the method 1900, the act of performing the testing of the second product comprises simulating actions of a tester.

In some embodiments, with respect to the method 1900, the electronic file comprises a script, and wherein the act of performing the testing of the second product comprises running the script for testing the second product.

In some embodiments, with respect to the method 1900, the data in the electronic file are based on tracked action(s) performed using a cursor and/or a keyboard.

In some embodiments, with respect to the method 1900, the data in the electronic file comprises: cursor positions; a text typed by a tester; a location of the text typed by the tester, a location of an object selection; or any combination of the foregoing.

In some embodiments, with respect to the method 1900, the electronic file is stored in a non-transitory medium in association with an identity of the first product.

In some embodiments, with respect to the method 1900, the non-transitory medium also stores one or more additional electronic files that are associated with the identity of the first product.

In some embodiments, with respect to the method 1900, the act of accessing the electronic file comprises selecting one of the electronic files in the non-transitory medium having a latest time stamp.

In some embodiments, the method 1900 may further include: obtaining a first image that is associated with the testing of the first product, and obtaining a second image that is associated with the testing of the second product.

In some embodiments, with respect to the method 1900, the first image is based on a completion of a first task performed during the testing of the first product, and wherein the second image is based on a completion of a second task performed during the testing of the second product.

In some embodiments, with respect to the method 1900, the first image comprises a first content of a first testing interface configured for testing the first product, the first content indicating a first result of a first task for testing the first product; and wherein the second image comprises a second content of a second testing interface configured for testing the second product, the second content indicating a second result of a second task for testing the second product.

In some embodiments, the method 1900 may further include: applying a mask to the first image to create a first masked image, applying the mask to the second image to create a second masked image, and comparing the first masked image with the second masked image.

In some embodiments, with respect to the method 1900, the mask is configured to block out one or more portions of the first image and the second image.

In some embodiments, with respect to the method 1900, the testing of the second product comprises testing a feature of the second product, and wherein the method further comprising determining whether the testing of the feature of the second product fails or not based on the comparison of the first masked image and the second masked image.

In some embodiments, the method 1900 may further include automatically sending out a request to test the second product if the testing of the feature of the second product based on the comparison of the first and second masked images fails.

In some embodiments, with respect to the method 1900, the processing unit is configured to test multiple features of the second product, the multiple features comprising at least a first feature and a second feature, wherein the act of performing testing of the second product comprises testing the first feature of the second product by running a first script that is based on a first tracked action of a tester, and testing the second feature of the second product by running a second script that is based on a second tracked action of the tester.

In some embodiments, the method 1900 may further include determining the second image by comparing a sequence of image frames with the first image, and selecting one of the image frames that matches the first image as the second image.

In some embodiments, the method 1900 may further include tracking an interaction of a tester with a web page, wherein the data in the electronic file is based on the tracked interaction.

In some embodiments, with respect to the method 1900, the act of tracking comprises tracking a movement of a cursor operated by the tester.

In some embodiments, with respect to the method 1900, the act of tracking comprises tracking a selection of a tab, a selection of a button, a selection of an icon, a selection of a text, or any combination of the foregoing.

In some embodiments, with respect to the method 1900, the first product comprises a web page, a web site, a computer application, a mobile device application, or a processor application.

In some embodiments, with respect to the method 1900, the act of performing the testing of the second product comprises virtually moving a cursor with respect to a testing interface without input from a cursor control.

In some embodiments, with respect to the method 1900, the act of performing the testing of the second product comprises virtually making a cursor selection in a testing interface without input from a cursor control.

In some embodiments, with respect to the method 1900, the act of performing the testing of the second product comprises virtually typing a text in a field of a testing interface without input from a keyboard.

In some embodiments, with respect to the method 1900, the testing of the first product is human-based, and the testing of the second product is machine-based.

In some embodiments, the method 1900 may be performed in response to a processing unit processing a set of instructions stored in a processor-readable medium. In particular, the processor-readable medium includes a set of instructions, wherein an execution of the instructions by a processing unit will cause a method for product testing to be performed, the method comprising: accessing an electronic file, the electronic file containing data generated based on a testing of a first product; and performing testing of a second product based on the data in the electronic file, the second product having at least one feature that is different from the first product.

Figure 18:
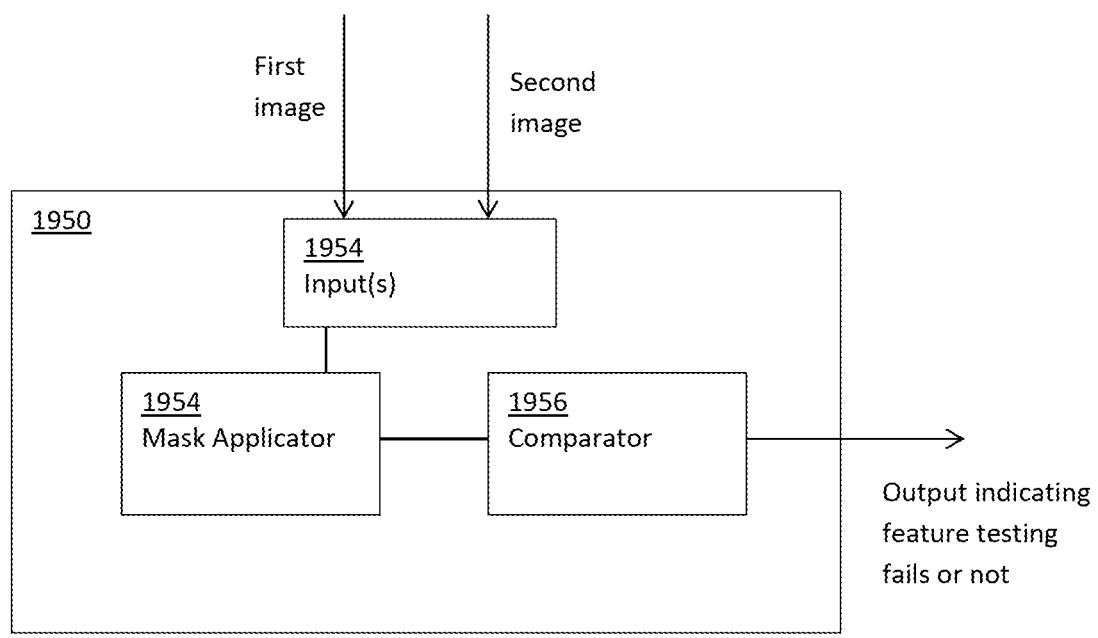
FIG. 18 illustrates a component of a product testing system.

As discussed, the product testing machine 1540 is configured to compare two masked images to determine whether they are the same or substantially similar, and if so, the product testing machine 1540 may then determine that the machine-based testing performed to test the feature of the new product passes. FIG. 18 illustrates an apparatus 1950, which is a component of an electronic product testing system, wherein the component is configured to provide the above features. The component 1950 may be a processing unit. Also, in some embodiments, the apparatus 1950 itself may be considered as a product testing device/system, or a component of a product testing device/system. In addition, in some embodiments, the apparatus 1950 may be implemented as a part of the product testing machine 1540, or as a module that is communicatively coupled to the product testing machine 1540. As shown in the figure, the apparatus 1950 includes one or more input(s) 1954 configured to obtain a first image that is associated with a testing of the first product, and to obtain a second image that is associated with a testing of the second product, wherein the testing of the second product comprises a testing of a feature of the second product. The apparatus 1950 also includes a mask applicator 1954 configured to apply a mask to the first image to create a first masked image, and to apply the mask to the second image to create a second masked image. The apparatus 1950 also includes a comparator 1956 configured to compare the first masked image with the second masked image to determine whether the testing of the feature of the second product fails or not. In some embodiments, the first image may be the image 1850 of FIG. 15, and the second image may be the image 1852 of FIG. 15. Also, the mask may be the mask 1860 of FIG. 15.

The mask is configured to block out one or more portions of the first image and the second image.

In some embodiments, the first image is based on a completion of a first task performed during the testing of the first product, and wherein the second image is based on a completion of a second task performed during the testing of the second product.

In some embodiments, the first image comprises a first content of a first testing interface configured for testing the first product, the first content indicating a first result of a first task for testing the first product; and wherein the second image comprises a second content of a second testing interface configured for testing the second product, the second content indicating a second result of a second task for testing the second product.

In some embodiments, the apparatus 1950 may further include an image capturer configured to determine the second image by comparing a sequence of image frames with the first image, and selecting one of the image frames that matches the first image as the second image.

Figure 19:
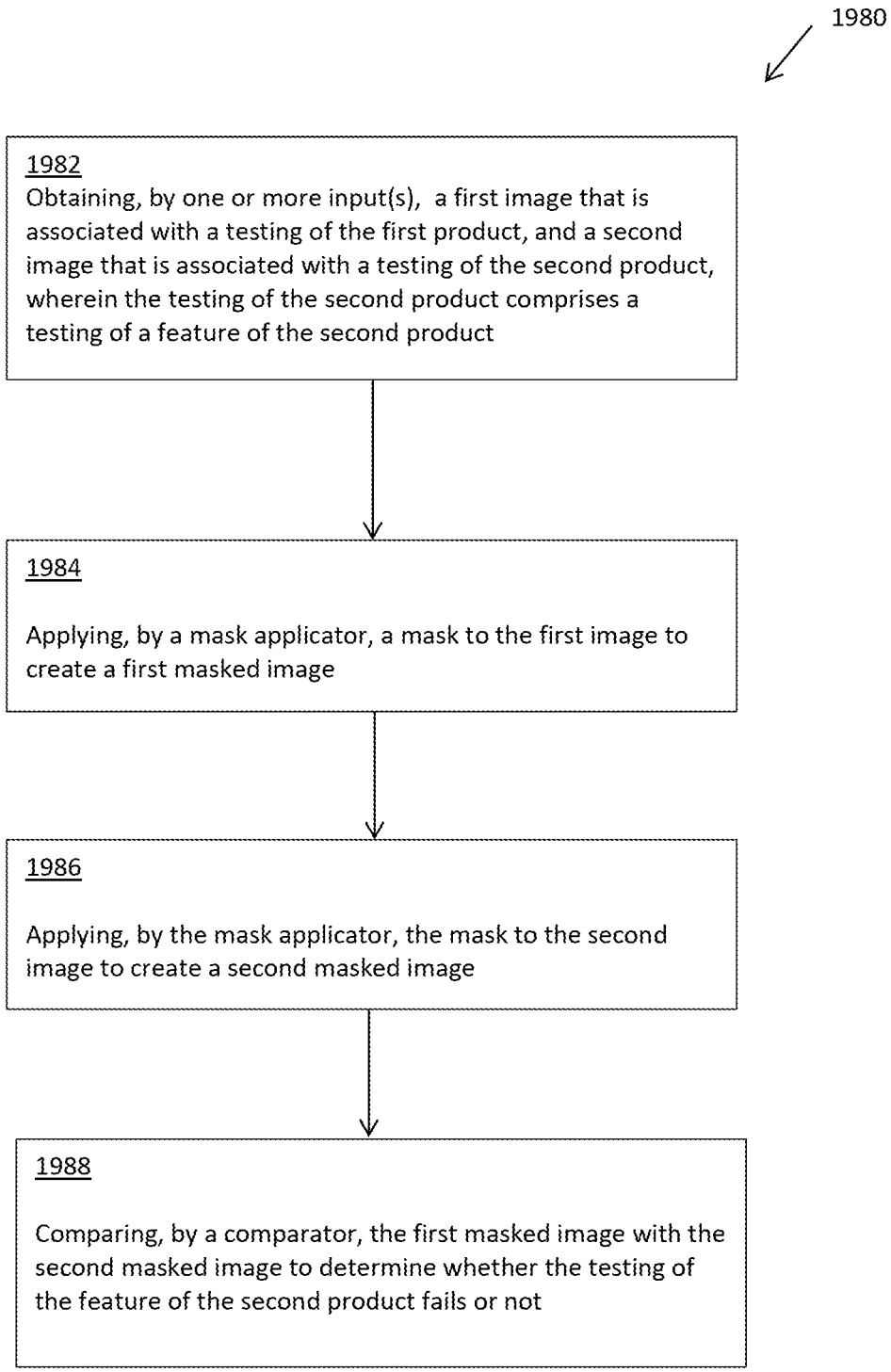
FIG. 19 illustrates a method for use in product testing.

FIG. 19 illustrates a method 1980 in accordance with some embodiments. The method 1980 is a processor-implemented method for product testing. The method 1980 may be performed by the system 10 of FIG. 12. In one implementation, the method 1980 may be performed by the apparatus 1950 of FIG. 18. As shown in the figure, the method 1980 includes: obtaining, by one or more input(s), a first image that is associated with a testing of the first product, and a second image that is associated with a testing of the second product, wherein the testing of the second product comprises a testing of a feature of the second product (item 1982). The method 1980 also includes: applying, by a mask applicator, a mask to the first image to create a first masked image (item 1984). The method 1980 also includes: applying, by the mask applicator, the mask to the second image to create a second masked image (item 1986). The method 1980 further includes: comparing, by a comparator, the first masked image with the second masked image to determine whether the testing of the feature of the second product fails or not (item 1988). The first product may be the first product 1802 described in the previous example, and the second product may be the second product 1830 described in the previous example.

In some embodiments, with respect to the method 1980, the first image is based on a completion of a first task performed during the testing of the first product, and wherein the second image is based on a completion of a second task performed during the testing of the second product.

In some embodiments, with respect to the method 1980, the first image comprises a first content of the first product, the first content indicating a first result of a first task for testing the first product; and wherein the second image comprises a second content of the second product, the second content indicating a second result of a second task for testing the second product.

In some embodiments, with respect to the method 1980, the mask is configured to block out one or more portions of the first image and the second image.

In some embodiments, the method 1980 further includes determining, by an image capturer, the second image by comparing a sequence of image frames with the first image, and selecting one of the image frames that matches the first image as the second image.

In some embodiments, the method 1980 may be performed in response to a processing unit processing a set of instructions stored in a processor-readable medium. In particular, the processor-readable medium includes a set of instructions, wherein an execution of the instructions by a processing unit will cause a method for product testing to be performed, the method comprising: obtaining, by one or more input(s), a first image that is associated with a testing of the first product, and a second image that is associated with a testing of the second product, wherein the testing of the second product comprises a testing of a feature of the second product; applying, by a mask applicator, a mask to the first image to create a first masked image; applying, by the mask applicator, the mask to the second image to create a second masked image; and comparing, by a comparator, the first masked image with the second masked image to determine whether the testing of the feature of the second product fails or not.

Mask Generator

Figure 20:
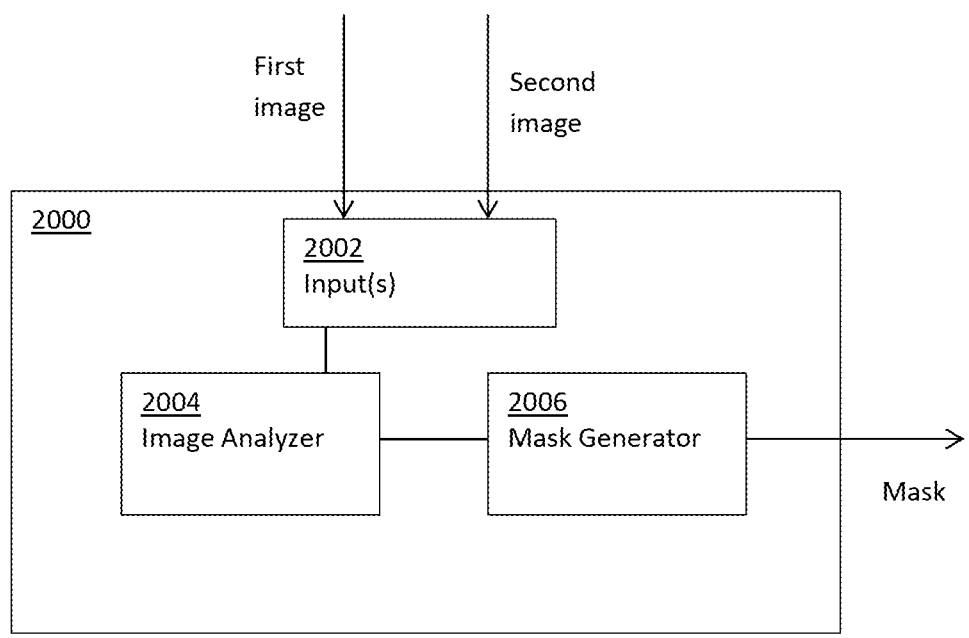
FIG. 20 illustrates a component of a product testing system.

As discussed, the product testing machine 1540 is configured to compare two masked images to determine whether they are the same or substantially similar, and if so, the product testing machine 1540 may then determine that the machine-based testing performed to test the feature of the new product passes. In some embodiments, the system 10 may further include a component configured to generate the mask. FIG. 20 illustrates an apparatus 2000, which is a component of an electronic product testing system, wherein the component is configured to create a mask for masking one or more images of different products obtained during testing of the products. The component 2000 may be a processing unit. Also, in some embodiments, the apparatus 2000 itself may be considered as a component of a product testing device. In addition, in some embodiments, the apparatus 2000 may be implemented as a part of the product testing machine 1540, or as a module that is communicatively coupled to the product testing machine 1540. As shown in the figure, the apparatus 2000 includes: one or more input(s) 2002 configured to receive a first image of a product captured during a first testing of the product, and a second image of the product captured during a second testing of the product. The apparatus 2000 also includes an image analyzer 2004 configured to determine a first part of the product that is different in the first image and the second image. The apparatus 2000 also includes a mask generator 2006 configured to create a mask for covering an image of the first part of the product.

Optionally, the first testing of the product is associated with a first tester, and the second testing of the product is associated with a second tester.

Optionally, the image analyzer 2004 is configured to perform an image subtraction based on the first image and the second image to obtain a subtracted image.

Optionally, the image analyzer 2004 is configured to analyze a distribution of non-zero pixel values in the subtracted image.

Optionally, the mask generator 2006 is configured to create the mask based on a result of the analysis of the distribution of the non-zero pixel values in the subtracted image.

Optionally, the image analyzer 2004 is configured to determine a second part of the product that is different in the first image and the second image, and wherein the mask generator 2006 is configured to create the mask for also covering the image of the second part of the product.

Optionally, the apparatus 2000 further includes a non-transitory medium configured to store the mask in association with an identity of the product.

Figure 21:
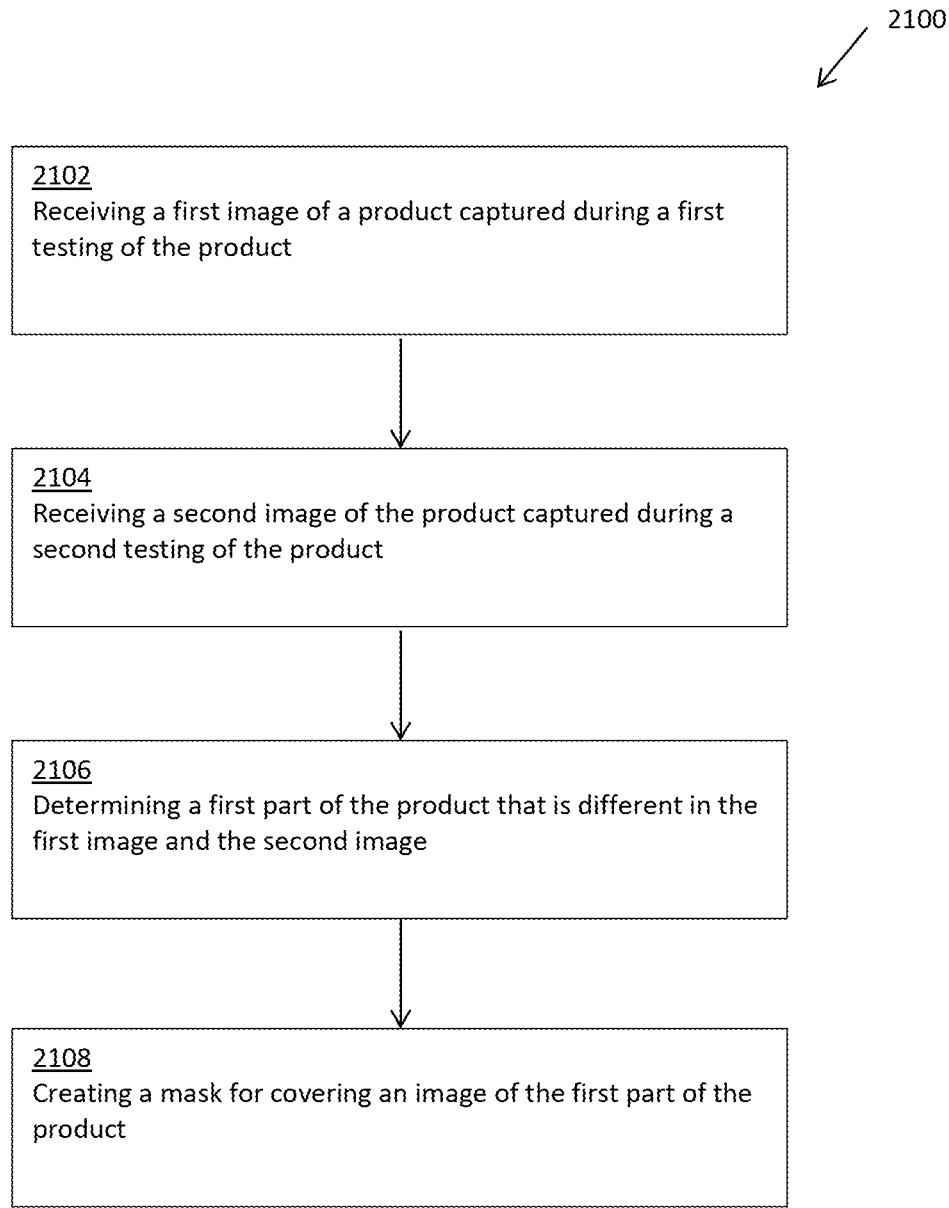
FIG. 21 illustrates a method for use in product testing.

FIG. 21 illustrates a method 2100 in accordance with some embodiments. The method 2100 is a processor-implemented method for product testing. The method 2100 may be performed by the system 10 of FIG. 12. In one implementation, the method 2100 may be performed by the apparatus 2000 of FIG. 20. As shown in the figure, the method 2100 includes: receiving a first image of a product captured during a first testing of the product (item 2102); receiving a second image of the product captured during a second testing of the product (item 2104); determining a first part of the product that is different in the first image and the second image (item 2106); and creating a mask for covering an image of the first part of the product (item 2108).

In some embodiments, with respect to the method 2100, the first testing of the product is associated with a first tester, and the second testing of the product is associated with a second tester.

In some embodiments, with respect to the method 2100, the act of determining the first part of the product that is different in the first image and the second image comprises performing an image subtraction based on the first image and the second image to obtain a subtracted image.

In some embodiments, with respect to the method 2100, the act of determining the first part of the product that is different in the first image and the second image also comprises analyzing a distribution of non-zero pixel values in the subtracted image.

In some embodiments, with respect to the method 2100, the mask is created based on a result of the analysis of the distribution of the non-zero pixel values in the subtracted image.

In some embodiments, the method 2100 may further include determining a second part of the product that is different in the first image and the second image, and wherein the mask is created for also covering the image of the second part of the product.

In some embodiments, the method 2100 may further include storing the mask in a non-transitory medium in association with an identity of the product.

In some embodiments, the method 2100 may be performed in response to a processing unit processing a set of instructions stored in a processor-readable medium. In particular, the processor-readable medium includes a set of instructions, wherein an execution of the instructions by a processing unit will cause a method for to be performed, the method comprising: receiving a first image of a product captured during a first testing of the product; receiving a second image of the product captured during a second testing of the product; determining a first part of the product that is different in the first image and the second image; and creating a mask for covering an image of the first part of the product.

Script Generator

Figure 22:
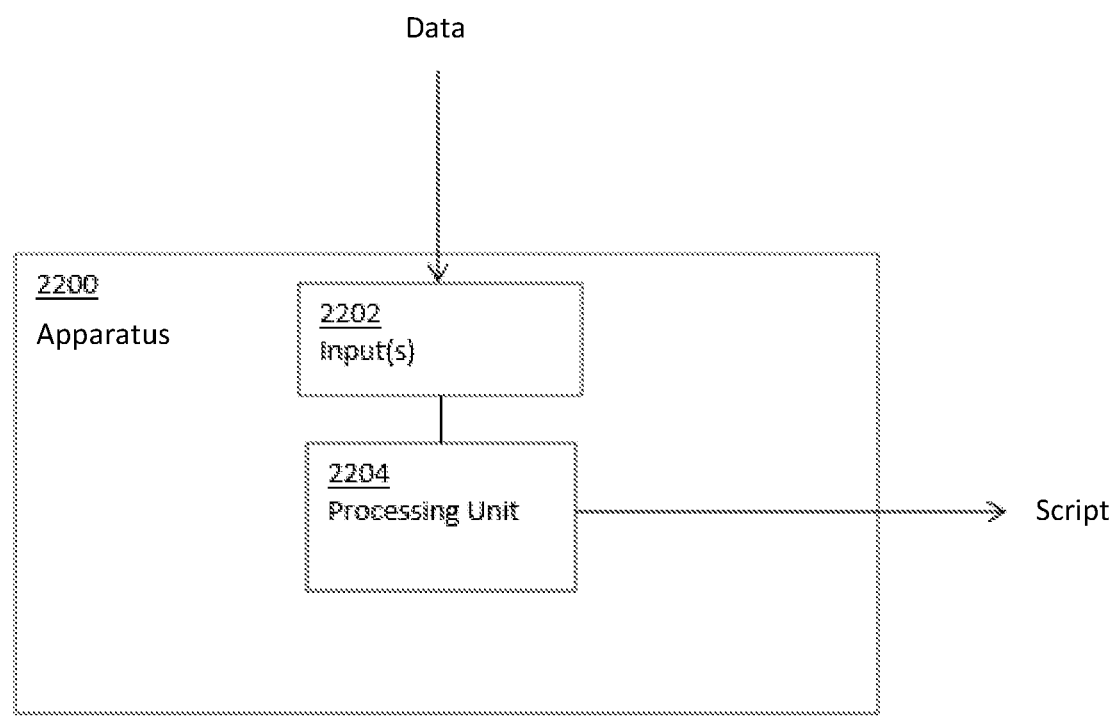
FIG. 22 illustrates a component of a product testing system.

As discussed, in some embodiments, the product testing machine 1540 is configured perform machine-based product testing based on a script, wherein the script is based on a previous testing performed by a tester. In some embodiments, the system 10 may further include a component configured to generate the script. FIG. 22 illustrates an apparatus 2200, which is a component of an electronic product testing system, wherein the component is configured to create a script for execution by a product testing device. The component 2200 may be a processing unit. Also, in some embodiments, the apparatus 2200 itself may be considered as a component of a product testing device. In addition, in some embodiments, the apparatus 2200 may be implemented as a part of the product testing machine 1540, or as a module that is communicatively coupled to the product testing machine 1540. As shown in the figure, the apparatus 2200 includes: an input 2202 configured to receive first data regarding a first tracked action performed while testing a first product; and a processing unit 2204 configured to create a script based on the first data, wherein the script is electronically executable by a product testing machine to perform machine-testing of a second product, the second product having at least one feature that is different from the first product.

Optionally, the apparatus is a part of the product testing machine.

Optionally, the input 2202 is also configured to receive second data regarding a second tracked action performed while testing the first product, and wherein the processing unit 2204 is configured to create the script based also on the second data.

Optionally, the first tracked action was for testing a first feature of the first product, and the second tracked action was for testing a second feature of the first product.

Optionally, the first tracked action was for testing a feature of the first product by a first tester, and the second tracked action was for testing the feature of the first product by a second tester.

Optionally, the first data indicates a first period between the first tracked action and another tracked action performed by the first tester while testing the feature of the first product; wherein the second data indicates a second period between the second tracked action and another tracked action performed by the second tester while testing the feature of the first product; and wherein the processing unit 2204 is configured to select a shorter one of the first period and the second period for inclusion in the script.

Optionally, the first data is stored in a first file, the second data is stored in a second file, and wherein the processing unit is configured to create the script by combining the first data and the second data.

Optionally, the apparatus 2200 further includes a non-transitory medium configured to store the script for access by the product testing machine.

Optionally, the first tracked action comprises a tracked cursor movement, a tracked object selection, a typing of a text, an inputting of a key, or an outputting of a voice.

Figure 23:
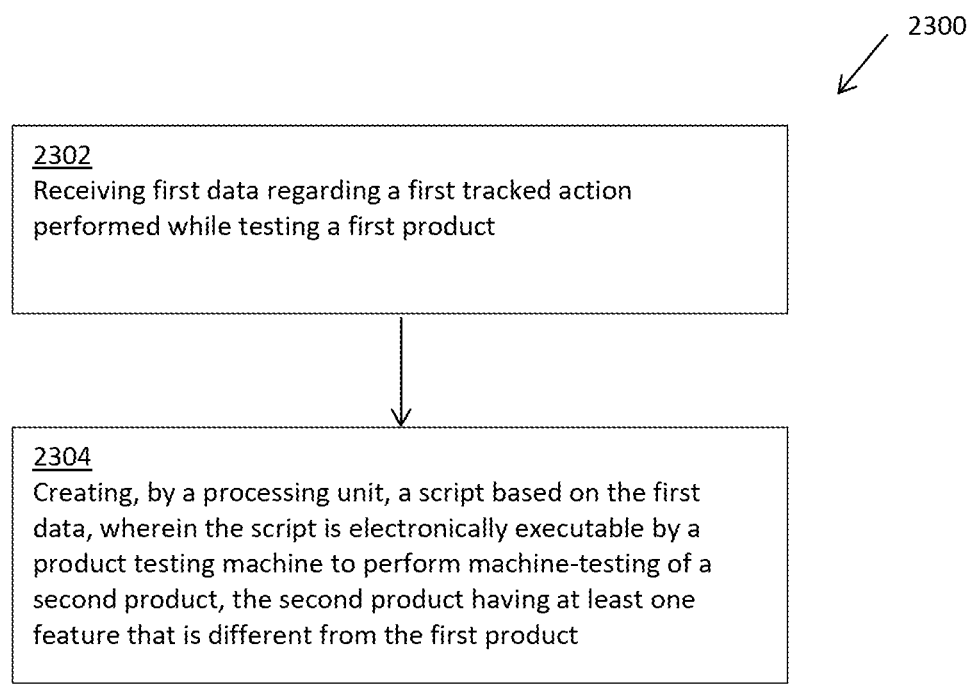
FIG. 23 illustrates a method for use in product testing.

FIG. 23 illustrates a method 2300 in accordance with some embodiments. The method 2300 is a processor-implemented method for product testing. In particular, the method 2300 is for creating a script for execution by a product testing machine to perform machine-based product testing. The method 2300 may be performed by the system 10 of FIG. 12. In one implementation, the method 2300 may be performed by the apparatus 2200 of FIG. 22. As shown in the figure, the method 2300 includes: receiving first data regarding a first tracked action performed while testing a first product (item 2302); and creating, by a processing unit, a script based on the first data (item 2304). The script is electronically executable by a product testing machine (e.g., product testing machine 1540) to perform machine-testing of a second product, the second product having at least one feature that is different from the first product.

In some embodiments, with respect to the method 2300, the processing unit is a part of the product testing machine.

In some embodiments, the method 2300 may further include receiving second data regarding a second tracked action performed while testing the first product, and wherein the script is created based also on the second data.

In some embodiments, with respect to the method 2300, the first tracked action was for testing a first feature of the first product, and the second tracked action was for testing a second feature of the first product.

In some embodiments, with respect to the method 2300, the first tracked action was for testing a feature of the first product by a first tester, and the second tracked action was for testing the feature of the first product by a second tester.

In some embodiments, with respect to the method 2300, the first data indicates a first period between the first tracked action and another tracked action performed by the first tester while testing the feature of the first product; wherein the second data indicates a second period between the second tracked action and another tracked action performed by the second tester while testing the feature of the first product; and wherein the method further comprises selecting a shorter one of the first period and the second period for inclusion in the script.

In some embodiments, with respect to the method 2300, the first data is stored in a first file, the second data is stored in a second file, and wherein the script is created by combining the first data and the second data.

In some embodiments, the method 2300 may further include storing the script in a non-transitory medium for access by the product testing machine.

In some embodiments, with respect to the method 2300, the first tracked action comprises a tracked cursor movement, a tracked object selection, a typing of a text, an inputting of a key, or an outputting of a voice.

In some embodiments, the method 2300 may be performed in response to a processing unit processing a set of instructions stored in a processor-readable medium. In particular, the processor-readable medium includes a set of instructions, wherein an execution of the instructions by a processing unit will cause a method for to be performed, the method comprising: receiving first data regarding a first tracked action performed while testing a first product; and creating, by the processing unit, a script based on the first data, wherein the script is electronically executable by a product testing machine to perform machine-testing of a second product, the second product having at least one feature that is different from the first product.

Product Testing Online Payment Features Using Actual Credit Cards

As described in the above embodiments, the system 10 is configured to obtain a product from the party 12, and provide testing interface for allowing one or more tester(s) 14 to perform product testing on the product. In some embodiments, the system 10 may be configured to also perform product testing on one or more additional product(s) without requiring any human tester 14 as described above with reference to FIGS. 11-12. In some embodiments, the product testing (whether it is performed by tester(s) 14 or by the system 10) may include testing of an online payment feature using actual credit cards to fully test the entire online payment transaction from end to end. Such testing may be performed by either tester(s) 14, or by the product testing system 10 without requiring any testers 14.

Figure 24:
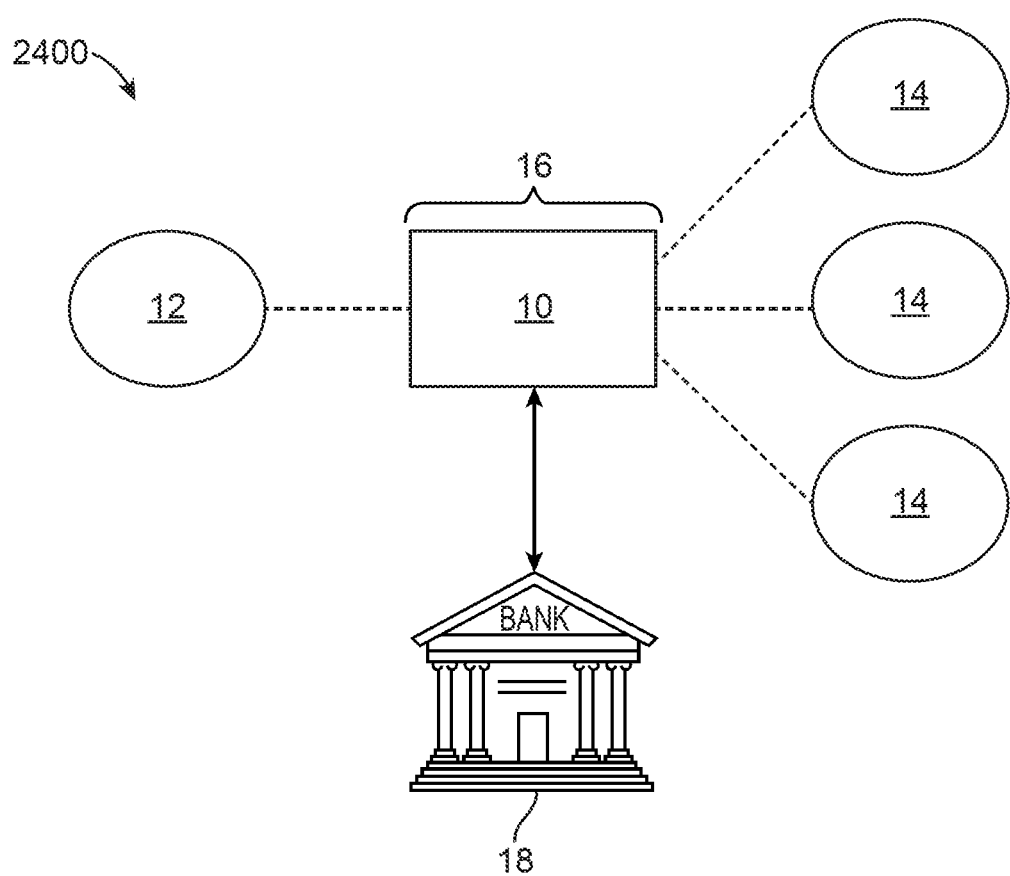
FIG. 24 illustrates a system for providing product testing.

FIG. 24 illustrates an example of such a scenario. As shown in the figure, the product testing system 10 may test a feature of a product by submitting a set of digits received from an institution 18 to be processed by a repository (not shown). In some embodiments, human testers 14 may input the set of digits to test the online payment feature of the product. In other embodiments, the product testing of the online payment feature may not require any human testers 14 to input the set of digits. Instead, the product testing system 10 itself may input the set of digits to test the online payment feature of the product.

The institution 18 may be, for example, a financial institution, a credit card provider entity, and/or an issuing bank that issues credit cards to consumers. The repository processing the set of digits may be, for example, a merchant, an acquirer bank, and/or a card network. A merchant may be an entity that may use a credit card machine, software or gateway to transmit a credit cardholder's information and details of a transaction to an acquiring bank, or a bank's processor. The acquiring bank (or its processor) may capture the transaction information (including the cardholder's information) and route the information through the appropriate card network to the cardholder's issuing bank to be approved or declined. The card network may be, as an example, Visa, MasterCard, Discover and/or American Express. Card networks are important because a consumer can only use a credit card at merchants that belong to its respective network. More specifically, the card networks handle the worldwide processing of credit card transactions, acting as a gateway between consumers, merchants and credit card companies.

The set of digits, in some embodiments, may correspond to an actual credit card having a set of numbers uniquely identifying the actual credit card (e.g., a bank card number) issued to a consumer. In some embodiments, an issuing bank may issue a credit card account having a virtual credit card option available to a consumer. In some embodiments, the consumer may be the entity providing the product testing system 10. The virtual credit card option may allow the consumer to request a set of digits corresponding to a virtual credit card for the consumer. The set of digits and/or virtual credit card may allow the consumer, or a delegate of the consumer (e.g., a tester), to submit a financial transaction using the set of digits that may result in an actual real world financial transaction, such as, for example, an online payment for a product or service via an online/electronic payment system. The set of digits, hereinafter, may be referred to as a virtual credit card ("VCC") for simplicity of explanation.

The VCC may include information similar to an actual credit card. For example, the VCC may include an actual credit card number, an expiration date, a maximum number of units limit (e.g., maximum credit limit), a card verification value code, or any combination of the foregoing. The expiration date of the VCC indicating when (e.g., after a particular date) the VCC may be expired (e.g., no longer active). For example, in some embodiments, the set of digits for testing a product may be an actual credit card number such as "4678 8600 6754 1037". The set of digits may also include "07/18" as the expiration date, and "453" as the card verification value code. In some embodiments, the expiration date may include a day, such as, for example "07/28/18".

In some embodiments, the expiration date may be configurable by the consumer (e.g., the product testing system 10, administrator of the product testing system 10, etc.) such that the consumer may indicate and/or designate an expiration date of the VCC. For example, the consumer, upon requesting a VCC, may indicate that the VCC is valid for only 30 days, in which case, the expiration date for the VCC being requested expires within 30 days of the date the request was made for the VCC. One of ordinary skill in the art may appreciate that the expiration date may be configurable by the consumer to be any date that may serve any purpose or use of the VCC.

For example, for product testing purposes, a VCC may be requested to be valid for at least an amount of time that is necessary for a human tester 14 or the product testing system 10 to complete the product testing (e.g., within 24 hours, one week, one month, and/or two or more months from the date of request, etc.). Being able to prescribe an expiration date may be advantageous for security purposes so that the VCC is not abused or misused by any human tester 14 or anyone who may fraudulently obtain an active VCC. For example, if a product testing may be done within a one-month period, requesting a VCC with an expiration date within 30 days may reduce the chances of having extra, issued but unused VCCs active for a period of time greater than one month requirement.

The maximum amount of units (e.g., credit limit) may be the maximum amount of credit an issuing bank/financial institution/credit card company allows a borrower/consumer to spend on a single card (e.g., a VCC), wherein a unit may be, as an example, a US dollar, an European Euro, a Japanese Yen, a British Pound, etc. It is important to note that institution 18 may establish a credit card account with the consumer, the consumer being, as an example, a product testing system provider. The credit card account may have a first credit limit. As the consumer requests one or more VCCs, each VCC may have its own credit limits. In some embodiments, all of the VCC credit limits may be the same. In some embodiments, the VCC credit limits may differ based at least in part on different product tests and/or different product suppliers. In some embodiments, the sum of all unused, active (e.g., non-expired) VCC credit limits are less than the credit limit of the credit card account issued to the consumer.

In some embodiments, the credit limit of a VCC may be, as an example, less than 20 units (e.g., $20.00 US Dollars). In some embodiments, the credit limit of a VCC, as an example, may be configurable by an administrator and/or user via product testing system 10 based at least in part on an amount of units required for testing the product. For example, if a product test requires a purchase of a $15.00 product/service, then a VCC requested for the product test may be $17.00 so that in the event the VCC is mishandled or is received by a non-tester, the risk of the lost/mishandled VCC is at most only $17.00, the credit limit of the VCC, as opposed to a much larger credit limit available to most normal credit card such as, for example, $500.00. Having the capability to configure the credit limit of the VCC upon requesting the VCC allows the product testing system 10 to minimize any potential security risks associated with the mishandling of VCCs issued for product testing purposes.

In some embodiments, each VCC issued by the institution 18 may be configured for only a single-time use. In other words, each VCC issued by the institution 18 may be further limited to only a single transaction (e.g., used only one time), up to a maximum credit limit of the VCC, within the limited expiration date of the VCC. The multi-factor security limitations of the VCC makes the VCC a great solution for solving the problem of product testing online payment features of product suppliers. This is because the VCCs may be issued by the institution 18 such that each VCC may have the multiple security limitations of the configurable expiration date, credit limit, and/or single-time use features. The multiple security limitations minimize potential risks associated with the issuance and distribution of VCCs for product testing purposes. In some embodiments, VCCs may be configured to be usable multiple times and/or more than once—as opposed to only a single-time use. Most credit cards are issued to be usable multiple times. However, the VCCs may have the option to be issued as a one-time use VCC.

The card verification value ("CVV") may also be referred to as a card security code ("CSC"), card verification data ("CVD"), card verification code ("CVC"), verification code ("V-code" or "V code"), or signature panel code ("SPC"). The CVV is used as a security feature and is often sought by merchants for "card not present" transactions occurring by mail, fax, telephone or Internet. In some embodiments, card issuers may require a merchant to obtain the code when the cardholder is not present in person.

Figure 25:
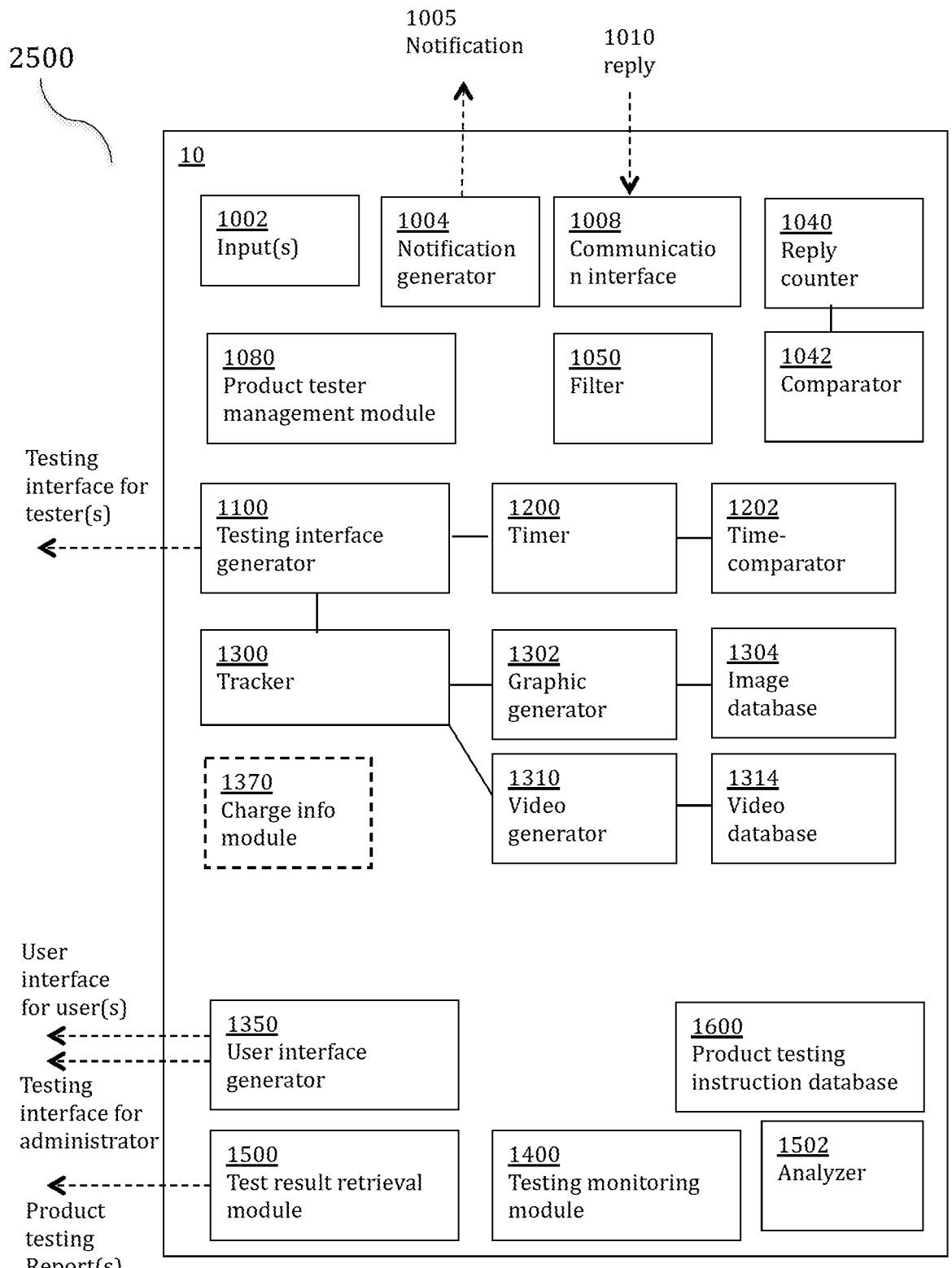
FIG. 25 illustrates an example of the system of FIG. 24.

FIG. 25 illustrates an example 2500 of the system 10 of FIG. 24. FIG. 25 is similar to FIG. 1B disclosed above. However, the system 10 of FIG. 25 includes a charge information (charge info) module 1370. The charge information module 1370 is configured to manage the request and receipt of VCCs from institution 18 for the system 10. The charge information module 1370 may be configured to display a user interface to allow a user and/or an administrator of system 10 to configure one or more parameters associated to an issuance of one or more VCCs. In some embodiments the one or more VCCs may be associated to one or more product tests, wherein the one or more product tests may be further associated to one or more product suppliers. In some embodiments, a set of VCC parameters for one product test may be different from another set of VCC parameters for another product test. In some embodiments, a set of VCC parameters for one product supplier may be different from another set of VCC parameters for a different product supplier. One of ordinary skill in the art may appreciate that a particular set of VCC parameters may be configured for a particular product test for a particular product supplier, and that there may be many different combinations and configurations of VCC parameters to product tests to product suppliers, and that the embodiments disclosed herein are simply examples of such combinations.

Charge information module 1370 may include an application-programming interface (API). An API may be a software intermediary that allows two software applications to talk to each other. The API may allow system 10 to communicate with institution 18 for issuing VCCs corresponding to one or more credit accounts established between the institution 18 and the consumer. In some embodiments, the consumer may be an entity providing the product testing system to product suppliers. In some embodiments, the consumer may be the product supplier such that the credit account established with institution 18 is between the product supplier and the institution 18. The API may use a set of VCC parameters configured by a user and/or administrator to request the new VCCs.

The API may also allow system 10 to communicate with institution 18 for receiving VCC information issued from institution 18 as a result of one or more requests for VCCs sent by system 10.

Figure 26:
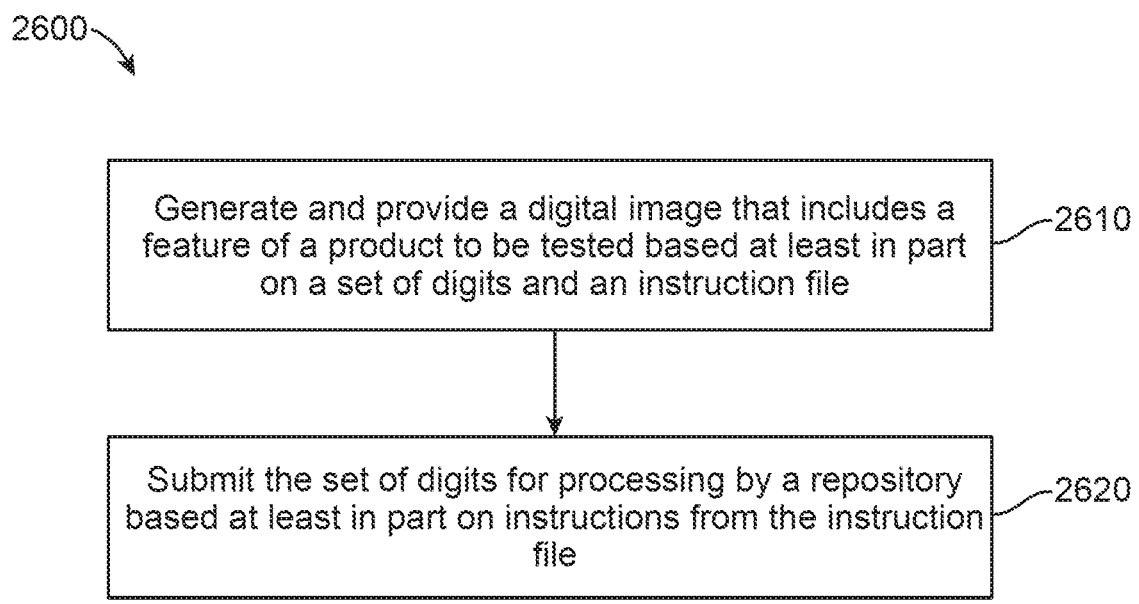
FIG. 26 illustrates a method for providing product testing.

FIG. 26 illustrates a method 2600 in accordance with some embodiments. The method 2600 is a processor-implemented method for product testing. The method 2600 may be performed by the system 10 of FIG. 25. As shown in the figure, the method 2600 includes generating and providing a digital image that includes a feature of a product to be tested based at least in part on a set of digits and an instruction file (item 2610); and submitting the set of digits for processing by a repository for product testing the feature (item 2620). The feature of the product being tested may be, as an example, an online payment feature for a website that sells products and/or services. The feature being tested may be an online payment feature to ensure the online payment feature of the website can successfully receive and process a payment transaction using a real credit card.

The digital image may include a payment screen of the online payment feature, the payment screen having one or more fields for entering payment information, the payment information including portions of the set of digits corresponding to, as an example, a bank card information uniquely identifying a virtual credit card, an expiration date corresponding to the virtual credit card, and payment amount for a product testing condition. In addition to the payment screen, the digital image may also include information from the instruction file. The instruction file provides instructions to the user (e.g., human tester 14) to conduct the product testing such as, for example, enter into the payment screen the information from the VCC received from institution 18 and associated to the product testing being conducted by the user (e.g., human tester 14). In some embodiments, the API from charge information module 1370 may have placed the respective VCC information into the instruction file to be presented to the user/human tester 14. In some embodiments, a testing device having a processing unit may be configured to provide the digital image that includes the feature of the product to be tested based at least in part on the instruction file.

As discussed above, as an example, the instruction file may instruct a user/human tester 14 to enter, into a payment screen, the VCC information to submit the online payment information. In some embodiments, after the tester 14 has inputted the VCC information, the testing device may be configured to test the product by submitting the set of digits (e.g., VCC information) for processing by a repository. As a result, the submission of the VCC may result in a real world transaction such that the product testing of the payment feature results in an actual financial transaction in the real world. The above unique technique of using VCC information for testing a product is unconventional and counter-intuitive. This is because product suppliers generally do not prefer to make a real word payment transaction (e.g., to buy an item or to pay for a service) while testing the online payment feature of its product. However, by implementing a small limit on the VCC for the sole purpose of testing the online payment feature of a product, such testing technique may be advantageous and may be more desirable because it limits the costs for testing the product, and it will result in a real word transaction to fully test the online payment feature. Such real world transaction may involve multiple real world parties, which may not even aware that the transaction is for a product testing, and may treat the transaction as a normal financial transaction.

In some embodiments, the amount of money transacted from the product testing of the payment feature may result in reconciliation of monies transacted so that the money transacted during the product testing is reimbursed from the product supplier (who may receive the real world transaction of the payment) to the entity providing the product testing system (e.g., the consumer of the credit account that is being charged by the payments using the respective VCCs), or to the entity responsible for the credit account that was established with institution 18 from which the VCCs were issued in correspondence with the credit account.

In some embodiments, with respect to the method 2600, the set of digits is included in the instruction file.

In some embodiments, with respect to the method 2600, the instruction file comprises testing instructions for testing the product.

In some embodiments, the method 2600 may further include requesting the set of digits from an institution.

In some embodiments, with respect to the method 2600, the set of digits further includes: an expiration date corresponding to the set of digits; and a maximum amount of units corresponding to the set of digits.

In some embodiments, with respect to the method 2600, the expiration date is configurable based at least in part on an expected date and/or time range specified for a product test to complete.

In some embodiments, with respect to the method 2600, the maximum amount of units is less than 20 units.

In some embodiments, with respect to the method 2600, the maximum amount of units is configurable based at least in part on an amount of units required for testing the product.

In some embodiments, with respect to the method 2600, the set of digits is used only one time.

In some embodiments, with respect to the method 2600, the set of digits is used more than once.

In some embodiments, the method 2600 may further include tracking an amount of units transacted by a plurality of product tests.

In some embodiments, with respect to the method 2600, the amount of units transacted is tracked based at least in part on a particular customer of the electronic product testing system.

In some embodiments, the method 2600 may further include a tracking device configured for tracking a cursor movement with respect to the digital image, and/or a selection of an item in the digital image, and to generate product testing data based on a result of the tracking, wherein a tracking device is configured to output the product testing data for storage in a non-transitory medium, the non-transitory medium having a database structure that is configured to store the product testing data in association with the digital image and the instruction file.

In some embodiments, the method 2600 may further include a graphic generator configured to generate a graphic representing the tracked movement.

In some embodiments, with respect to the method 2600, the graphic comprises a line traversing a plurality of cursor positions.

In some embodiments, with respect to the method 2600, the graphic further comprises a selection identifier identifying a position of the selection of the item.

In some embodiments, with respect to the method 2600, the non-transitory medium comprises a database configured to store a file having a plurality of cursor positions as the product testing data, wherein the cursor positions is retrievable from the database for presentation over the digital image.

In some embodiments, with respect to the method 2600, the database is configured to store the cursor positions in association with an identity of a product tester.

In some embodiments, with respect to the method 2600, the item comprises a tab, a button, an icon, or a text, or any combination of the foregoing; and wherein the tracking device is configured to track a selection of the tab, a selection of the button, a selection of the icon, a selection of the text, or any combination of the foregoing.

In some embodiments, the method 2600 may further include generating a video of the tracked interaction.

In some embodiments, the method 2600 may further include presenting a question after a task has been performed in accordance with the product testing instruction.

In some embodiments, with respect to the method 2600, the instruction file comprises a first instruction to perform a first task and a second instruction to perform a second task for testing the product.

In some embodiments, with respect to the method 2600, the product testing data indicates a first tracked interaction for the first task, and a second tracked interaction for the second task.

In some embodiments, the method 2600 may further include providing the digital image, the instruction file, and a first set of digits for allowing a first entity to perform product testing on the product, and providing the digital image, the instruction file, and a second set of digits for allowing a second entity to perform product testing on the product.

In some embodiments, with respect to the method 2600, the product comprises a web page, a web site, a computer application, a mobile device application, or a processor application.

In some embodiments, the method 2600 may further include providing the digital image for display on a hand-held device.

In some embodiments, the method 2600 may further include providing the digital image for display on a computer screen or a laptop screen.

Figure 27A:
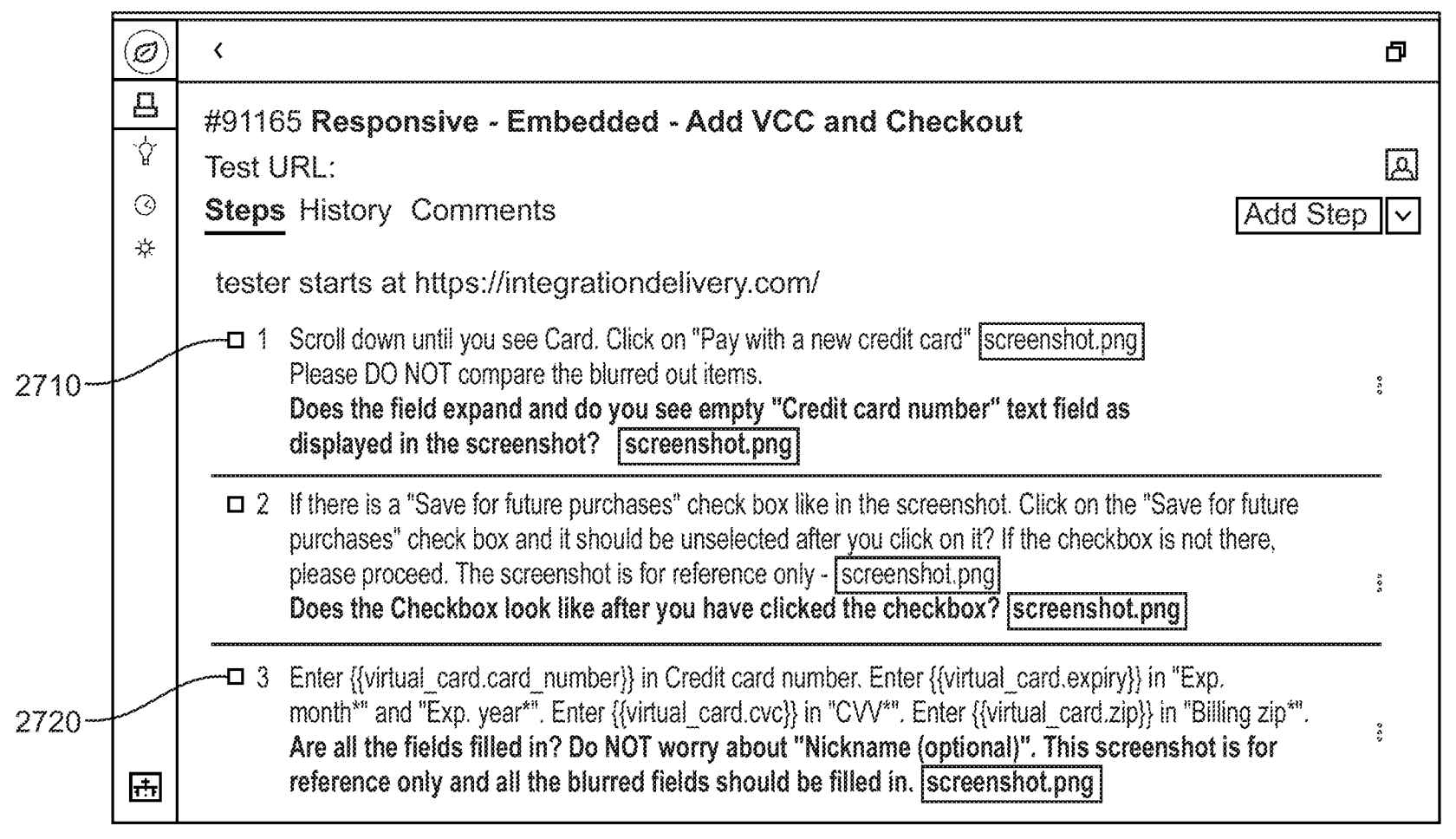
Figure 27B:
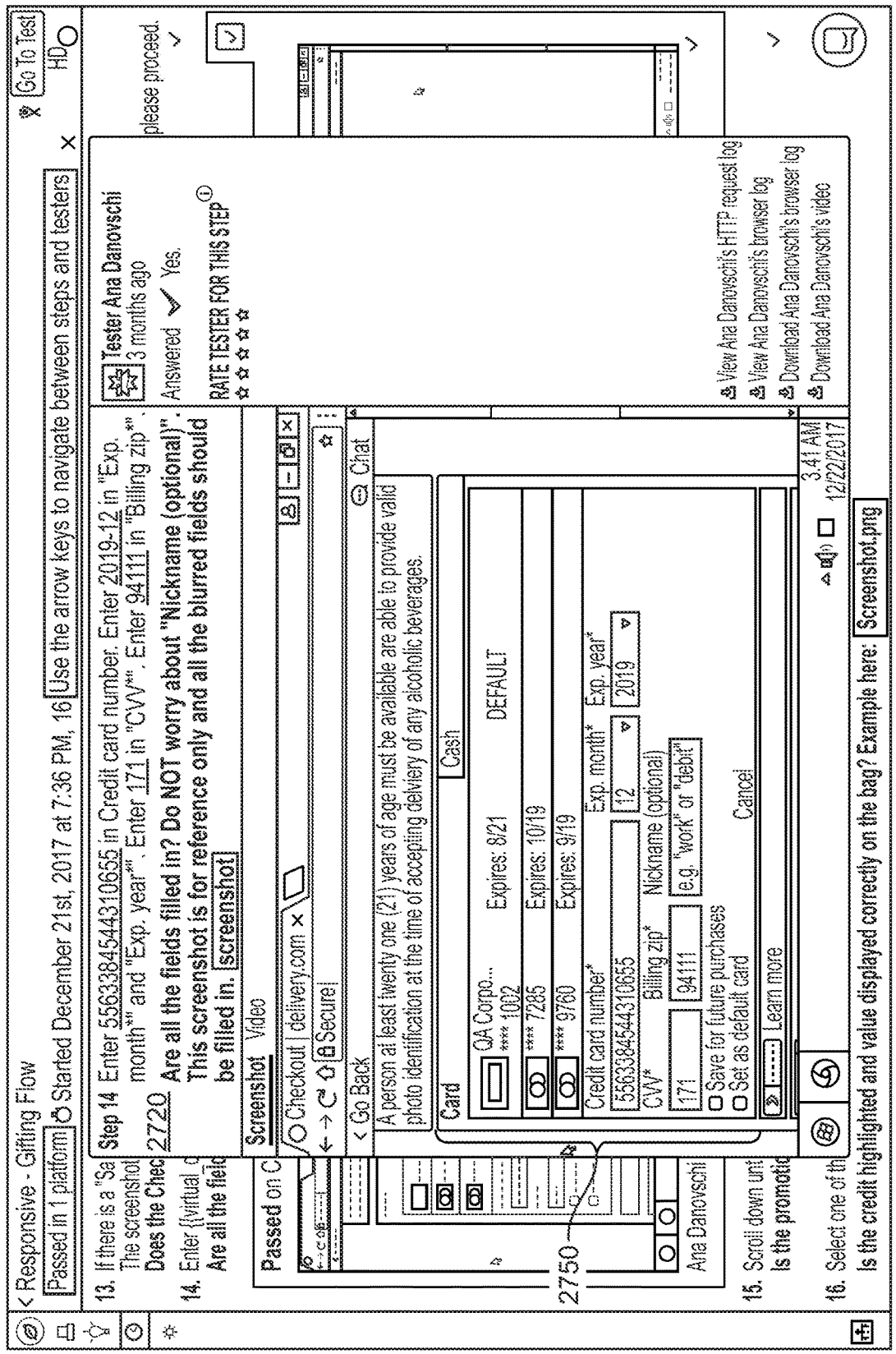

FIG. 27A-27B illustrate an example of product testing an online payment feature. FIG. 27A illustrates an example of a digital image displaying information from the instruction file that is presented to a user/human tester 14 for conducting the product testing. Instruction 2710 instructs the user/human tester 14 to click on "pay with a new credit card" and instruction 2720 instructs the user to "Enter {VCC number} in Credit card number." In some embodiments, the API of charge information module 1370 may be configured to receive the VCC number from the institution 18, and to incorporate the VCC number in the product testing instruction file (wherein such may be performed during a product testing setup—e.g., before assigning the product test to a human tester 14). This way, when the product testing system 10 executes the instruction file to provide testing instruction to tester 14 via a testing interface to test a product, the VCC number will be readily available from the testing instruction file for presentation to the tester 14. Alternatively, instead of incorporating the VCC number into the product testing instruction file, the VCC number may be stored in a VCC database. In such cases, during product testing, the charge information module 1370 may retrieve the VCC number from the VCC database, and may provide the VCC number for display as a part of the instruction 2720 during the actual product testing.

FIG. 27B illustrates an example of a digital image displaying both (1) an instruction 2720 instructing a user/human tester 14 to enter information into payment fields, and (2) an online payment feature 2750 for providing payment information to purchase a product or service from a product supplier. In particular, instruction 2720 instructs the user/human tester 14 to enter the VCC information into the payment information entry screen of the online payment feature 2750. As discussed, in some embodiments, the VCC information may be included in the instruction file (that includes testing instruction, such as the instruction 2720) by the charge information module 1370 during product testing setup before a user/human tester 14 begins testing. In other embodiments, the VCC information may be retrieved by the charge information module 1370 from a database, and may be provided by the product testing system 10 as a part of the instruction 2720.

Figure 28:
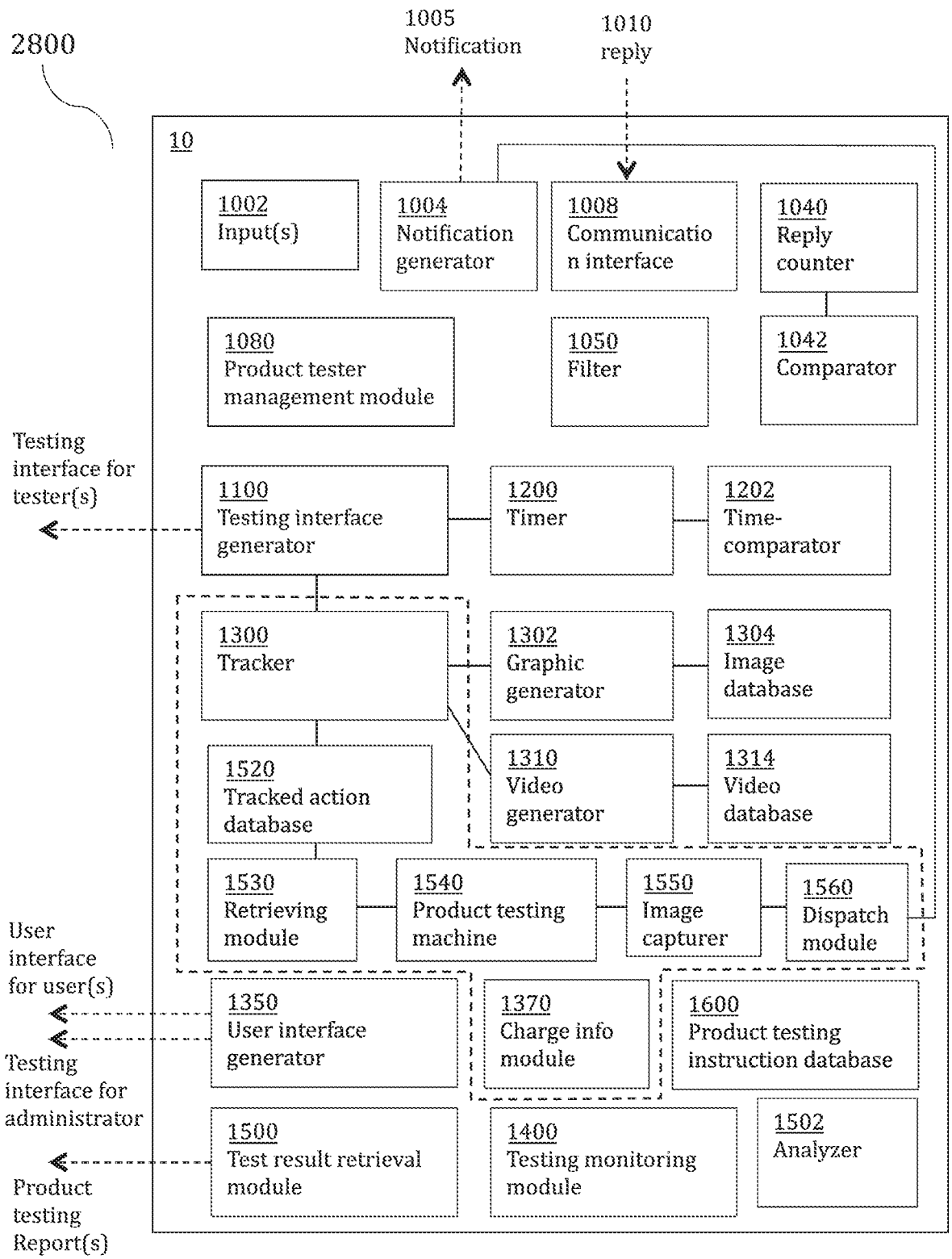
FIG. 28 illustrates an example of the system of FIG. 24.

As similarly discussed with reference to FIG. 11 and FIG. 12, in some embodiments, the system 10 may be configured to perform machine-based product testing on one or more additional product(s) without requiring any human tester 14. The VCC features described herein may be incorporated into such machine-based product testing. FIG. 28 illustrates an example 2800 of the system 10 of FIG. 24. In particular, FIG. 28 illustrates a system 10 for providing product testing, wherein the system 10 includes additional features for allowing machine-testing of products. The system 10 of FIG. 28 is the same as the system 10 of FIG. 12, except that the system 10 of FIG. 28 also includes a charge information module 1370 as described above with reference to FIG. 25. The charge information module 1370 is configured to manage the request and receipt of VCCs from institution 18 for system 10. Charge information module 1370 may be configured to display a user interface to allow a user and/or an administrator of system 10 to configure one or more parameters associated to an issuance of one or more VCCs.

The charge information module 1370 may include an application-programming interface (API) that is a software intermediary configured to allow two software applications to talk to each other. The API may allow system 10 to communicate with institution 18 for issuing VCCs corresponding to one or more credit accounts established between the institution 18 and the consumer. In some embodiments, the consumer may be an entity providing the product testing system to product suppliers. In some embodiments, the consumer may be a product supplier such that the credit account established with institution 18 is between the product supplier and the institution 18. The API may use a set of VCC parameters configured by a user and/or administrator to request the new VCCs.

The API may also allow system 10 to communicate with institution 18 for receiving VCC information issued from institution 18 as a result of one or more requests for VCCs by system 10.

As shown in FIG. 28, the tracker 1300 is configured to track actions of tester(s) 14 performed to test a first product (e.g., product 1508 of FIG. 11). The data stored in the non-transitory medium 1520 may be data regarding one or more tracked actions of tester(s) 14 performed while testing the first product 1508. In some embodiments, the first product 1508 may include an online payment feature, and the data stored in the non-transitory medium 1520 may include a first set of digits (e.g., first VCC information) used by tester 14 to perform product testing on the first product 1508. The retrieving module 1530 is configured to access an electronic file containing the data (generated based on the testing of the first product 1508) from the non-transitory medium 1520. The product testing machine 1540 is configured to perform machine-testing for a second product 1509 based on the data in the electronic file. The second product 1509 may include one or more features that are different from the first product 1508. In some embodiments, when the product testing machine 1540 is performing machine-testing of the second product 1509, the charge information module 1370 is configured to provide a second set of digits for allowing the product testing machine 1540 to test an online payment feature of the second product 1508. The second set of digits (e.g., second VCC information) is different from the first set of digits (e.g., first VCC information). In some embodiments, the charge information module 1370 is configured to provide the second set of digits for the product testing machine 1540 to test the online payment feature of the second product 1509 based on the second set of digits.

Figure 29:
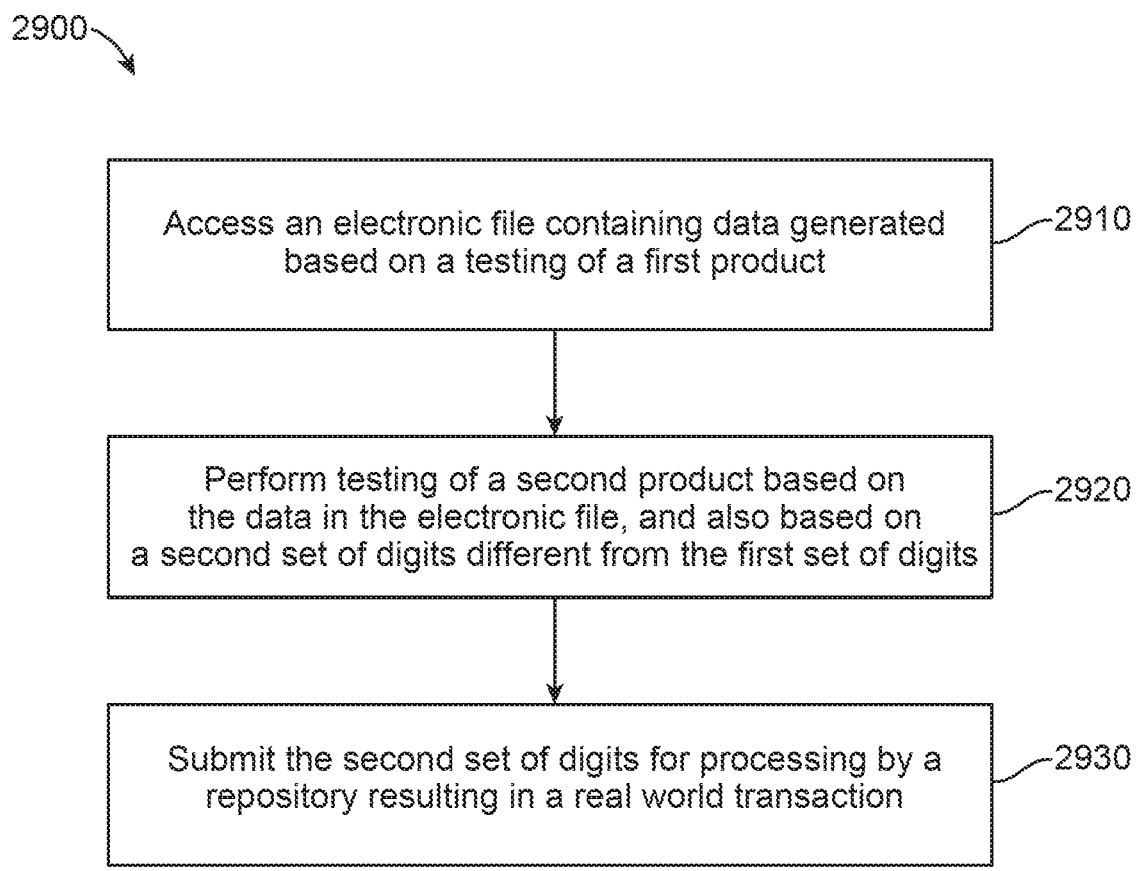
FIG. 29 illustrates a method for providing product testing.

FIG. 29 illustrates a method 2900 in accordance with some embodiments. The method 2900 is a processor-implemented method for product testing. The method 2900 may be performed by the system 10 of FIG. 28. As shown in the figure, the method 2900 includes accessing an electronic file containing data generated based at least in part on a testing of a first product, the testing of the first product performed based at least in part on a first set of digits (item 2910); performing testing of a second product based on the data in the electronic file, and also based on a second set of digits different from the first set of digits (item 2920); and submitting the second set of digits for processing by a repository resulting in a real world transaction (item 2930).

In some embodiments, the method 2900 may further include requesting the second set of digits from an institution.

In some embodiments, with respect to the method 2900, an expiration date is included in, or is associated with, the second set of digits.

In some embodiments, with respect to the method 2900, the expiration date is within 30 days of a request date of the second set of digits.

In some embodiments, with respect to the method 2900, the expiration date is configurable based at least in part on an expected date and/or time range specified for the testing of the second product to complete.

In some embodiments, with respect to the method 2900, a maximum amount of units is included in, or is associated with, the second set of digits.

In some embodiments, with respect to the method 2900, the maximum amount of units is less than 20 units.

In some embodiments, with respect to the method 2900, the maximum amount of units is configurable based at least in part on an amount of units required for testing the second product.

In some embodiments, with respect to the method 2900, the second set of digits is for a single-time use.

In some embodiments, with respect to the method 2900, a respective set of digits is usable multiple times.

In some embodiments, the method 2900 may further include tracking an amount of units transacted for a plurality of product tests.

In some embodiments, with respect to the method 2900, the data in the electronic file comprises information regarding tracked actions of a tester, and respective time stamps of the tracked actions.

In some embodiments, with respect to the method 2900, the act of performing testing of the second product comprises re-executing the tracked actions by the processing unit based on the data in the electronic file regarding the tracked actions of the tester.

In some embodiments, with respect to the method 2900, the processing unit is configured to simulate actions of a tester based on the data in the electronic file.

In some embodiments, with respect to the method 2900, the electronic file comprises a script, and wherein the act of performing testing of the second product comprises running the script by the processing unit for testing the second product.

In some embodiments, with respect to the method 2900, the script is based on tracked actions of multiple testers.

In some embodiments, with respect to the method 2900, the data in the electronic file are based on tracked action(s) performed using a cursor and/or a keyboard.

In some embodiments, with respect to the method 2900, the data in the electronic file comprises: cursor positions; a text typed by a tester; a location of the text typed by the tester, a location of an object selection; or any combination of the foregoing.

In some embodiments, the method 2900 may be performed in response to a processing unit processing a set of instructions stored in a processor-readable medium. In particular, the processor-readable medium includes a set of instructions, wherein an execution of the instructions by a processing unit will cause a method for product testing to be performed, the method comprising: accessing an electronic file containing data generated based at least in part on a testing of a first product, the testing of the first product performed based at least in part on a first set of digits; performing testing of a second product based on the data in the electronic file, and also based on a second set of digits different from the first set of digits; and submitting the second set of digits for processing by a repository resulting in a real world transaction.

Specialized Processing System

Figure 30:
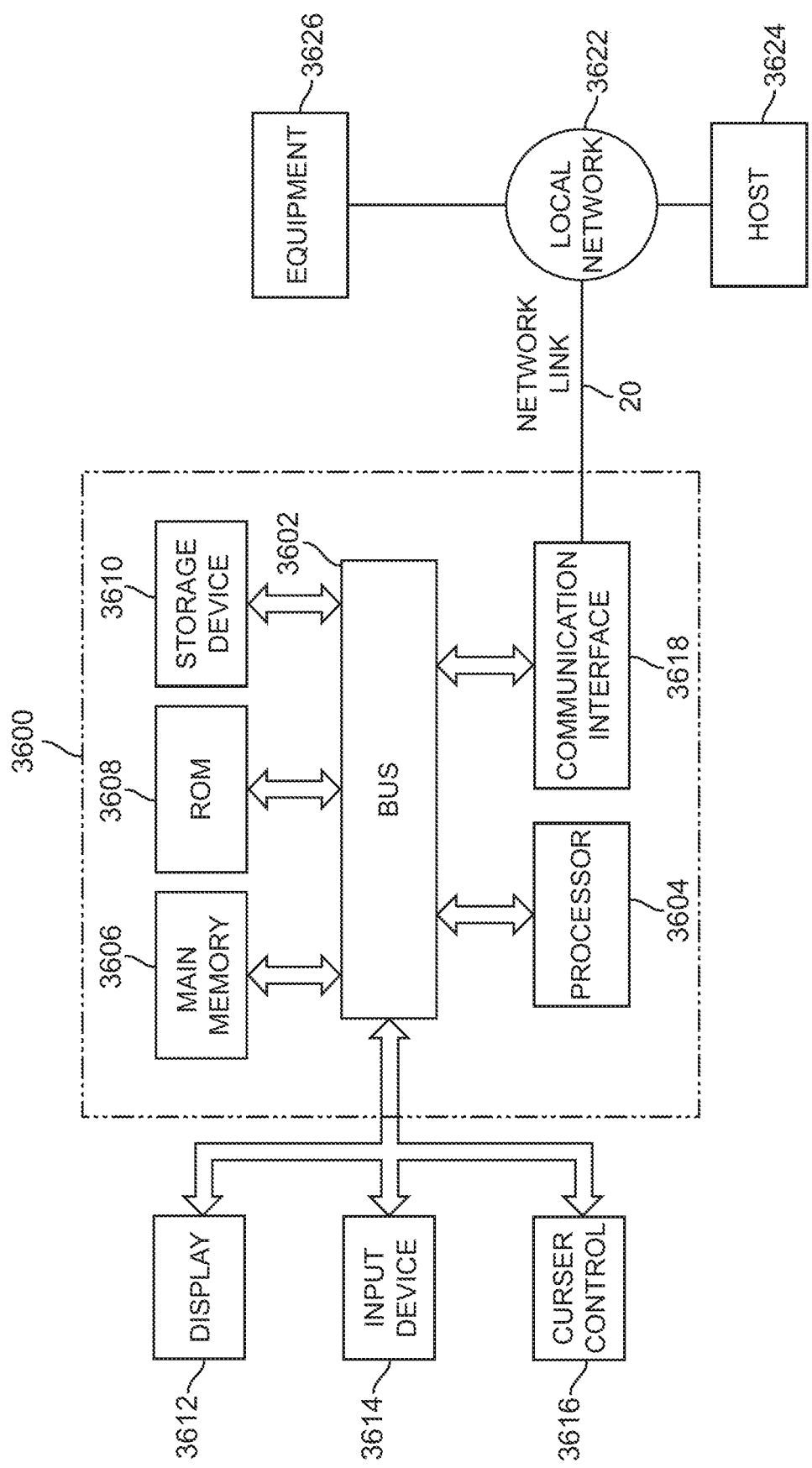
FIG. 30 is a block diagram of a specialized processing system.

FIG. 30 is a block diagram illustrating an embodiment of a specialized processing system 3600 that can be used to implement various embodiments or features described herein. For example, the processing system 3600 may be used to implement the system 10 of FIG. 1A and FIG. 1B, the system 10 of FIG. 11 and FIG. 12, the system 10 of FIG. 24, the system of FIG. 25, the system of FIG. 28, or any component thereof. As another example, the processing system 3600 may be an example of a device being used by a product tester. Also, in some embodiments, the processing system 3600 may be used to implement the tracker 1300, the charging information module 1370, the retrieving module 1530, the product testing machine 1540, the image capturer 1550, the dispatch module 1560, a component of any of the foregoing, or any combination of the foregoing. Furthermore, in some embodiments, the processing system 3600 may be considered a processing unit that is a part of the tracker 1300, a part of the charging information module 1370, a part of the retrieving module 1530, a part of the product testing machine 1540, a part of the image capturer 1550, a part of the dispatch module 1560, or any combination of the foregoing. In addition, in some embodiments, the processing system 3600 may be configured to implement the apparatus 1950, the apparatus 2000, the apparatus 2200, or any combination of the foregoing.

Processing system 3600 includes a bus 3602 or other communication mechanism for communicating information, and a processor 3604 coupled with the bus 3602 for processing information. The processor system 3600 also includes a main memory 3606, such as a random access memory (RAM) or other dynamic storage device, coupled to the bus 3602 for storing information and instructions to be executed by the processor 3604. The main memory 3606 also may be used for storing temporary variables or other intermediate information during execution of instructions to be executed by the processor 3604. The processor system 3600 further includes a read only memory (ROM) 3608 or other static storage device coupled to the bus 3602 for storing static information and instructions for the processor 3604. A data storage device 3610, such as a magnetic disk or optical disk, is provided and coupled to the bus 3602 for storing information and instructions.

The processor system 3600 may be coupled via the bus 3602 to a display 3612, such as a cathode ray tube (CRT), for displaying information to a user. An input device 3614, including alphanumeric and other keys, is coupled to the bus 3602 for communicating information and command selections to processor 3604. Another type of user input device is cursor control 3616, such as a mouse, a trackball, or cursor direction keys for communicating direction information and command selections to processor 3604 and for controlling cursor movement on display 3612. This input device typically has two degrees of freedom in two axes, a first axis (e.g., x) and a second axis (e.g., y), that allows the device to specify positions in a plane.

In some embodiments, the processor system 3600 can be used to perform various functions described herein. According to some embodiments, such use is provided by processor system 3600 in response to processor 3604 executing one or more sequences of one or more instructions contained in the main memory 3606. Those skilled in the art will know how to prepare such instructions based on the functions and methods described herein. Such instructions may be read into the main memory 3606 from another processor-readable medium, such as storage device 3610. Execution of the sequences of instructions contained in the main memory 3606 causes the processor 3604 to perform the process steps described herein. One or more processors in a multi-processing arrangement may also be employed to execute the sequences of instructions contained in the main memory 3606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 3604 for execution. Such a medium may take many forms, including but not limited to, non-volatile media, volatile media, and transmission media. Non-volatile media includes, for example, optical or magnetic disks, such as the storage device 3610. A non-volatile medium may be considered an example of non-transitory medium. Volatile media includes dynamic memory, such as the main memory 3606. A volatile medium may be considered an example of non-transitory medium. Transmission media includes coaxial cables, copper wire and fiber optics, including the wires that comprise the bus 3602. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 3604 for execution. For example, the instructions may initially be carried on a magnetic disk of a remote computer. The remote computer can load the instructions into its dynamic memory and send the instructions over a telephone line using a modem. A modem local to the processing system 3600 can receive the data on the telephone line and use an infrared transmitter to convert the data to an infrared signal. An infrared detector coupled to the bus 3602 can receive the data carried in the infrared signal and place the data on the bus 3602. The bus 3602 carries the data to the main memory 3606, from which the processor 3604 retrieves and executes the instructions. The instructions received by the main memory 3606 may optionally be stored on the storage device 3610 either before or after execution by the processor 3604.

The processing system 3600 also includes a communication interface 3618 coupled to the bus 3602. The communication interface 3618 provides a two-way data communication coupling to a network link 3620 that is connected to a local network 3622. For example, the communication interface 3618 may be an integrated services digital network (ISDN) card or a modem to provide a data communication connection to a corresponding type of telephone line. As another example, the communication interface 3618 may be a local area network (LAN) card to provide a data communication connection to a compatible LAN. Wireless links may also be implemented. In any such implementation, the communication interface 3618 sends and receives electrical, electromagnetic or optical signals that carry data streams representing various types of information.

The network link 3620 typically provides data communication through one or more networks to other devices. For example, the network link 3620 may provide a connection through local network 3622 to a host computer 3624 or to equipment 3626 such as a radiation beam source or a switch operatively coupled to a radiation beam source. The data streams transported over the network link 3620 can comprise electrical, electromagnetic or optical signals. The signals through the various networks and the signals on the network link 3620 and through the communication interface 3618, which carry data to and from the processing system 3600, are exemplary forms of carrier waves transporting the information. The processing system 3600 can send messages and receive data, including program code, through the network(s), the network link 3620, and the communication interface 3618.

It should be noted that as used in this specification, the term "image" is not limited to an image that is displayed, and may also include image that is not displayed, such as image data stored in a non-transitory medium. Similarly, as used in this specification, the term "video" is not limited to a video that is displayed, and may also include video that is not displayed, such as video data stored in a non-transitory medium.

Also, as used in this specification, the terms "first", "second", "third", etc., do not necessarily refer to order of items. Rather, these terms may be used to distinguish different items from each other. For example, "first product tester" does not necessarily mean that the product tester is the first in order. Also, "second product tester" does not necessarily mean that the product tester is the second in order. Rather, these terms are used to identify two different product testers.

Furthermore, as used in this specification, the term "machine" (as in the term "product testing machine") may refer to a device, a component, a system, an application, software, a virtual machine, or any form of a processing unit or module, that is configured to perform one or more desired functions. In some embodiments, a machine may include at least some hardware. Similarly, as used in this specification, the term "device" may refer to a physical device, a component, a system, an application, software, a virtual machine, or any form of a processing unit or module, that is configured to perform one or more desired functions. In some embodiments, a device may include at least some hardware.

In addition, as used in this specification, the term "processing unit" may refer to hardware, software, or combination thereof. Also, the term "processing unit" may refer to one or more processors, one or more pieces of software or applications, one or more computing systems or component(s) thereof, one or more virtual machines or component(s) thereof, etc. In one implementation, a processing unit may include at least some hardware.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. An electronic product testing system, comprising:
a retrieving module configured to access an electronic file, the electronic file containing data generated based on a testing of a first product, the testing of the first product performed based at least in part on a first set of digits; and
a testing device having a processing unit configured to perform testing of a second product based on the data in the electronic file, and also based on a second set of digits different from the first set of digits, the second product having at least one feature that is different from the first product, wherein the testing device is configured to perform the testing of the second product by submitting the second set of digits for processing by a repository;
wherein the data in the electronic file comprises information regarding tracked actions of a tester, and respective time stamps of the tracked actions.

2. The system of claim 1, further comprising a charge information module configured to request the second set of digits from an institution.

3. The system of claim 1, wherein an expiration date is included in, or is associated with, the second set of digits.

4. The system of claim 3, wherein the expiration date is within 30 days of a request date of the second set of digits.

5. The system of claim 1, wherein the second set of digits is usable multiple times.

6. The system of claim 1, wherein the processing unit is configured to re-execute the tracked actions for performing the testing of the second product based on the data in the electronic file regarding the tracked actions of the tester.

7. The system of claim 1, wherein the processing unit is configured to simulate actions of the tester based on the data in the electronic file.

8. The system of claim 1, wherein the electronic file comprises a script, and wherein the processing unit is configured to run the script for testing the second product.

9. The system of claim 8, wherein the script is based on tracked actions of multiple testers.

10. The system of claim 1, wherein the data in the electronic file are based on tracked action(s) performed using a cursor and/or a keyboard.

11. The system of claim 1, wherein the data in the electronic file comprises:
cursor positions;
a text typed by the tester;
a location of the text typed by the tester, a location of an object selection; or
any combination of the foregoing.

12. An electronic product testing system, comprising:
a retrieving module configured to access an electronic file, the electronic file containing data generated based on a testing of a first product, the testing of the first product performed based at least in part on a first set of digits; and
a testing device having a processing unit configured to perform testing of a second product based on the data in the electronic file, and also based on a second set of digits different from the first set of digits, the second product having at least one feature that is different from the first product, wherein the testing device is configured to perform the testing of the second product by submitting the second set of digits for processing by a repository;
wherein an expiration date is included in, or is associated with, the second set of digits; and
wherein the expiration date is configurable based at least in part on an expected date and/or time range specified for the testing of the second product to complete.

13. An electronic product testing system, comprising:
a retrieving module configured to access an electronic file, the electronic file containing data generated based on a testing of a first product, the testing of the first product performed based at least in part on a first set of digits; and
a testing device having a processing unit configured to perform testing of a second product based on the data in the electronic file, and also based on a second set of digits different from the first set of digits, the second product having at least one feature that is different from the first product, wherein the testing device is configured to perform the testing of the second product by submitting the second set of digits for processing by a repository;
wherein a maximum amount of units is included in, or is associated with, the second set of digits.

14. The system of claim 13, wherein the maximum amount of units is less than 20 units.

15. The system of claim 13, wherein the maximum amount of units is configurable based at least in part on an amount of units required for testing the second product.

16. An electronic product testing system, comprising:
a retrieving module configured to access an electronic file, the electronic file containing data generated based on a testing of a first product, the testing of the first product performed based at least in part on a first set of digits; and
a testing device having a processing unit configured to perform testing of a second product based on the data in the electronic file, and also based on a second set of digits different from the first set of digits, the second product having at least one feature that is different from the first product, wherein the testing device is configured to perform the testing of the second product by submitting the second set of digits for processing by a repository;
wherein the second set of digits is configured for a single-time use.

17. An electronic product testing system, comprising:
a retrieving module configured to access an electronic file, the electronic file containing data generated based on a testing of a first product, the testing of the first product performed based at least in part on a first set of digits;
a testing device having a processing unit configured to perform testing of a second product based on the data in the electronic file, and also based on a second set of digits different from the first set of digits, the second product having at least one feature that is different from the first product, wherein the testing device is configured to perform the testing of the second product by submitting the second set of digits for processing by a repository; and
a transaction tracker configured to track an amount of units transacted for a plurality of product tests.

18. A processor-implemented method for product testing, comprising:
accessing an electronic file by a retrieving module, the electronic file containing data generated based on a testing of a first product, the testing of the first product performed based at least in part on a first set of digits; and
performing testing of a second product by a testing device based on the data in the electronic file, and also based on a second set of digits different from the first set of digits, the second product having at least one feature that is different from the first product, wherein the act of performing testing of the second product comprises submitting the second set of digits by the testing device for processing by a repository;

wherein the data in the electronic file comprises information regarding tracked actions of a tester, and respective time stamps of the tracked actions.

19. The method of claim 18, further comprising requesting the second set of digits from an institution.

20. The method of claim 18, wherein an expiration date is included in, or is associated with, the second set of digits.

21. The method of claim 20, wherein the expiration date is within 30 days of a request date of the second set of digits.

22. The method of claim 18, wherein a respective set of digits is usable multiple times.

23. The method of claim 18, wherein the act of performing testing of the second product comprises re-executing the tracked actions by the processing unit based on the data in the electronic file regarding the tracked actions of the tester.

24. The method of claim 18, wherein the processing unit is configured to simulate actions of the tester based on the data in the electronic file.

25. The method of claim 18, wherein the electronic file comprises a script, and wherein the act of performing testing of the second product comprises running the script by the processing unit for testing the second product.

26. The method of claim 25, wherein the script is based on tracked actions of multiple testers.

27. The method of claim 18, wherein the data in the electronic file are based on tracked action(s) performed using a cursor and/or a keyboard.

28. The method of claim 18, wherein the data in the electronic file comprises:
  cursor positions;
  a text typed by the tester;
  a location of the text typed by the tester,
  a location of an object selection; or
  any combination of the foregoing.

29. A processor-implemented method for product testing, comprising:
  accessing an electronic file by a retrieving module, the electronic file containing data generated based on a testing of a first product, the testing of the first product performed based at least in part on a first set of digits; and
  performing testing of a second product by a testing device based on the data in the electronic file, and also based on a second set of digits different from the first set of digits, the second product having at least one feature that is different from the first product, wherein the act of performing testing of the second product comprises submitting the second set of digits by the testing device for processing by a repository;
  wherein an expiration date is included in, or is associated with, the second set of digits; and
  wherein the expiration date is configurable based at least in part on an expected date and/or time range specified for the testing of the second product to complete.

30. A processor-implemented method for product testing, comprising:
  accessing an electronic file by a retrieving module, the electronic file containing data generated based on a testing of a first product, the testing of the first product performed based at least in part on a first set of digits; and
  performing testing of a second product by a testing device based on the data in the electronic file, and also based on a second set of digits different from the first set of digits, the second product having at least one feature that is different from the first product, wherein the act of performing testing of the second product comprises submitting the second set of digits by the testing device for processing by a repository;
  wherein a maximum amount of units is included in, or is associated with, the second set of digits.

31. The method of claim 30, wherein the maximum amount of units is less than 20 units.

32. The method of claim 30, wherein the maximum amount of units is configurable based at least in part on an amount of units required for testing the second product.

33. A processor-implemented method for product testing, comprising:
  accessing an electronic file by a retrieving module, the electronic file containing data generated based on a testing of a first product, the testing of the first product performed based at least in part on a first set of digits; and
  performing testing of a second product by a testing device based on the data in the electronic file, and also based on a second set of digits different from the first set of digits, the second product having at least one feature that is different from the first product, wherein the act of performing testing of the second product comprises submitting the second set of digits by the testing device for processing by a repository;
  wherein the second set of digits is for a single-time use.

34. A processor-implemented method for product testing, comprising:
  accessing an electronic file by a retrieving module, the electronic file containing data generated based on a testing of a first product, the testing of the first product performed based at least in part on a first set of digits;
  performing testing of a second product by a testing device based on the data in the electronic file, and also based on a second set of digits different from the first set of digits, the second product having at least one feature that is different from the first product, wherein the act of performing testing of the second product comprises submitting the second set of digits by the testing device for processing by a repository; and
  tracking an amount of units transacted for a plurality of product tests.

* * * * *